(12) United States Patent
Koo et al.

(10) Patent No.: US 12,081,763 B2
(45) Date of Patent: *Sep. 3, 2024

(54) IMAGE CODING METHOD AND DEVICE ON BASIS OF WIDE-ANGLE INTRA PREDICTION AND TRANSFORM

(71) Applicant: LG ELECTRONICS INC., Seoul (KR)

(72) Inventors: Moonmo Koo, Seoul (KR); Jaehyun Lim, Seoul (KR); Junghak Nam, Seoul (KR); Seunghwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/109,531

(22) Filed: Feb. 14, 2023

(65) Prior Publication Data

US 2023/0199189 A1 Jun. 22, 2023

Related U.S. Application Data

(63) Continuation of application No. 17/610,985, filed as application No. PCT/KR2020/006827 on May 27, 2020, now Pat. No. 11,641,471.

(Continued)

(51) Int. Cl.
*H04N 19/132* (2014.01)
*H04N 19/159* (2014.01)
(Continued)

(52) U.S. Cl.
CPC ......... *H04N 19/132* (2014.11); *H04N 19/159* (2014.11); *H04N 19/176* (2014.11); *H04N 19/18* (2014.11)

(58) Field of Classification Search
None
See application file for complete search history.

(56) References Cited

U.S. PATENT DOCUMENTS

| 10,284,844 B1 | 5/2019 | Zhao et al. |
| 2018/0367814 A1 | 12/2018 | Seregin et al. |

(Continued)

FOREIGN PATENT DOCUMENTS

| CN | 112840648 A | 5/2021 |
| KR | 20180063187 A | 6/2018 |

(Continued)

OTHER PUBLICATIONS

X. Zhao, L. Li, Z. Li, X. Li and S. Liu, "Coupled Primary and Secondary Transform for Next Generation Video Coding", 2018 IEEE Visual Communications and Image Processing (VCIP), pp. 1-4, 2018.*

(Continued)

*Primary Examiner* — Michael J Hess
(74) *Attorney, Agent, or Firm* — Bryan Cave Leighton Paisner LLP

(57) ABSTRACT

An image decoding method according to the present document comprises the steps of: obtaining intra prediction mode information and an LFNST index; deriving an intra prediction mode of a current block on the basis of intra prediction mode information; when wide-angle intra prediction is applied to the current block, deriving a modified intra prediction mode by means of intra prediction mode remapping; deciding an LFNST set comprising LFNST matrices on the basis of the modified intra prediction mode; selecting one of the LFNST matrices on the basis of the LFNST set and LFNST index; and deriving transform coefficients for the current block on the basis of the selected LFNST matrix.

6 Claims, 13 Drawing Sheets

Related U.S. Application Data

(60) Provisional application No. 62/856,134, filed on Jun. 2, 2019, provisional application No. 62/853,689, filed on May 28, 2019, provisional application No. 62/853,155, filed on May 27, 2019.

(51) Int. Cl.
  *H04N 19/176* (2014.01)
  *H04N 19/18* (2014.01)

(56) References Cited

U.S. PATENT DOCUMENTS

| | | | |
|---|---|---|---|
| 2019/0149822 A1 | 5/2019 | Kim et al. | |
| 2020/0007860 A1* | 1/2020 | Zhao | H04N 19/593 |
| 2020/0092555 A1* | 3/2020 | Zhao | H04N 19/12 |
| 2020/0322635 A1* | 10/2020 | Koo | H04N 19/625 |
| 2020/0366935 A1* | 11/2020 | Salehifar | H04N 19/105 |
| 2021/0044808 A1* | 2/2021 | Kim | H04N 19/176 |

FOREIGN PATENT DOCUMENTS

| | | |
|---|---|---|
| KR | 20190003950 A | 1/2019 |
| KR | 20190045885 A | 5/2019 |

OTHER PUBLICATIONS

X. Zhao, J. Chen, A. Said, V. Seregin, H. E. Egilmez and M. Karczewica, "NSST: Non-separable secondary transforms for next generation video coding", Picture Coding Symposium (PCS), pp. 1-5, 2016, 2016.*

Lainema et al., "Wide Angular Intra Prediction for Versatile Video Coding," 2019 Data Compression Conference (DCC), Snowbird, UT, Mar. 26-29, 2019.*

J. Lainema, "CE3: Wide-angle intra prediction," Joint Video Exploration Team (JVET) of ITU-T SG 16 WP 3 and ISO/IEC JTC 1/SC 29/WG 11, JVET-K0046, Ljubljana, SL, Jul. 2018.*

M. Salehifar, M. Koo, J. Lim, S. Kim, "CE 6.2.6: Reduced Secondary Transform (RST)", document JVET-K0099, Ljubljana, SI, Jul. 2018.*

Koo et al., Low Frequency Non-Separable Transform (LFNST), 2019 Picture Coding Symposium (PCS), Nov. 12-15, 2019, Ningbo , China.*

Saxena et al., "On Secondary Transforms for Intra Prediction Residual," 2012.*

"ITU-T SG 16 WP 3 and ISO/IEC JTC 1/SC 29/WG 11", F. Racapé, G. Rath, F. Urban, L. Zhao, S. Liu, X. Zhao, et al., CE3-related: Wide-angle intra prediction for non-square blocks, Jul. 2018.*

Moonmo KOO, et al., "CE6: Reduced Secondary Transform (RST) (CE6-3.1)", Joint Video Experts Team (JVET) of ITU-T SG 16 WP 3 and ISO/IEC JTC 1/SC 29/WG 11, 14th Meeting: Geneva, CH, Mar. 19-27, 2019. JVET-N0193.

Zhao, "Wide Angular Intra Prediction for Versatile Video Coding", IEEE, 2019 Data Compression Conference, Snowbird, Utah, Mar. 26-29, 2019.

* cited by examiner

FIG. 6
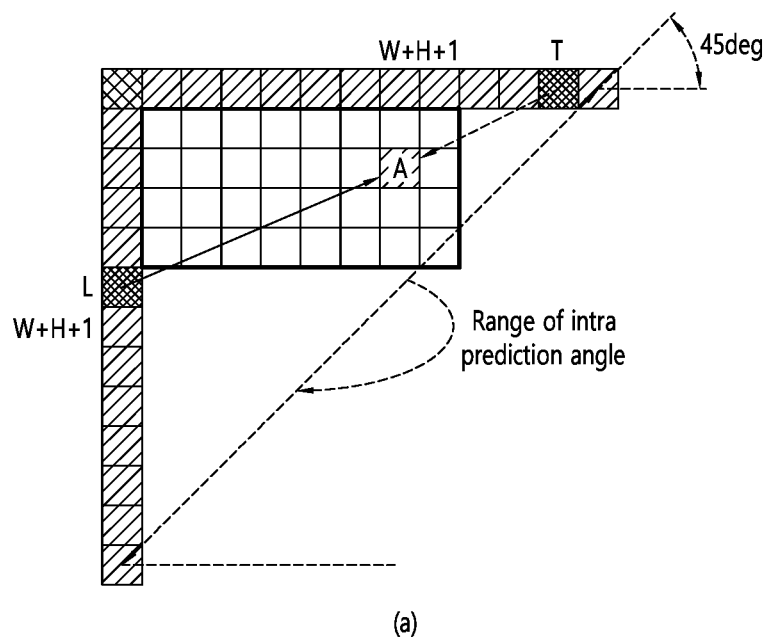
(a)
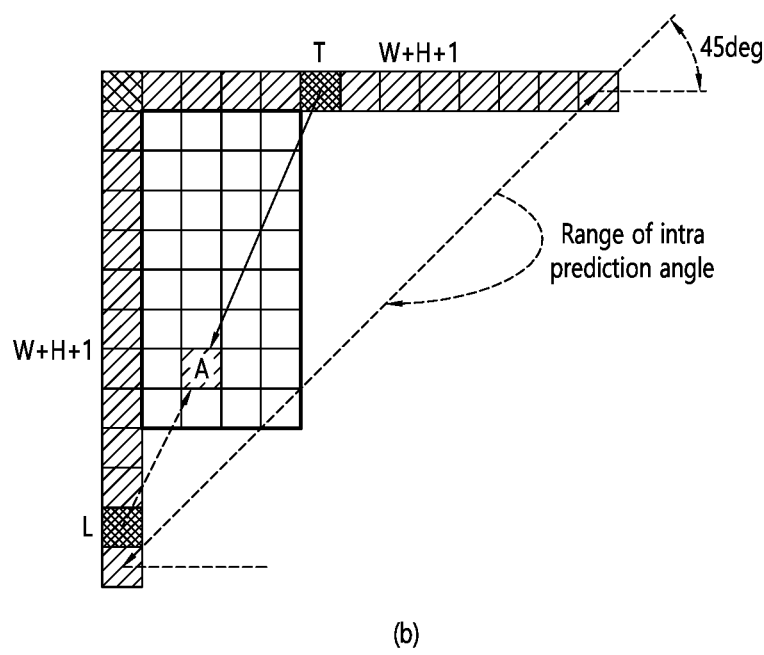
(b)

FIG. 7
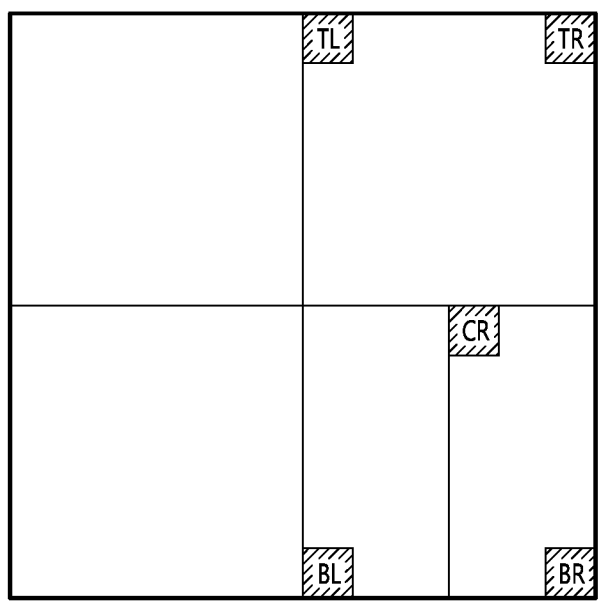
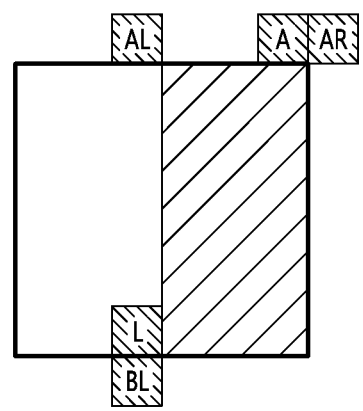
luma block                    chroma block

FIG. 10
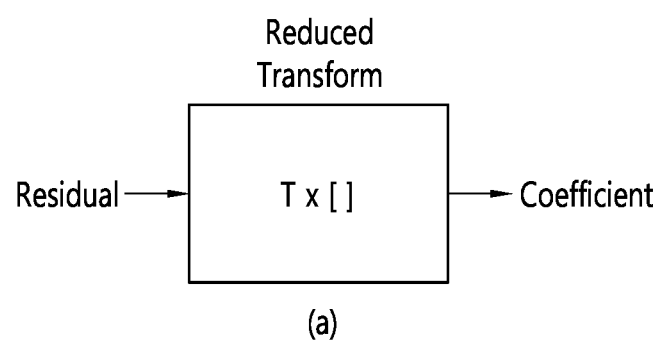
(a)
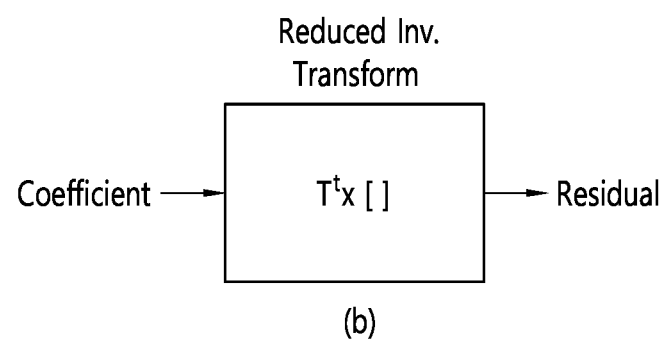
(b)

ions; deriving a modified intra prediction mode through intra prediction mode remapping when wide-angle intra prediction is applied to the current block; determining an LFNST set including LFNST matrices based on the modified intra prediction mode; selecting one of the LFNST matrices based on the LFNST set and the LFNST index; deriving transform coefficients for the current block based on the selected LFNST matrix; and deriving residual samples for the current block based on the transform coefficients.

IMAGE CODING METHOD AND DEVICE ON BASIS OF WIDE-ANGLE INTRA PREDICTION AND TRANSFORM

CROSS-REFERENCE TO RELATED APPLICATIONS

This application is a continuation of U.S. application Ser. No. 17/610,985, filed on Nov. 12, 2021, which is a National Stage filing under 35 U.S.C. of International Application No. PCT/KR2020/006827, filed on May 27, 2020, which claims the benefit of earlier filing date and right of priority to U.S. Provisional Application No. 62/856,134, file on Jun. 2, 2019, U.S. Provisional Application No. 62/853,689, filed May 28, 2019, U.S. Provisional Application No. 62/853,155, filed on May 27, 2019, the contents of which are all hereby incorporated by reference herein in their entirety.

TECHNICAL FIELD

The present disclosure relates to an image coding technique and, more particularly, to a method and an apparatus for coding an image based on wide-angle intra prediction and transform in an image coding system.

RELATED ART

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical aspect of the present disclosure is to provide a method and an apparatus for increasing image coding efficiency.

Another technical aspect of the present disclosure is to provide a method and an apparatus for increasing efficiency in transform index coding.

Still another technical aspect of the present disclosure is to provide a method and an apparatus for coding a transform index in intra prediction in which wide-angle intra prediction is applied.

According to an embodiment of the present disclosure, there is provided an image decoding method performed by a decoding apparatus. The method may include: obtaining intra prediction mode information and an LFNST index from a bitstream; deriving an intra prediction mode for a current block based on the intra prediction mode information; deriving a modified intra prediction mode through intra prediction mode remapping when wide-angle intra prediction is applied to the current block; determining an LFNST set including LFNST matrices based on the modified intra prediction mode; selecting one of the LFNST matrices based on the LFNST set and the LFNST index; deriving transform coefficients for the current block based on the selected LFNST matrix; and deriving residual samples for the current block based on the transform coefficients.

Here, when a partitioning tree structure for the current block is a dual tree type, the LFNST index may be received for each of a luma block and a chroma block. When an intra prediction mode for the chroma block is a direct mode (DM) using the same mode as an intra prediction mode for the luma block, the wide-angle intra prediction may be applied to the chroma block.

When any one of four LFNST sets is determined according to the intra prediction mode applied to the current block, an LFNST set in a case where the modified intra prediction mode ranges from 67 to 80 and an LFNST set in a case where the modified intra prediction mode ranges from −1 to −14 may be the same.

According to another embodiment of the present disclosure, there is provided an image encoding method performed by an encoding apparatus. The method may include: deriving an intra prediction mode for a current block; deriving a modified intra prediction mode through intra prediction mode remapping based on whether wide-angle intra prediction is applied to the current block; deriving prediction samples based on the modified intra prediction mode; deriving residual samples for the current block based on the prediction samples; determining an LFNST set including LFNST matrices based on the modified intra prediction mode; deriving transform coefficients for the current block based on the residual samples, the LFNST set, and the LFNST matrices; and encoding image information including the intra prediction mode and an LFNST index indicating the LFNST matrices.

According to still another embodiment of the present disclosure, there may be provided a digital storage medium that stores image data including encoded image information and a bitstream generated according to an image encoding method performed by an encoding apparatus.

According to yet another embodiment of the present disclosure, there may be provided a digital storage medium that stores image data including encoded image information and a bitstream to cause a decoding apparatus to perform the image decoding method.

According to the present disclosure, it is possible to increase overall image/video compression efficiency.

According to the present disclosure, it is possible to increase efficiency in transform index coding.

A technical aspect of the present disclosure may provide a method and an apparatus for coding a transform index in intra prediction in which wide-angle intra prediction is applied.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure

BRIEF DESCRIPTION OF THE DRAWINGS

FIG. 6 is a diagram illustrating intra prediction for a non-square block according to an embodiment of the present disclosure.

FIG. 7 is a diagram illustrating a DM that is applicable when deriving an intra prediction mode for a chroma block according to an embodiment of the present disclosure.

FIG. 10 is a diagram illustrating an RST according to an embodiment of the present disclosure.

DESCRIPTION OF EXEMPLARY EMBODIMENTS

Figure 1:
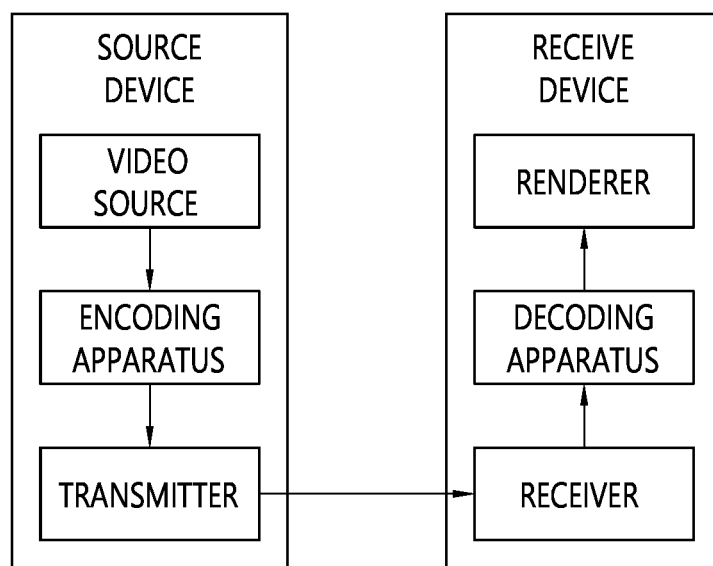
FIG. 1 schematically illustrates an example of a video/image coding system to which the present disclosure is applicable.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively."

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". In other words, the "prediction" of the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

Technical features individually described in one figure in the present disclosure may be individually implemented or may be simultaneously implemented.

FIG. 1 schematically illustrates an example of a video/image coding system to which the present disclosure is applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
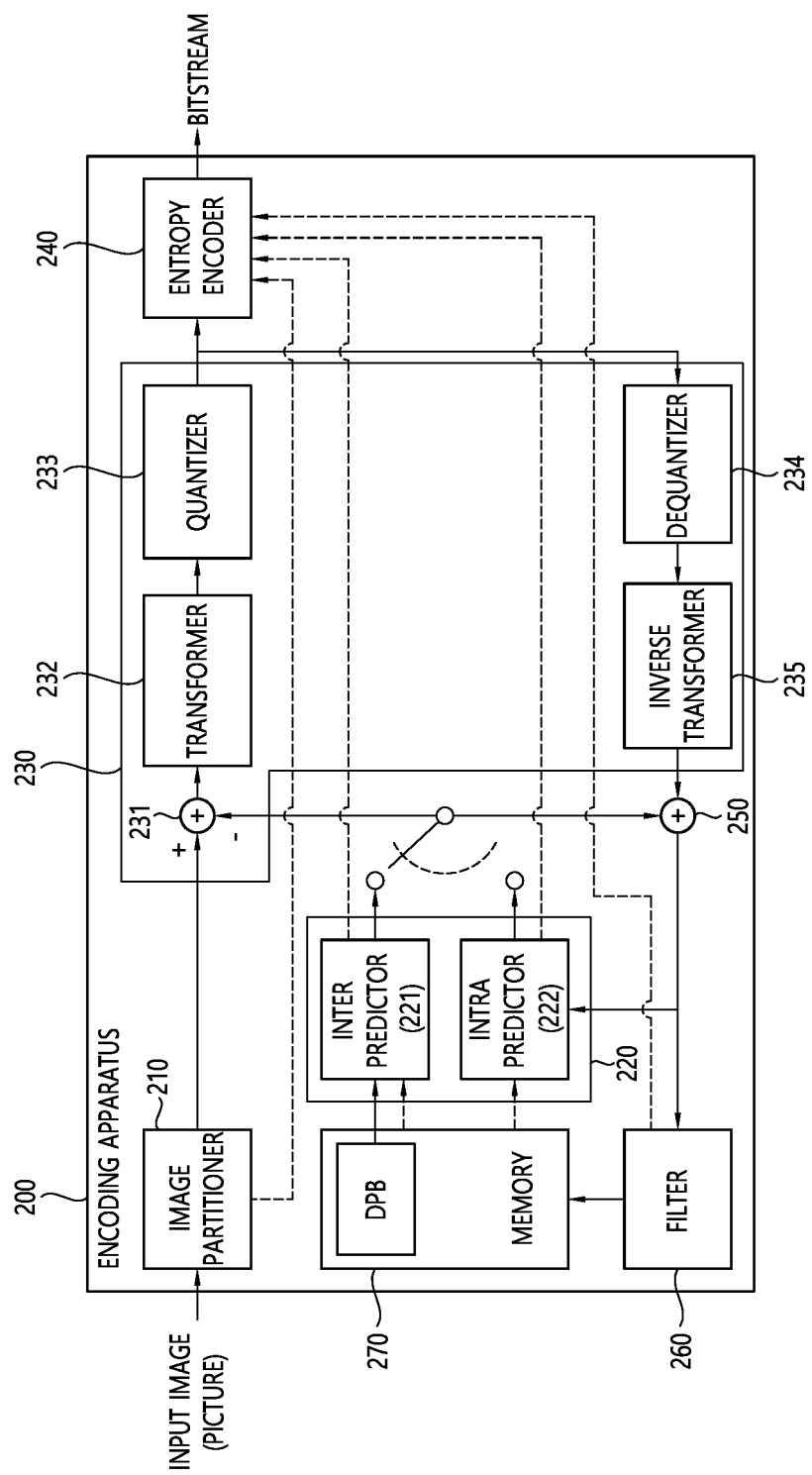
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The subtractor 231 subtracts a prediction signal (predicted block, prediction sample array) output from the predictor 220 from an input image signal (original block, original sample array) to generate a residual signal (residual block, residual sample array), and the generated residual signal is transmitted to the transformer 232. The predictor 220 may perform prediction on a processing target block (hereinafter, referred to as 'current block'), and may generate a predicted block including prediction samples for the current block. The predictor 220 may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loeve transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present disclosure, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing current block as in a case where the skip mode is applied, the predicted block may be used as a reconstructed block. The adder 250 may be called a reconstructor or a reconstructed block generator. The generated reconstructed signal may be used for intra prediction of a next processing current block in the current picture, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
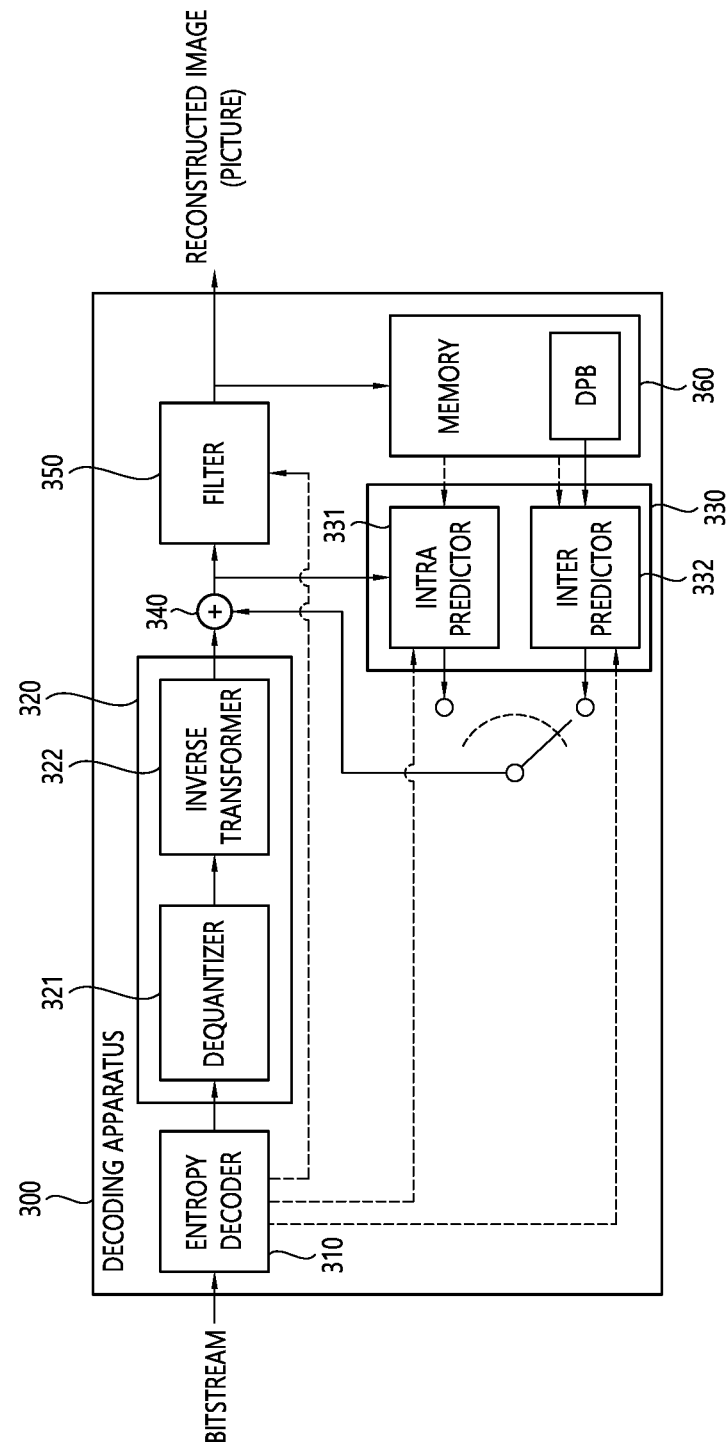
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The deqauntizer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). In addition, the predictor may perform intra block copy (IBC) for prediction on a block. The intra block copy may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In this specification, the examples described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Figure 4:
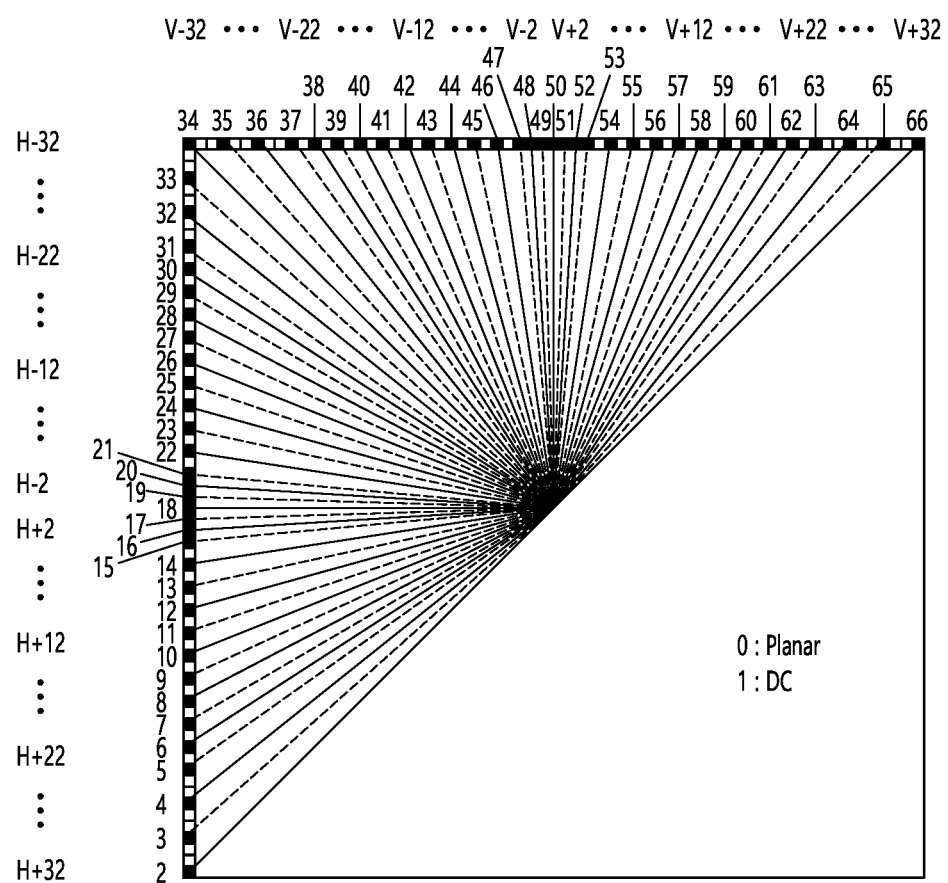
FIG. 4 is a diagram illustrating 67 intra prediction modes according to an embodiment of the present disclosure.

FIG. 4 is a diagram illustrating 67 intra prediction modes according to an embodiment of the present disclosure.

In intra prediction according to an embodiment of the present disclosure, 67 intra prediction modes according to FIG. 4 and Table 1 may be used.

TABLE 1

Intra prediction mode
Intra prediction mode Associated namAssociated name

| | |
|---|---|
| 0 | Intra planar (INTRA_PLANAR) |
| 11 | Intra DC (INTRA_DC) |
| 2, . . . , 66 | INTRA_ANGULAR2 ... INTRA_ANGULAR66Intra angular 2, ..., intra angular 66 (INTRA_ANGULAR2, ..., INTRA_ANGULAR66 |

This is an extension of the existing 35 angular modes to 67 angular modes for intra-encoding and more accurate prediction of high-resolution image. Arrows represented by dotted lines in FIG. 4 indicate 32 newly added angular modes in the 35 angular modes.

The intra planner (INTRA_PLANAR) mode and the intra DC (INTRA_DC) mode are the same as the existing intra planner mode and the existing intra DC mode. The added 32 angular modes may be applied to all block sizes, and may be applied to both intra encoding and decoding of the luminance (luma) component and the chrominance (chroma) component.

Referring to FIG. 4, on the basis of intra prediction mode 34 having a left upward diagonal prediction direction, the intra prediction modes may be divided into intra prediction modes having horizontal directionality and intra prediction modes having vertical directionality. In FIG. 4, H and V denote horizontal directionality and vertical directionality, respectively, and numerals −32 to 32 indicate displacements in 1/32 units on a sample grid position. These numerals may represent an offset for a mode index value. Intra prediction modes 2 to 33 have the horizontal directionality, and intra prediction modes 34 to 66 have the vertical directionality. Strictly speaking, intra prediction mode 34 may be considered as being neither horizontal nor vertical, but may be classified as belonging to the horizontal directionality in determining a transform set of a secondary transform. This is because input data is transposed to be used for a vertical direction mode symmetrical on the basis of intra prediction mode 34, and an input data alignment method for a horizontal mode is used for intra prediction mode 34. Transposing input data means that rows and columns of two-dimensional M×N block data are switched into N×M data. Intra prediction mode 18 and intra prediction mode 50 may represent a horizontal intra prediction mode and a vertical intra prediction mode, respectively, and intra prediction mode 2 may be referred to as a right upward diagonal intra prediction mode because intra prediction mode 2 has a left reference pixel and performs prediction in a right upward direction. Likewise, intra prediction mode 34 may be referred to as a right downward diagonal intra prediction mode, and intra prediction mode 66 may be referred to as a left downward diagonal intra prediction mode As described above, the prediction direction of intra prediction may be defined as 45 degrees to −135 degrees in a clockwise direction. However, when a current block is a non-square block, some existing directional intra prediction modes may be adaptively replaced with a wide-angle intra prediction (WAIP) mode.

Figure 5:
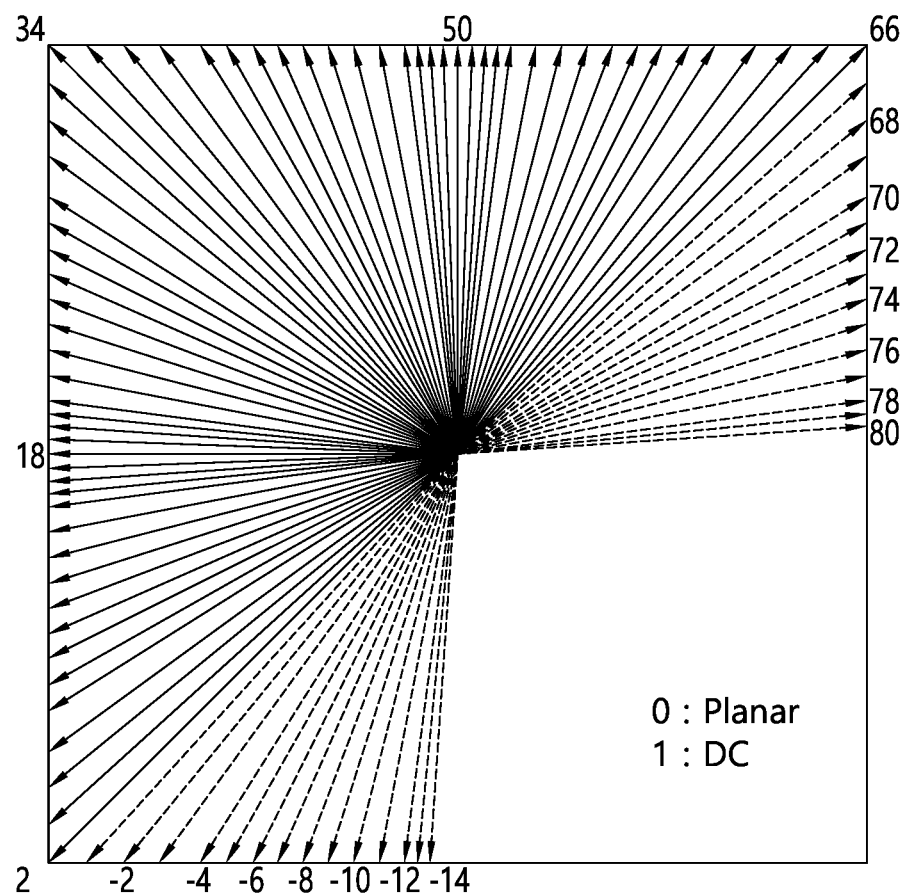
FIG. 5 is a diagram illustrating wide-angle intra prediction modes according to an embodiment of the present disclosure.

FIG. 5 is a diagram illustrating wide-angle intra prediction modes according to an embodiment of the present disclosure.

When wide-angle intra prediction is applied, information on existing intra prediction may be signaled and may be parsed and then remapped to the index of a wide-angle intra prediction mode. Therefore, the total number of intra prediction modes for a specific block (e.g., a non-square block with a specific size) may not be changed, that is, the total number of intra prediction modes is 67, and intra prediction mode coding for the specific block may not be changed.

The reason why the foregoing wide-angle intra prediction method increases the coding efficiency of an image in a specific case will be described with reference to FIG. 6. FIG. 6 is a diagram illustrating intra prediction for a non-square block according to an embodiment of the present disclosure.

As shown in (a) of FIG. 6, when the width of a current prediction block is greater than the height thereof, upper reference pixels are generally close to positions inside the block to be predicted. Therefore, it may be more accurate to perform prediction in a bottom-left direction than in a top-right direction. On the contrary, when the height of the block is greater than the width thereof as shown in (b) of FIG. 6, left reference pixels are generally close to positions inside the block to be predicted. Therefore, it may be more accurate to perform prediction in a top-right direction than in a bottom-left direction. Therefore, it may be favorable to apply remapping to the index of a wide-angle intra prediction mode, i.e., a mode index transform.

Table 2 illustrates a process for deriving a modified intra mode by remapping an intra prediction mode to a wide-angle intra prediction mode.

TABLE 2

8.4.5.2.6 Wide angle intra prediction mode mapping process

Inputs to this process are:
- a variable predModeIntra specifying the intra prediction mode,
- a variable nTbW specifying the transform block width,
- a variable nTbH specifying the transform block height,
- a variable cIdx specifying the colour component of the current block.
Output of this process is the modified intra prediction mode predModeIntra.
The variables nW and nH are derived as follows:
- If IntraSubPartitonsSplitType is equal to ISP_NO_SPLIT or cIdx is not equal to 0, the following applies:
  nW = nTbW  (313)
  nH = nTbH  (314)
- Otherwise ( IntraSubPartitionsSplitType is not equal to ISP_ NO_SPLI T and cIdx is equal to 0 ). the following applies:
  nW = nCbW  (315)
  nH = nCbH  (316)
The variable whRatio is set equal to Abs( Log2( aW/nH ) )
For non-square blocks (nW is not equal to nH), the intra prediction mode predModeIntra is modified as follows:
- If all of the following conditions are true, predModeIntra is set equal to ( predModeIntra + 65 ).
  - nW is greater than nH
  - predModeIntra it greater than or equal to 2
  - predModeIntra is less than ( whRatio. > 1 ) ? ( 8 + 2 * whRatio ) : 8
- Otherwise, if all of the following conditions are true, predModeIntra is set equal to ( predModeIntra − 67 ).
  - nH is greater than nW
  - predModeIntra is less than or equal to 66
  - predModeIntra is greater than ( whRatio > 1 ) ? ( 60 − 2 * whRatio ) : 60

Referring to Table 2, a variable predModeIntra specifying an intra prediction mode, the height and width of a transform block, and the like are used as input values for a wide angle intra prediction mode mapping process, and an output value is a modified intra prediction mode (predModeIntra). The height and width of the transform block or a coding block may be the height and width of the current block for remapping of the intra prediction mode. Here, a variable whRatio reflecting the ratio between the width and the width may be set to Abs(Log 2(nW/nH)).

For a non-square block, the intra prediction mode may be modified according to two separate cases.

First, if all conditions that (1) the width of the current block is greater than the height, (2) the intra prediction mode before a modification is equal to or greater than 2, and (3) the intra prediction mode is less than a value derived as (8+2*whRatio) when whRatio is greater than 1 and as 8 when whRatio is less than or equal to 1 (predModeIntra is less than (whRatio>1)?(8+2*whRatio):8) are satisfied, the intra prediction mode is set to equal to a value of predModeIntra+65.

In another case, if all conditions that (1) the height of the current block is greater than the width, (2) the intra prediction mode before the modification is less than or equal to 66, and (3) the intra prediction mode is greater than a value derived as (60−2*whRatio) when whRatio is greater than 1 and as 60 when whRatio is less than or equal to 1 (pred-ModeIntra is greater than (whRatio>1)?(60−2*whRatio) are satisfied, the intra prediction mode is set to equal to a value of predModeIntra−67.

When a wide-angle intra prediction mode is applied with reference to the process illustrated in Table 2, modes to be subjected to a mode index transform are listed with respect to 67 modes as in Table 3.

TABLE 3

| Condition | Replaced intra prediction modes |
|---|---|
| W / H == 2 | Modes 2,3,4,5,6,7 |
| W / H > 2 | Modes 2,3,4,5,6,7,8,9,10,11,12,13,14,15 |

TABLE 3-continued

| Condition | Replaced intra prediction modes |
|---|---|
| W / H == 1 | None |
| H / W == 1/2 | Modes 61,62,63,64,65,66 |
| H / W < 1/2 | Mode 53,54,55,56,57,58,59,60,61,62,63,64,65,66 |

A mode index for wide-angle intra prediction may be coded as a mode index before the transform. For example, even when mode 2 is transformed into mode 67 in a 67-mode configuration, a previous mode index value of 2 may be coded.

When intra prediction is performed on the current block, prediction of a luma component block (luma block) of the current block and prediction of a chroma component block (chroma block) thereof may be performed. In this case, an intra-prediction mode for a chroma component (chroma block) may be set separately from an intra-prediction mode for a luma component (luma block).

In the present specification, a "chroma block", a "chroma image", and the like may refer to the same meaning as a chrominance block, a chrominance image, and the like, and thus chroma and chrominance may be interchangeably used. Likewise, a "luma block", a "luma image", and the like may refer to the same meaning as a luminance block, a luminance image, and the like, and thus luma and luminance may be interchangeably used.

In this specification, a "current chroma block" may refer to a chroma component block of a current block that is a current coding unit, and a "current luma block" may refer to a luma component block of the current block that is the current coding unit. Therefore, the current luma block and the current chroma block correspond to each other. However, the current luma block and the current chroma block do not always have the same block shape and the same number of blocks, and may have different block shapes and different numbers of blocks depending on a case. In some cases, the current chroma block may correspond to a current luma region, in which case the current luma region may include at least one luma block.

The intra prediction mode for the chroma component may be indicated based on intra chroma prediction mode information, and the intra chroma prediction mode information may be signaled in the form of an intra_chroma_pred_mode syntax element. For example, the intra chroma prediction mode information may indicate one of a planar mode, a DC mode, a vertical mode, a horizontal mode, a derived mode (DM), and a CCLM mode. Here, when the 67 intra prediction modes illustrated in FIG. 4 are used, the planar mode may indicate intra prediction mode 0, the DC mode may indicate intra prediction model, the vertical mode may indicate intra prediction mode 50, and the horizontal mode may indicate intra prediction mode 18. The DM may also be referred to as a direct mode. The CCLM may be referred to as an LM.

The DM and the CCLM are dependent intra prediction modes for predicting a chroma block using information on a luma block. The DM may refer to a mode in which the same intra prediction mode as the intra prediction mode for the luma component is applied as the intra prediction mode for the chroma component. The CCLM may refer to an intra prediction mode in which reconstructed samples of the luma block are subsampled in a process of generating a prediction block for the chroma block, and then samples derived by applying CCLM parameters α and β to the subsampled samples are used as prediction samples for the chroma block.

FIG. 7 is a diagram illustrating a DM that is applicable when deriving an intra prediction mode for a chroma block according to an embodiment of the present disclosure.

As described above, the DM may be defined as a prediction mode that uses the intra prediction direction of a luminance block that is at the same position as a current chroma block as it is. In the present specification, a chroma intra prediction mode that directly uses an intra prediction mode for a luma block (luminance block) to derive a chroma intra mode or that can be derived using or from a luma mode may be referred to as the DM.

In a joint exploration test model (JEM) used in the Joint Video Exploration Team (JVET), the DM, which is an existing single mode, is extended to a plurality of modes for use.

That is, when configuring an intra prediction mode for a chroma image, prediction modes of blocks covering positions shown in FIG. 7 may be selected as a plurality of DM modes and used for intra prediction. Using one DM selected from among a plurality of DMs for a luma block as a candidate for an intra prediction mode for a chroma block may be referred to as multiple DM signaling (MDMS).

A process for deriving the DM may be as follows.
(1) Intra prediction mode for center (CR), top-left (TL), top-bottom (TR), bottom-left (BL), and bottom-right (BR) positions of the luminance block at the same position as the chroma block (2) Intra prediction mode for left (L), above (A), BL, above-right (AR), and above-left (AL) blocks, which are neighboring blocks of the current chroma block
(3) Planner mode, DC mode
(4) Directional mode of previously selected directional mode (directional mode selected in (1) and (2)) −1 or +1
(5) Vertical mode, horizontal mode, mode 2, 34, 66, 10, 26
(6) When five prediction modes are not selected through the above process, the previously selected mode is copied and selected When there is a plurality of directional modes in (4), a directional mode of a first directional mode −1 or +1 may be selected, and then a directional mode of a second direction mode −1 or +1 may be selected. In this manner, directional modes of a plurality of directional modes −1 or +1 may be sequentially selected, and five prediction modes may be finally selected as candidate modes through (6).

Modes 10 and 26 that can be selected in (5) correspond to prediction mode numbers when there are 67 intra prediction modes.

Figure 8:
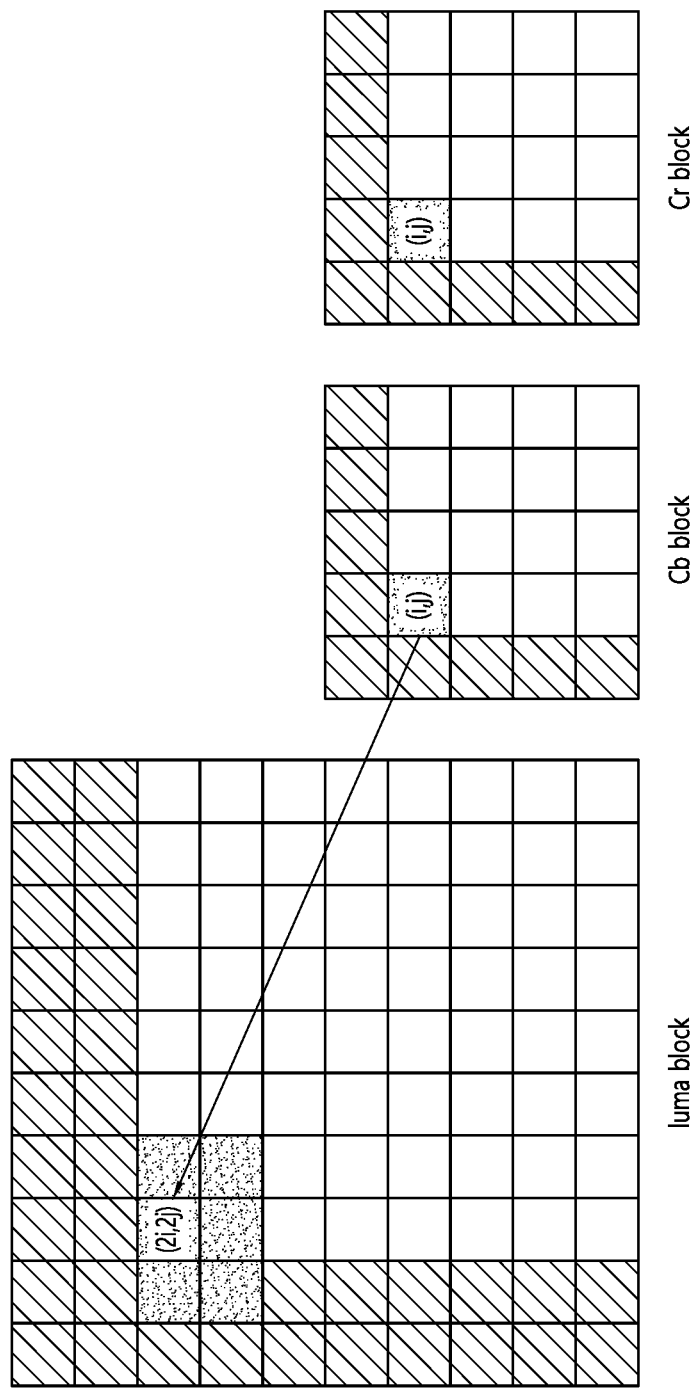
FIG. 8 is a diagram illustrating a CCLM that is applicable when deriving an intra prediction mode for a chroma block according to an embodiment.

FIG. 8 is a diagram illustrating a CCLM that is applicable when deriving an intra prediction mode for a chroma block according to an embodiment.

In the present specification, a "reference sample template" may refer to a set of neighboring reference samples of a current chroma block for predicting the current chroma block. The reference sample template may be predefined, and information on the reference sample template may be signaled from the encoding apparatus 200 to the decoding apparatus 300.

Referring to FIG. 8, a set of samples shaded in one line around a 4×4 block that is a current chroma block indicates a reference sample template. It is shown in FIG. 8 that the reference sample template is configured in one line of reference samples, while a reference sample region in a luma region corresponding to the reference sample template is configured in two lines.

In an embodiment, when intra encoding of a chroma image is performed in a joint exploration test model (JEM) used in the Joint Video Exploration Team (JVET), a cross component linear model (CCLM) may be used. The CCLM is a method for predicting a pixel value of a chroma image from a pixel value of a reconstructed luminance image, and is based on a characteristic of a high correlation between a luminance image and a chroma image.

CCLM prediction of Cb and Cr chroma images may be based on the following equation.

$$\text{Pred}_C(i,j) = \alpha \cdot \text{Rec}'_L(i,j) + \beta \quad \text{[Equation 1]}$$

Here, $\text{pred}_C(i, j)$ denotes a Cb or Cr chroma image to be predicted, $\text{Rec}_L'(i, j)$ denotes a reconstructed luminance image adjusted to a chroma block size, and (i, j) denotes the coordinates of a pixel. In a 4:2:0 color format, since the size of a luminance image is twice that of a chroma image, $\text{Rec}_L'$ with the chroma block size needs to be generated through downsampling, and therefore the chroma image predc (i,j), pixels of the luminance image to be used for the chroma image $\text{pred}_c$ (i, j) may be employed considering both $\text{Rec}_L$ (2i, 2j) and neighboring pixels. RecL'(i,j) may be referred to as a down-sampled luma sample.

For example, $\text{Rec}_L'(i,j)$ may be derived using six neighboring pixels as shown in the following equation.

$$\text{Rec}'_L(x,y) = 2 \times \text{Rec}_L(2x,2y) + 2 \times \text{Rec}_L(2x,2y+1) + \text{Rec}_L(2x-1,2y) + \text{Rec}_L(2x+1,2y) + \text{Rec}_L*2x-1,wy+1) + \text{Rec}_L(2x+1,2y+1) + 4 \gg 3 \quad \text{[Equation 2]}$$

α and β denote a cross-correlation and an average difference between a neighboring template of the Cb or Cr chroma block and a neighboring template of the luminance block in the shaded region in FIG. 8. For example, α and β are represented by Equation 3.

$$\alpha = \frac{N \cdot \sum (L(n) \cdot C(n)) - \sum L(n) \cdot \sum C(n)}{N \cdot \sum (L(n) \cdot L(n)) - \sum L(n) \cdot \sum L(n)}$$

$$\beta = \frac{\sum C(n) - \alpha \cdot \sum L(n)}{N}$$

[Equation 3]

L(n) denotes neighboring reference samples and/or left neighboring samples of a luma block corresponding to a current chroma image, C(n) denotes neighboring reference samples and/or left neighboring samples of the current chroma block to which encoding is currently applied, and (i, j) denotes a pixel position. In addition, L(n) may denote down-sampled upper neighboring samples and/or left neighboring samples of the current luma block. N may denote the total number of pixel pair (luminance and chroma) values used for calculation of a CCLM parameter, and may indicate a value that is twice a smaller value of the width and the height of the current chroma block.

Pictures may be divided into a sequence of coding tree units (CTUs). A CTU may correspond to a coding tree block (CTB). Alternatively, the CTU may include a coding tree block of luma samples and two coding tree blocks of corresponding chroma samples. A tree type may be classified as a single tree (SINGLE_TREE) or a dual tree (DUAL_TREE) according to whether a luma block and a corresponding chroma block have an individual partition structure. A single tree may indicate that the chroma block has the same partition structure as the luma block, and a dual tree may indicate that the chroma component block has a partition structure different from that of the luma block.

Hereinafter, a transform process entailing an image coding or decoding process of the present disclosure will be described.

Figure 9:
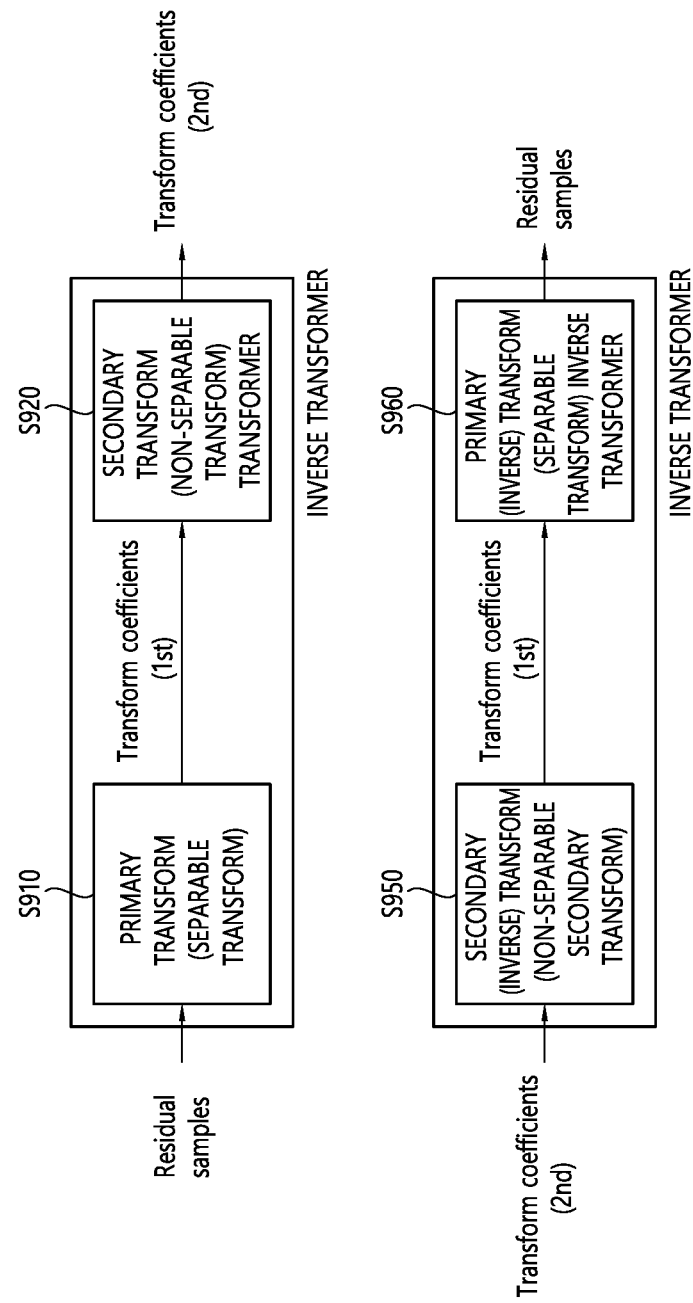
FIG. 9 schematically illustrates a multiple transform scheme according to an embodiment of the present disclosure.

FIG. 9 schematically illustrates a multiple transform technique according to an embodiment of the present disclosure.

Referring to FIG. 9, a transformer may correspond to the transformer in the encoding apparatus of foregoing FIG. 2, and an inverse transformer may correspond to the inverse transformer in the encoding apparatus of foregoing FIG. 2, or to the inverse transformer in the decoding apparatus of FIG. 3.

The transformer may derive (primary) transform coefficients by performing a primary transform based on residual samples (residual sample array) in a residual block (S910). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the primary transform coefficients may be called temporary transform coefficients from the viewpoint of the transformer.

In other words, when the conventional transform method is applied, transform coefficients might be generated by applying transform from a space domain to a frequency domain for a residual signal (or residual block) based on the DCT type 2. Unlike to this, when the multiple core transform is applied, transform coefficients (or primary transform coefficients) may be generated by applying transform from a space domain to a frequency domain for a residual signal (or residual block) based on the DCT type 2, the DST type 7, the DCT type 8, and/or DST type 1. Herein, the DCT type 2, the DST type 7, the DCT type 8, and the DST type 1 may be called a transform type, transform kernel or transform core. These DCT/DST transform types can be defined based on basis functions.

When the multiple core transform is performed, a vertical transform kernel and a horizontal transform kernel for a current block may be selected from among the transform kernels, a vertical transform may be performed on the current block based on the vertical transform kernel, and a horizontal transform may be performed on the current block based on the horizontal transform kernel. Here, the horizontal transform may indicate a transform on horizontal components of the current block, and the vertical transform may indicate a transform on vertical components of the current block. The vertical transform kernel/horizontal transform kernel may be adaptively determined based on a prediction mode and/or a transform index for the current block (CU or subblock) including a residual block.

Further, according to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trTypeVer value of 0 may be set to DCT2, a trTypeHor or trTypeVer value of 1 may be set to DST7, and a trTypeHor or trTypeVer value of 2 may be set to DCT8.

In this case, MTS index information may be encoded and signaled to the decoding apparatus to indicate any one of a plurality of transform kernel sets. For example, an MTS index of 0 may indicate that both trTypeHor and trTypeVer values are 0, an MTS index of 1 may indicate that both trTypeHor and trTypeVer values are 1, an MTS index of 2 may indicate that the trTypeHor value is 2 and the trTypeVer value. Is 1, an MTS index of 3 may indicate that the trTypeHor value is 1 and the trTypeVer value is 2, and an MTS index of 4 may indicate that both trTypeHor and trTypeVer values are 2.

In one example, transform kernel sets according to MTS index information are illustrated in the following table.

TABLE 4

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may derive modified (secondary) transform coefficients by performing the secondary transform based on the (primary) transform coefficients (S920). The primary transform is a transform from a spatial domain to a frequency domain, and the secondary transform refers to transforming into a more compressive expression by using a correlation existing between (primary) transform coefficients. The secondary transform may include a non-separable transform. In this case, the secondary transform may be called a non-separable secondary transform (NSST), or a mode-dependent non-separable secondary transform (MDNSST). The non-separable secondary transform may represent a transform which generates modified transform coefficients (or secondary transform coefficients) for a residual signal by secondary-transforming, based on a non-separable transform matrix, (primary) transform coefficients derived through the primary transform. At this time, the vertical transform and the horizontal transform may not be applied separately (or horizontal and vertical transforms may not be applied independently) to the (primary) transform coefficients, but the transforms may be applied at once based on the non-separable transform matrix. In other words, the non-separable secondary transform may represent a transform method in which the vertical and horizontal components of the (primary) transform coefficients are not separated, and for example, two-dimensional signals (transform coefficients) are re-arranged to a one-dimensional signal through a certain determined direction (e.g., row-first direction or column-first direction), and then modified transform coefficients (or secondary transform coefficients) are generated based on the non-separable transform matrix. For example, according to a row-first order, M×N blocks are disposed in a line in an order of a first row, a second row, . . . , and an Nth row. According to a column-first order, M×N blocks are disposed in a line in an order of a first column, a second column, . . . , and an Nth column. The non-separable secondary transform may be applied to a top-left region of a block configured with (primary) transform coefficients (hereinafter, may be referred to as a transform coefficient block). For example, if the width (W) and the height (H) of the transform coefficient block are all equal to or greater than 8, an 8×8 non-separable secondary transform may be applied to a top-left 8×8 region of the transform coefficient block. Further, if the width (W) and the height (H) of the transform coefficient block are all equal to or greater than 4, and the width (W) or the height (H) of the transform coefficient block is less than 8, then a 4×4 non-separable secondary transform may be applied to a top-left min(8,W)×min(8,H) region of the transform coefficient block. However, the embodiment is not limited to this, and for example, even if only the condition that the width (W) or height (H) of the transform coefficient block is equal to or greater than 4 is satisfied, the 4×4 non-separable secondary transform may be applied to the top-left min(8,W)×min(8,H) region of the transform coefficient block.

Specifically, for example, if a 4×4 input block is used, the non-separable secondary transform may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$ [Equation 4]

If the X is represented in the form of a vector, the vector $\vec{X}$ may be represented as below.

$$\vec{X} = [X_{00}\, X_{01}\, X_{02}\, X_{03}\, X_{10}\, X_{11}\, X_{12}\, X_{13}\, X_{20}\, X_{21}\, X_{22}\, X_{23}\, X_{30}\, X_{31}\, X_{32}\, X_{33}]^T$$ [Equation 5]

In Equation 5, the vector $\vec{X}$ is a one-dimensional vector obtained by rearranging the two-dimensional block X of Equation 4 according to the row-first order.

In this case, the secondary non-separable transform may be calculated as below.

$$\vec{F} = T \cdot \vec{X}$$ [Equation 6]

In this equation, $\vec{F}$ represents a transform coefficient vector, and T represents a 16×16 (non-separable) transform matrix.

Through foregoing Equation 6, a 16×1 transform coefficient vector $\vec{F}$ may be derived, and the $\vec{F}$ may be re-organized into a 4×4 block through a scan order (horizontal, vertical, diagonal and the like). However, the above-described calculation is an example, and hypercube-Givens transform (HyGT) or the like may be used for the calculation of the non-separable secondary transform in order to reduce the computational complexity of the non-separable secondary transform.

Meanwhile, in the non-separable secondary transform, a transform kernel (or transform core, transform type) may be selected to be mode dependent. In this case, the mode may include the intra prediction mode and/or the inter prediction mode.

As described above, the non-separable secondary transform may be performed based on an 8×8 transform or a 4×4 transform determined based on the width (W) and the height (H) of the transform coefficient block. The 8×8 transform refers to a transform that is applicable to an 8×8 region included in the transform coefficient block when both W and H are equal to or greater than 8, and the 8×8 region may be a top-left 8×8 region in the transform coefficient block. Similarly, the 4×4 transform refers to a transform that is applicable to a 4×4 region included in the transform coefficient block when both W and H are equal to or greater than 4, and the 4×4 region may be a top-left 4×4 region in the transform coefficient block. For example, an 8×8 transform kernel matrix may be a 64×64/16×64 matrix, and a 4×4 transform kernel matrix may be a 16×16/8×16 matrix.

Here, to select a mode-dependent transform kernel, two non-separable secondary transform kernels per transform set for a non-separable secondary transform may be configured for both the 8×8 transform and the 4×4 transform, and there may be four transform sets. That is, four transform sets may be configured for the 8×8 transform, and four transform sets may be configured for the 4×4 transform. In this case, each of the four transform sets for the 8×8 transform may include two 8×8 transform kernels, and each of the four transform sets for the 4×4 transform may include two 4×4 transform kernels.

However, as the size of the transform, that is, the size of a region to which the transform is applied, may be, for example, a size other than 8×8 or 4×4, the number of sets may be n, and the number of transform kernels in each set may be k.

The transform set may be referred to as an NSST set or an LFNST set. A specific set among the transform sets may be selected, for example, based on the intra prediction mode of the current block (CU or subblock). A low-frequency non-separable transform (LFNST) may be an example of a reduced non-separable transform, which will be described later, and represents a non-separable transform for a low frequency component.

According to an example, the four transform sets according to the intra prediction mode may be mapped, for example, as shown in the following table.

TABLE 5

| lfnstPredModeIntra | lfnstTrSetIdx |
|---|---|
| lfnstPredModeIntra < 0 | 1 |
| 0 <= lfnstPredModeIntra <= 1 | 0 |
| 2 <= lfnstPredModeIntra <= 12 | 1 |
| 13 <= lfnstPredModeIntra <= 23 | 2 |
| 24 <= lfnstPredModeIntra <= 44 | 3 |
| 45 <= lfnstPredModeIntra <= 55 | 2 |
| 56 <= lfnstPredModeIntra <= 80 | 1 |
| 81 <= lfnstPredModeIntra <= 83 | 0 |

As shown in Table 5, any one of the four transform sets, that is, lfnstTrSetIdx, may be mapped to any one of four indexes, that is, 0 to 3, according to the intra prediction mode.

When it is determined that a specific set is used for the non-separable transform, one of k transform kernels in the specific set may be selected through a non-separable secondary transform index. An encoding apparatus may derive a non-separable secondary transform index indicating a specific transform kernel based on a rate-distortion (RD) check and may signal the non-separable secondary transform index to a decoding apparatus. The decoding apparatus may select one of the k transform kernels in the specific set based on the non-separable secondary transform index. For example, lfnst index value 0 may refer to a first non-separable secondary transform kernel, lfnst index value 1 may refer to a second non-separable secondary transform kernel, and lfnst index value 2 may refer to a third non-separable secondary transform kernel. Alternatively, lfnst index value 0 may indicate that the first non-separable secondary transform is not applied to the current block, and lfnst index values 1 to 3 may indicate the three transform kernels.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S950), and may obtain a residual block (residual samples) by performing a primary (inverse) transform on the (primary) transform coefficients (S960). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The decoding apparatus may further include a secondary inverse transform application determinator (or an element to determine whether to apply a secondary inverse transform) and a secondary inverse transform determinator (or an element to determine a secondary inverse transform). The secondary inverse transform application determinator may determine whether to apply a secondary inverse transform. For example, the secondary inverse transform may be an NSST, an RST, or an LFNST and the secondary inverse transform application determinator may determine whether to apply the secondary inverse transform based on a secondary transform flag obtained by parsing the bitstream. In another example, the secondary inverse transform application determinator may determine whether to apply the secondary inverse transform based on a transform coefficient of a residual block.

The secondary inverse transform determinator may determine a secondary inverse transform. In this case, the secondary inverse transform determinator may determine the secondary inverse transform applied to the current block based on an LFNST (NSST or RST) transform set specified according to an intra prediction mode. In an embodiment, a secondary transform determination method may be determined depending on a primary transform determination method. Various combinations of primary transforms and secondary transforms may be determined according to the intra prediction mode. Further, in an example, the secondary inverse transform determinator may determine a region to which a secondary inverse transform is applied based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

Meanwhile, in the present disclosure, a reduced secondary transform (RST) in which the size of a transform matrix (kernel) is reduced may be applied in the concept of NSST in order to reduce the amount of computation and memory required for the non-separable secondary transform.

Meanwhile, the transform kernel, the transform matrix, and the coefficient constituting the transform kernel matrix, that is, the kernel coefficient or the matrix coefficient, described in the present disclosure may be expressed in 8 bits. This may be a condition for implementation in the decoding apparatus and the encoding apparatus, and may reduce the amount of memory required to store the transform kernel with a performance degradation that can be reasonably accommodated compared to the existing 9 bits or 10 bits. In addition, the expressing of the kernel matrix in 8 bits may allow a small multiplier to be used, and may be more suitable for single instruction multiple data (SIMD) instructions used for optimal software implementation.

In the present specification, the term "RST" may mean a transform which is performed on residual samples for a current block based on a transform matrix whose size is reduced according to a reduced factor. In the case of performing the reduced transform, the amount of computation required for transform may be reduced due to a reduction in the size of the transform matrix. That is, the RST may be used to address the computational complexity issue occurring at the non-separable transform or the transform of a block of a great size.

RST may be referred to as various terms, such as reduced transform, reduced secondary transform, reduction transform, simplified transform, simple transform, and the like, and the name which RST may be referred to as is not limited to the listed examples. Alternatively, as mentioned above, since the RST is mainly performed in a low frequency region including a non-zero coefficient in a transform block, it may be referred to as a Low-Frequency Non-Separable Transform (LFNST).

Meanwhile, when the secondary inverse transform is performed based on RST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the current block based on the inverse primary transform of the modified transform coefficients. The inverse primary transform refers to the inverse transform of the primary transform applied to the residual. In the present disclosure, deriving a transform coefficient based on a transform may refer to deriving a transform coefficient by applying the transform.

FIG. 10 is a diagram illustrating an RST according to an embodiment of the present disclosure.

In the present disclosure, a "current block" may refer to a current block to be coded, a residual block, or a transform block.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, simplified factor, simple factor or other various terms. Meanwhile, R may be referred to as a reduced coefficient, but according to circumstances, the reduced factor may mean R. Further, according to circumstances, the reduced factor may mean the N/R value.

In an example, the reduced factor or the reduced coefficient may be signaled through a bitstream, but the example is not limited to this. For example, a predefined value for the reduced factor or the reduced coefficient may be stored in each of the encoding apparatus 200 and the decoding apparatus 300, and in this case, the reduced factor or the reduced coefficient may not be signaled separately.

The size of the reduced transform matrix according to an example may be R×N less than N×N, the size of a conventional transform matrix, and may be defined as in Equation 7 below.

$$T_{RxN} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$ [Equation 7]

The matrix T in the Reduced Transform block shown in FIG. 10(a) may mean the matrix $T_{R\times N}$ of Equation 7. As shown in FIG. 10(a), when the reduced transform matrix $T_{R\times N}$ is multiplied to residual samples for the current block, transform coefficients for the current block may be derived.

In an example, if the size of the block to which the transform is applied is 8×8 and R=16 (i.e., R/N=16/64=¼), then the RST according to FIG. 10(a) may be expressed as a matrix operation as shown in Equation 8 below. In this case, memory and multiplication calculation can be reduced to approximately ¼ by the reduced factor.

In the present disclosure, a matrix operation may be understood as an operation of multiplying a column vector by a matrix, disposed on the left of the column vector, to obtain a column vector.

$$\begin{bmatrix} t_{1,1} & t_{1,2} & t_{1,3} & \cdots & t_{1,64} \\ t_{2,1} & t_{2,2} & t_{2,3} & & t_{2,64} \\ \vdots & & & \ddots & \vdots \\ t_{16,1} & t_{16,2} & t_{16,3} & \cdots & t_{16,64} \end{bmatrix} \times \begin{bmatrix} r_1 \\ r_2 \\ \vdots \\ r_{64} \end{bmatrix}$$ [Equation 8]

In Equation 8, $r_1$ to $r_{64}$ may represent residual samples for the current block and may be specifically transform coefficients generated by applying a primary transform. As a result of the calculation of Equation 8 transform coefficients ci for the current block may be derived, and a process of deriving ci may be as in Equation 9.

```
for i from to R:
    ci = 0
    for j from 1 to N
        ci += tij * rj
```
[Equation 9]

As a result of the calculation of Equation 9, transform coefficients $c_1$ to $c_R$ for the current block may be derived. That is, when R=16, transform coefficients $c_1$ to $c_{16}$ for the current block may be derived. If, instead of RST, a regular transform is applied and a transform matrix of 64×64 (N×N) size is multiplied to residual samples of 64×1 (N×1) size, then only 16 (R) transform coefficients are derived for the current block because RST was applied, although 64 (N) transform coefficients are derived for the current block. Since the total number of transform coefficients for the current block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the RST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the current block by performing the primary transform and the RST-based secondary transform on residual samples for the current block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the current block based on the inverse primary transform for the modified transform coefficients.

The size of the inverse RST matrix $T_{N \times R}$ according to an example is N×R less than the size N×N of the regular inverse transform matrix, and is in a transpose relationship with the reduced transform matrix $T_{R \times N}$ shown in Equation 7.

The matrix Tt in the Reduced Inv. Transform block shown in FIG. 10(b) may mean the inverse RST matrix $T_{R \times N}^T$ (the superscript T means transpose). When the inverse RST matrix $T_{R \times N}^T$ is multiplied to the transform coefficients for the current block as shown in FIG. 10(b), the modified transform coefficients for the current block or the residual samples for the current block may be derived. The inverse RST matrix $T_{R \times N}^T$ may be expressed as $(T_{R \times N}^T)_{N \times R}$.

More specifically, when the inverse RST is applied as the secondary inverse transform, the modified transform coefficients for the current block may be derived when the inverse RST matrix $T_{R \times N}^T$ is multiplied to the transform coefficients for the current block. Meanwhile, the inverse RST may be applied as the inverse primary transform, and in this case, the residual samples for the current block may be derived when the inverse RST matrix $T_{R \times N}^T$ is multiplied to the transform coefficients for the current block.

In an example, if the size of the block to which the inverse transform is applied is 8×8 and R=16 (i.e., R/N=16/64=¼), then the RST according to FIG. 10(b) may be expressed as a matrix operation as shown in Equation 10 below.

$$\begin{bmatrix} t_{1,1} & t_{2,1} & & t_{16,1} \\ t_{1,2} & t_{2,2} & \cdots & t_{16,2} \\ t_{1,3} & t_{2,3} & & t_{16,3} \\ \vdots & \vdots & & \vdots \\ \vdots & \vdots & \ddots & \vdots \\ t_{1,64} & t_{2,64} & \cdots & t_{16,64} \end{bmatrix} \times \begin{bmatrix} c_1 \\ c_2 \\ \vdots \\ c_{16} \end{bmatrix}$$ [Equation 10]

In Equation 10, $c_1$ to $c_{16}$ may represent the transform coefficients for the current block. As a result of the calculation of Equation 10, $r_i$ representing the modified transform coefficients for the current block or the residual samples for the current block may be derived, and the process of deriving $r_i$ may be as in Equation 11.

```
for i from to N:
    ri = 0
    for j from 1 to R
        ri += tj, i * cj
```
[Equation 11]

As a result of the calculation of Equation 11, $r_1$ to $r_N$ representing the modified transform coefficients for the current block or the residual samples for the current block may be derived. When considered from the viewpoint of the size of the inverse transform matrix, the size of the regular inverse transform matrix is 64×64 (N×N), but the size of the reduced inverse transform matrix is reduced to 64×16 (R×N), so memory usage in a case of performing the inverse RST can be reduced by an R/N ratio when compared with a case of performing the regular inverse transform. In addition, when compared to the number of multiplication calculations N×N in a case of using the regular inverse transform matrix, the use of the reduced inverse transform matrix can reduce the number of multiplication calculations by the R/N ratio (N×R).

A transform set configuration shown in Table 5 may also be applied to an 8×8 RST. That is, the 8×8 RST may be applied according to a transform set in Table 5. Since one transform set includes two or three transforms (kernels) according to an intra prediction mode, it may be configured to select one of up to four transforms including that in a case where no secondary transform is applied. In a transform where no secondary transform is applied, it may be considered to apply an identity matrix. Assuming that indexes 0, 1, 2, and 3 are respectively assigned to the four transforms (e.g., index 0 may be allocated to a case where an identity matrix is applied, that is, a case where no secondary transform is applied), a transform index or an lfnst index as a syntax element may be signaled for each transform coefficient block, thereby designating a transform to be applied. That is, for a top-left 8×8 block, through the transform index, it is possible to designate an 8×8 RST in an RST configuration, or to designate an 8×8 lfnst when the LFNST is applied. The 8×8 lfnst and the 8×8 RST refer to transforms applicable to an 8×8 region included in the transform coefficient block when both W and H of the current block to be transformed are equal to or greater than 8, and the 8×8 region may be a top-left 8×8 region in the transform coefficient block. Similarly, a 4×4 lfnst and a 4×4 RST refer to transforms applicable to a 4×4 region included in the transform coefficient block when both W and H of the current block to are equal to or greater than 4, and the 4×4 region may be a top-left 4×4 region in the transform coefficient block.

According to an embodiment of the present disclosure, for a transform in an encoding process, only 48 pieces of data may be selected and a maximum 16×48 transform kernel matrix may be applied thereto, rather than applying a 16×64 transform kernel matrix to 64 pieces of data forming an 8×8 region. Here, "maximum" means that m has a maximum value of 16 in an m×48 transform kernel matrix for generating m coefficients. That is, when an RST is performed by applying an m×48 transform kernel matrix (m≤16) to an 8×8 region, 48 pieces of data are input and m coefficients are generated. When m is 16, 48 pieces of data are input and 16 coefficients are generated. That is, assuming that 48 pieces of data form a 48×1 vector, a 16×48 matrix and a 48×1 vector are sequentially multiplied, thereby generating a 16×1 vector. Here, the 48 pieces of data forming the 8×8 region may be properly arranged, thereby forming the 48×1 vector. For example, 48 pieces of data existing in a region other than a bottom-right 4×4 region in the 8×8 region may form a 48×1 vector. Here, when a matrix operation is performed by applying a maximum 16×48 transform kernel matrix, 16 modified transform coefficients are generated, and the 16 modified transform coefficients may be arranged in a top-left 4×4 region according to a scanning order, and a top-right 4×4 region and a bottom-left 4×4 region may be filled with zeros.

For an inverse transform in a decoding process, the transposed matrix of the foregoing transform kernel matrix may be used. That is, when an inverse RST or LFNST is performed in an inverse transform process performed by the decoding apparatus, input coefficient data to which the inverse RST is applied is configured in a one-dimensional vector according to a predetermined arrangement order, and a modified coefficient vector obtained by multiplying the one-dimensional vector and a corresponding inverse RST matrix on the left of the one-dimensional vector may be arranged in a two-dimensional block according to a predetermined arrangement order.

In summary, in the transform process, when an RST or LFNST is applied to an 8×8 region, a matrix operation of 48 transform coefficients in top-left, top-right, and bottom-left regions of the 8×8 region excluding the bottom-right region among transform coefficients in the 8×8 region and a 16×48 transform kernel matrix. For the matrix operation, the 48 transform coefficients are input in a one-dimensional array. When the matrix operation is performed, 16 modified transform coefficients are derived, and the modified transform coefficients may be arranged in the top-left region of the 8×8 region.

On the contrary, in the inverse transform process, when an inverse RST or LFNST is applied to an 8×8 region, 16 transform coefficients corresponding to a top-left region of the 8×8 region among transform coefficients in the 8×8 region may be input in a one-dimensional array according to a scanning order and may be subjected to a matrix operation with a 48×16 transform kernel matrix. That is, the matrix operation may be expressed as (48×16 matrix)*(16×1 transform coefficient vector)=(48×1 modified transform coefficient vector). Here, an n×1 vector may be interpreted to have the same meaning as an n×1 matrix and may thus be expressed as an n×1 column vector. Further, * denotes matrix multiplication. When the matrix operation is performed, 48 modified transform coefficients may be derived, and the 48 modified transform coefficients may be arranged in top-left, top-right, and bottom-left regions of the 8×8 region excluding a bottom-right region.

When a secondary inverse transform is based on an RST, the inverse transformer 235 of the encoding apparatus 200 and the inverse transformer 322 of the decoding apparatus 300 may include an inverse reduced secondary transformer to derive modified transform coefficients based on an inverse RST on transform coefficients and an inverse primary transformer to derive residual samples for a current block based on an inverse primary transform on the modified transform coefficients. The inverse primary transform refers to the inverse transform of a primary transform applied to a residual. In the present disclosure, deriving a transform coefficient based on a transform may refer to deriving the transform coefficient by applying the transform.

When wide-angle intra prediction is applied in intra prediction and thus an intra prediction mode is reset, re-indexed, or remapped, a method for configuring an intra prediction mode for a non-separable secondary transformation, that is, an LFNST, may be discussed.

According to an example, a non-separable secondary transform may be applied based on a new or modified intra prediction mode, in which case there may be various examples for setting a variable for applying the modified intra prediction mode to the transform sets of Table 5.

According to an example, when an intra prediction mode (predModeIntra) is derived for intra prediction and wide-angle intra prediction is applied to a current block, the derived intra prediction mode may be updated or remapped corresponding to the wide-angle intra prediction. The intra mode modified by remapping may be set as a variable predModeIntra the same as the intra mode before modification. The variable predModeIntra for the final intra prediction mode may be utilized as an intra prediction mode of a transform set for the LFNST.

According to another example, the variable predModeIntra for the final intra prediction mode may be reset as the intra prediction mode (lfnstPredModeIntra) of the transform set for LFNST.

Alternatively, according to an example, when the LFNST is applied instead of the intra prediction mode derived from the intra prediction, a new variable lfnstPredModeIntra may be set by applying wide-angle intra prediction. An image processing process according to the present embodiment may be shown below in Tables 6 to 22.

TABLE 6

7.3.2.3 Sequence parameter set RBSP syntax

| seq_parameter_set_rbsp( ) { | Descriptor |
|---|---|
| ...... | |
| sps_mts_enabled_flag | u(1) |
| if( sps_mts_enabled_flag ) { | |
| sps_explicit_mts_intra_enabled_flag | u(1) |
| sps_explicit_mts_inter_enabled_flag | u(1) |
| } | |
| ...... | |
| sps_lfnst_enabled_flag | u(1) |
| ...... | |
| } | |

7.4.3.3 Sequence parameter set RBSP semantics

......

sps_lfnst_enabled_flag equal to 1 specifies that lfnst_idx may be present in the residual coding syntax for intra coding units.

sps_lfnst_enabled_flag equal to 0 specifies that lfnst_idx is not present in the residual coding syntax for intra coding units.

· · · · · ·

Table 6 shows signaling of a syntax element sps_lfnst_enabled_flag indicating whether a non-separable secondary transform is applied in an image decoding process, that is, whether a transform index indicating whether a non-separable secondary transform is applied, which is lfnst_idx, exists. lfnst_idx may be signaled in residual coding syntax or coding unit syntax.

TABLE 7

7.3.7.5 Coding unit syntax

| coding_unit( x0, y0, cbWidth, cbHeight, treeType ) { | Descriptor |
|---|---|
| ... | |
| } | |
| numSigCoeff = 0 | |
| numZeroOutSigCoeff = 0 | |
| transform_tree( x0, y0, cbWidth, cbHeight, treeType ) | |
| lfnstWidth = ( treeType == DUAL_TREE_CHROMA ) ?  cbWidth / SubWidthC : cbWidth | |
| lfnstHeight = ( treeType == DUAL_TREE_CHROMA ) ?  cbHeight / SubHeightC : cbHeight | |

TABLE 7-continued

```
      if ( Min( lfnstWidth, lfnstHeight ) >= 4 && sps_lfnst_enabled_flag = =
1 &&
           CuPredMode[ x0 ][ y0 ] = = MODE_INTRA &&
           IntraSubPartitionsSplitType = ISP_NO_SPLIT &&
           1intra_mip_flag[ x0 ][ y0 ] ) {
             if( ( numSigCoeff > ( ( treeType == SINGLE_TREE ) ? 2 : 1 ) ) &&
                 numZeroOutSigCoeff == 0 ) {
                lfnst_idx[ x0 ][ y0 ]ae(v)                                    ae(v)
             }
         }
      }
  }
}
```

7.4.8.5 Coding unit semantics
......
lfnst_idx[ x0 ][ y0 ] specifies which low frequency non-separable transform kernal is
applied between two candidate kernals in a selected transorm set. lfnst_idx[ x0 ][ y0 ]
equal to 0 specifies that the low frequency non-separable transform is not applied. The array
indices x0, y0 specify the location ( x0, y0 ) of the top-left sample of the considered
transform block relative to the top-left sample of the picture.
When lfnst_idx [ x0 ][ y0 ] is not present, lfnst_idx[ x0 ][ y0 ] is inferred to be equal to 0.

Table 7 shows that lfnst_idx is signaled in the coding unit syntax. lfnst_idx may indicate any one of two transform kernel matrices included in a transform set, and lfnst_idx of 0 may indicate that the non-separable secondary transform, that is, the LFNST, is not applied.

Table 8 shows that an intra prediction mode for applying wide-angle intra prediction is newly set in a transform process.

As shown in Table 8, when lfnst_idx of Table 7 is not 0, various variables for the LFNST are derived. In a first step,

TABLE 8

8.7.4. Transformation process for scaled transform coefficients
8.7.4.1 General

Inputs to this process are:
- a luma location( xTbY, yTbY ) specifying the top-left sample of the current luma transform block relative to
  the top-left luma sample of the current picture,
- a variable nTbW specifying the width of the current transform block,
- a variable nTbW specifying the height of the current transform height,
- a variable cIdx specifying the colour component of the current block,
- an (nTbW)x(nTbH) array d[ x ][ y ] of scaled transform coefficients with x = 0..nTbW − 1, y = 0..nTbH − 1.
Output of this process is the (nTbW)x(nTbH) array r[ x ][ y ] of residual samples with x = 0..nTbW − 1,
y = 0..nTbH − 1.
If lfnst_idx[ xTbY ][ yTbY ] is not equal to 0 and both nTbW and nTbH are greater than or equal to 4, the
following applies
    1.  The variables nLfnstSize, log2LfnstSize, numLfnstX, numLfnstY, nonZeroSize, whRatio and
        lfnstPredModeIntra are derived as follows:
        - If both nTbW and nTbH are greater than or equal to 8, log2LfnstSize is set to 3 and nLfnstOutSize
          is set to 48.
        - Otherwise, log2LfnstSize is set to 2 and nLfnstOutSize is set to 16.
        - If nTbH is equal to 4 and nTbW is greater than S, numLfnstX set equal to 2.
        - Otherwise, numLfnstX set equal to 1.
        - If nTbW is equal to 4 and nTbH is greater than 8, numLfnstY set equal to 2.
        - Otherwise, numLfnstY set equal to 1.
        - If both nTbW and nTbH are equal to 4 or both nTbW and nTbH are equal to 8, nonZeroSize is set
          equal to 8.
        - Otherwise, nonZeroSize set equal to 16.
        - If cIdx is equal to 0, lfnstPredModeIntra is set to IntraPredModeY[ xTbY ][ yTbY ].
        - Otherwise, lfnstPredModeIntra is set to IntraPredModeC[ xTbY ][ yTbY ].
        - The variable whRatio is set equal to Abs( Log2( nTbW/nTbH ) ).
    2.  For non-square blocks (nTbW is not equal to nTbH), the intra prediction mode lfnstPredModeIntra is
        modified as follows:
        - If all of the following conditions are true, lfnstPredModeIntra is set equal to
          ( lfnstPredModeIntra + 65 ).
        - nTbW is greater than nTbH
        - lfnstPredModeIntra is greater than or equal to 2
        - lfnstPredModeIntra is less than ( whRatio > 1 ) ? ( 8 + 2 * whRatio ) : 8
        - Otherwise, if all of the following conditions are true, lfnstPredModeIntra is set equal to
          ( lfnstPredModeIntra − 67 ).
        - nTbH is greater than nTbW|
        - lfnstPredModeIntra is less than or equal to 66
        - lfnstPredModeIntra is greater than ( whRatio > 1 ) ? ( 60 − 2 * whRatio ) : 60 when a current block is non-square, a variable whRatio representing the ratio between the height and width of the current block is set (Abs(Log 2(nTbW/nTbH))), and an intra prediction mode (lfnstPredModeIntra) for a secondary transform is set to an intra prediction mode IntraPredMode of the current block.

In a second step, when the current block is non-square, lfnstPredModeIntra is remapped into a new intra prediction mode. Since this process is the same as described with reference to Table 2, a redundant description is omitted.

When the intra prediction mode (lfnstPredModeIntra) reflecting the wide-angle intra prediction is newly derived, the non-separable secondary transform (LFNST) may be performed based on the variable lfnstPredModeIntra.

TABLE 10-continued

| lfnstPredModeIntra | lfnstTrSetIdx |
|---|---|
| 0 <= lfnstPredModeIntra <= 1 | 0 |
| 2 <= lfnstPredModeIntra <= 12 | 1 |
| 13 <= lfnstPredModeIntra <= 23 | 2 |
| 24 <= lfnstPredModeIntra <= 44 | 3 |
| 45 <= lfnstPredModeIntra <= 55 | 2 |
| 56 <= lfnstPredModeIntra <= 80 | 1 |
| 81 <= lfnstPredModeIntra <= 83 | 0 |

TABLE 9

8.7.4.4 Low frequency non-separable transformation process

Inputs to this process are:
- a variable nTrS specifying the transform output length,
- a variable nonZeroSize specifying the transform input length,
- a list of tansform input x[ j ] with j = 0..nonZeroSize − 1,
- a variable lfnstPredModeIntra specifying the index for transform set selection,
- a variable lfnstIdx specifying the index for transform section in a set.
Output of this process is the list of transformed samples y[ i ] with i = 0..nTrS − 1.
The transformation matrix derivation process as specified in clause 8.7.4.5 is involved with the transform output length nTrS, the index for transform set selection lfnstPredModeIntra, and the index for transform selection in a transform set lfnstIdx as inputs, and the transformation matrix lowFreqTransMatix as output.
The list of transformed samples y[ i ] with i = 0..nTrS − 1 is derived as follows:
y[i] = Clip3( CoeffMin, CoeffMax, ( ( $\Sigma_{j=0}^{nonZeroSize-1}$ lowFreqTransMatrix[i][j] * x[j] ) + 64 ) >> 7 ) with i = 0..nTrS − 1

Table 9 shows derivation a list of transformed samples y[i] dequantized through a transform kernel matrix (low-frequency non-separable transform process), in which lfnstPredModeIntra corresponding to an index (lfnstPredModeIntra) for selecting a transform set is used as an input value. A transform set may be selected based on LfnstPredModeIntra, and various transform kernel matrices may be applied according to a transform index indicating any one of the transform sets. Table 10 to Table 22 show transform kernel matrices (lowFreqTransMatrix) according to transform indices for a 4×4 LFNST and an 8×8 LFNST.

TABLE 10

8.7.4.5 Low frequency non-separable transformation matrix derivation process

Inputs to this process are:
 a variable nTrS specifying the transform output length,
 a variable lfnstPredModeIntra specifying the index for transform set selection,
 a variable lfnstIdx specifying the index for transform selection in the designated transform set.
Output of this process is the transformation matrix lowFreqTransMatrix.
The variable lfnstTrSetIdx is derived as follows:

Table 10 shows a transform set index (lfnstTrSetIdx) according to an intra prediction mode (lfnstPredModeIntra) reflecting a wide-angle intra prediction mode. According to Table 10, in a prediction mode corresponding to wide-angle intra prediction, that is, if lfnstPredModeIntra is less than 0 (lfnstPredModeIntra<0) or lfnstPredModeIntra ranges from 56 to 80 (56<=lfnstPredModeIntra<=80), the transform set index (lfnstTrSetIdx) may be derived as 1.

Table 11 to Table 14 sequentially show two transform kernel matrices that can be included in each set when the transform set index ranges from 0 to 3 in the 4×4 LFNST. The transform kernel matrices in Table 11 to Table 14 may be derived based on nTrS indicating the size of transform coefficients output after the LFNST, a transform set index (lfnstTrSetIdx), and a transform index (lfnstIdx). According to an example, the size nTrS of the transform coefficients in the 4×4 LFNST may be 16.

TABLE 11

If nTrS is equal to 16, lfnstTrSetIdx is equal to 0, and lfnstIdx is equal to 1, the following applies:
lowFreqTransMatrix [ m ][ n ] =
{
| { | 108 | −44 | −15 | 1 | −44 | 19 | 7 | −1 | −11 | 6 | 2 | −1 | 0 | −1 | −1 | 0 | } |
|---|---|---|---|---|---|---|---|---|---|---|---|---|---|---|---|---|---|
| { | −40 | −97 | 56 | 12 | −11 | 29 | −12 | −3 | 18 | 18 | −15 | −3 | −1 | −3 | 2 | 1 | } |
| { | 25 | −31 | −1 | 7 | 100 | −16 | −29 | 1 | −54 | 21 | 14 | −4 | −7 | 2 | 4 | 0 | } |
| { | −32 | −39 | −92 | 51 | −6 | −16 | 36 | −8 | 3 | 22 | 18 | −15 | 4 | 1 | −5 | 2 | } |
| { | 8 | −9 | 33 | −8 | −16 | −102 | 36 | 23 | −4 | 38 | −27 | −5 | 5 | 16 | −8 | −6 | } |
| { | −25 | 5 | 16 | −3 | −38 | 14 | 11 | −3 | −97 | 7 | 26 | 1 | 55 | −10 | −19 | 3 | } |
| { | 8 | 9 | 16 | 1 | 37 | 36 | 94 | −38 | −7 | 3 | −47 | 11 | −6 | −13 | −17 | 10 | } |
| { | 2 | 34 | −5 | 1 | −7 | 24 | −25 | −3 | 8 | 99 | −28 | −29 | 6 | −43 | 21 | 11 | } |

TABLE 11-continued

| { | −16 | −27 | −39 | −109 | 6 | 10 | 16 | 24 | 3 | 19 | 10 | 24 | −4 | −7 | −2 | −3 | } |
| { | −9 | −10 | −34 | 4 | −9 | −5 | −29 | 5 | −33 | −26 | −96 | 33 | 14 | 4 | 39 | −14 | } |
| { | −13 | 1 | 4 | −9 | −30 | −17 | −3 | −64 | −35 | 11 | 17 | 19 | −86 | 6 | 36 | 14 | } |
| { | 8 | −7 | −5 | −15 | 7 | −30 | −28 | −87 | 31 | 4 | 4 | 33 | 61 | −5 | −17 | 22 | } |
| { | −2 | 13 | −6 | −4 | −2 | 28 | −13 | −14 | −3 | 37 | −15 | −3 | −2 | 107 | −36 | −24 | } |
| { | 4 | 9 | 11 | 31 | 4 | 9 | 16 | 19 | 12 | 33 | 32 | 94 | 12 | 0 | 34 | −45 | } |
| { | 2 | −2 | 8 | −16 | 8 | 5 | 28 | −17 | 6 | −7 | 18 | −45 | 40 | 36 | 97 | −8 | } |
| { | 0 | −2 | 0 | −10 | −1 | −7 | −3 | −35 | −1 | −7 | −2 | −32 | −6 | −33 | −16 | −112 | } |
| }, |

If nTrS is equal to 16, lfnstTrSetIdx is equal to 0, and lfnstIdx is equal to 2, the following applies:
lowFreqTransMatrix [ m ][ n ] =
{

| { | 119 | −30 | −22 | −3 | −23 | −2 | 3 | 2 | −16 | 3 | 6 | 0 | −3 | 2 | 1 | 0 | } |
| { | −27 | −101 | 31 | 17 | −47 | 2 | 22 | 3 | 19 | 30 | −7 | −9 | 3 | 3 | −5 | −1 | } |
| { | 0 | 58 | 22 | −15 | −102 | 2 | 38 | 2 | 10 | −13 | −5 | 4 | 14 | −1 | −9 | 0 | } |
| { | 23 | 4 | 66 | −11 | 22 | 89 | −2 | −26 | 13 | −8 | −38 | −1 | −9 | −20 | −2 | 8 | } |
| { | −19 | −5 | −89 | 2 | −26 | 76 | −11 | −17 | 20 | 13 | 18 | −4 | 1 | −15 | 3 | 5 | } |
| { | −10 | −1 | −1 | 6 | 23 | 25 | 67 | −7 | −74 | 4 | 39 | −5 | 0 | −1 | −20 | −1 | } |
| { | −17 | −28 | 12 | −8 | −32 | 14 | −53 | −6 | −68 | −67 | 17 | 29 | 2 | 6 | 25 | 4 | } |
| { | 1 | −24 | −23 | 1 | 17 | −7 | 52 | 9 | 50 | −92 | −15 | 27 | −15 | −10 | −6 | 3 | } |
| { | −6 | −17 | −2 | −111 | 7 | −17 | 8 | −42 | 9 | 18 | 16 | 25 | −4 | 2 | −1 | 11 | } |
| { | 9 | 5 | 35 | 0 | 6 | 21 | −9 | 34 | 44 | −3 | 102 | 11 | −7 | 13 | 11 | −20 | } |
| { | 4 | −5 | −5 | −10 | 15 | 19 | −2 | 6 | 6 | −12 | −13 | 6 | 95 | 69 | −29 | −24 | } |
| { | −6 | −4 | −9 | −39 | 1 | 22 | 0 | 102 | −19 | 19 | −32 | 30 | −16 | −14 | −9 | −23 | } |
| { | 4 | −4 | 7 | 8 | 4 | −13 | −18 | 5 | 0 | 0 | 21 | 22 | 58 | −88 | −54 | 28 | } |
| { | −4 | −7 | 0 | −24 | −7 | 0 | −25 | 3 | −3 | −30 | 8 | −76 | −34 | 4 | −80 | −26 | } |
| { | 0 | 6 | 0 | 30 | −6 | 1 | −13 | −23 | 1 | 20 | −2 | 80 | −44 | 37 | −68 | 1 | } |
| { | 0 | 0 | −1 | 5 | −1 | −7 | 1 | −34 | −2 | 3 | −6 | 19 | 5 | −38 | 11 | −115 | } |
| }, |

TABLE 12

- If nTrS is equal to 16, lfnstTrSetIdx is equal to 1, and lfnstIdx is equal to 1, the following applies:

lowFreqTransMatrix [ m ][ n ] =
{

| { | −111 | 39 | 4 | 3 | 44 | 11 | −12 | −1 | 7 | −16 | −5 | 2 | 3 | −1 | 4 | 2 | } |
| { | −47 | −27 | 15 | −1 | −92 | 43 | 20 | −2 | 20 | 39 | −5 | 10 | −5 | −13 | 2 | } |
| { | −35 | −23 | 4 | 4 | −17 | −72 | 32 | 6 | −59 | 18 | 50 | −6 | 0 | 40 | 0 | −13 | } |
| { | 13 | 93 | −27 | −4 | −48 | 13 | −34 | 4 | −52 | 11 | 1 | 10 | 3 | 16 | −3 | 1 | } |
| { | −11 | −27 | 1 | 2 | −47 | −4 | −36 | 10 | −2 | −85 | 14 | 29 | −20 | −2 | 57 | 4 | } |
| { | 0 | −35 | 32 | −2 | 26 | 60 | −3 | −17 | −82 | 1 | 0 | −37 | 21 | 3 | 12 | } |
| { | −17 | −46 | −92 | 14 | 7 | −10 | −39 | 29 | −17 | 27 | −28 | 17 | 1 | −15 | −13 | 17 | } |
| { | 4 | −10 | −23 | 4 | 16 | 58 | −17 | 26 | 30 | 21 | 67 | 2 | −13 | 59 | 13 | −40 | } |
| { | 5 | −20 | 32 | −5 | 8 | −3 | −46 | −7 | −4 | 2 | −15 | 24 | 100 | 44 | 0 | 5 | } |
| { | −4 | −1 | 38 | −18 | −7 | −42 | −63 | −6 | 33 | 34 | −23 | 15 | −65 | 33 | −20 | 2 | } |
| { | −2 | −10 | 35 | −19 | 5 | 8 | −44 | 14 | −25 | 25 | 58 | 17 | 7 | −84 | −16 | −18 | } |
| { | 5 | 13 | 18 | 34 | 11 | −4 | 18 | 18 | 5 | 58 | −3 | 42 | −2 | −10 | 85 | 38 | } |
| { | −5 | −7 | −34 | −83 | 2 | −1 | −4 | −73 | 4 | 20 | 15 | −12 | 4 | −3 | 44 | 12 | } |
| { | 0 | 4 | −2 | −60 | 5 | 9 | 42 | 34 | 5 | −14 | 9 | 80 | −5 | 13 | −38 | 37 | } |
| { | −1 | 2 | 7 | −57 | 3 | −7 | 9 | 68 | −9 | 6 | −49 | −20 | 6 | −4 | 36 | −64 | } |
| { | −1 | 0 | −12 | 23 | 1 | −4 | 17 | −53 | −3 | 4 | −21 | 72 | −4 | −8 | −3 | −83 | } |
| }, |

- If nTrS is equal to 16, lfnstTrSetIdx is equal to 1, and lfnstIdx is equal to 2, the following applies:

lowFreqTransMatrix [ m ][ n ] =
{

| { | 88 | −55 | 6 | −3 | −66 | 27 | 9 | −2 | 11 | 11 | −13 | 1 | −2 | −7 | 1 | 2 | } |
| { | −58 | −20 | 27 | −2 | −27 | 75 | −29 | 0 | 47 | −42 | −11 | 11 | −9 | −3 | 19 | −4 | } |
| { | −51 | 23 | −22 | 5 | −63 | 3 | 37 | −5 | 1 | 64 | −35 | −4 | 29 | −31 | −11 | 13 | } |
| { | −27 | −76 | 49 | −2 | 40 | 14 | 9 | −17 | −56 | 36 | −25 | 6 | 14 | 3 | −6 | 8 | } |
| { | 19 | −4 | −35 | 22 | 52 | 7 | 36 | −23 | 28 | −17 | −64 | 15 | −5 | −44 | 48 | 9 | } |
| { | 29 | 50 | 13 | −10 | 1 | 34 | −59 | 1 | −51 | 4 | −16 | 30 | 52 | −33 | 24 | −5 | } |
| { | −12 | −21 | −74 | 43 | −13 | 39 | 18 | −5 | −58 | −35 | 27 | −5 | 19 | 26 | 6 | −5 | } |
| { | 19 | 38 | −10 | −5 | 28 | 66 | 0 | −5 | −4 | 19 | −30 | −26 | −40 | 28 | −60 | 37 | } |
| { | −6 | 27 | 18 | −5 | −37 | −18 | 12 | −25 | −44 | −10 | −38 | 37 | −66 | 45 | 40 | −7 | } |
| { | −13 | −28 | −45 | −39 | 0 | −5 | −39 | 69 | −23 | 16 | −12 | −18 | −50 | −31 | 24 | 13 | } |
| { | −1 | 8 | 24 | −51 | −15 | −9 | 44 | 10 | −28 | −70 | −12 | −39 | 24 | −18 | −4 | 51 | } |
| { | −8 | −22 | −17 | 33 | −18 | −45 | −57 | −27 | 0 | −31 | −30 | 29 | −2 | −13 | −53 | 49 | } |
| { | 1 | 12 | 32 | 51 | −8 | 8 | −2 | −31 | −22 | 4 | 46 | −39 | −49 | −67 | 14 | 17 | } |
| { | 4 | 5 | 24 | 60 | −5 | −14 | −23 | 38 | 9 | 8 | −34 | −59 | 24 | 47 | 42 | 28 | } |
| { | −1 | −5 | −20 | −34 | 4 | 4 | −15 | −46 | 18 | 31 | 42 | 10 | 10 | 27 | 49 | 76 | } |
| { | −3 | −7 | −22 | −34 | −5 | −11 | −36 | −69 | −1 | −3 | −25 | −73 | 5 | 4 | 4 | −49 | } |
| }, |

TABLE 13

- If nTrS is equal to 16, lfnstTrSetIdx is equal to 2, and lfnstIdx is equal to 1,
    the following applies:
lowFreqTransMatrix [ m ][ n ] =
{
{ -112   47   -2    2  -34   13    2    0   15   -7    1    0    8   -3   -1    0 }
{   29   -7    1   -1 -108   40    2    0  -45   13    4   -1    8   -5    1    0 }
{  -36  -87   69  -10  -17  -33   26   -2    7   14  -11    2    6    8   -7    0 }
{   28   -5    2   -2  -29   13   -2    0  103  -36   -4    1   48  -16   -4    1 }
{  -12  -24   15   -3   26   80  -61    9   15   54  -36    2    0   -4    6   -2 }
{   18   53   69  -74   14   24   28  -30   -6   -7  -11   12   -5   -7   -6    8 }
{    5   -1    2    0  -26    6    0    1   45   -9   -1    0 -113   28    8   -1 }
{  -13  -32   18   -2   15   34  -27    7  -25  -80   47   -1  -16  -50   28    2 }
{   -4  -13  -10   19   18   46   60  -48   16   33   60  -48    1    0    5   -2 }
{   15   33   63   89    8   15   25   40   -4   -8  -15   -8   -2   -6   -9   -7 }
{   -8  -24  -27   15   12   41   26  -29  -17  -50  -39   27    0   35  -67   26 }
{   -2   -6  -24   13   -1   -6   37  -22    3   18  -51   22  -23  -95   17   17 }
{   -3   -7  -16  -21   10   24   46   75    8   20   38   72    1    2    1    7 }
{    2    6   10   -3   -5  -16  -31   12    7   24   41  -16  -16  -41  -89   49 }
{    4    8   21   40   -4  -11  -28  -57    5   14   31   70    7   18   32   52 }
{    0    1    4   11   -2   -4  -13  -34    3    7   20   47   -6  -19  -42 -101 }
},

- If nTrS is equal to 16, lfnstTrSetIdx is equal to 2, and lfnstIdx is equal to 2,
    the following applies:
lowFreqTransMatrix [ m ][ n ] =
{
{  -99   39   -1    2   65  -20   -5    0  -15   -2    5   -1    0    3   -1    0 }
{   58   42  -33    3   33  -63   23   -1  -55   32    3   -5   21   -2   -8    3 }
{  -15   71  -44    5  -58  -29   25    3   62   -7   -4   -4  -19    4    0    1 }
{   46    5    4   -6   71  -12  -15    5   52  -38   13   -2  -63   23    3   -3 }
{  -14  -54  -29   29   25   -9   61  -29   27   44  -48    5  -27  -21   12    7 }
{   -3    3   69  -42  -11  -50  -26   26   24   63  -19   -5  -18  -22   12    0 }
{   17   16   -2    1   38   18  -12    0   62    1  -14    5   89  -42    8   -2 }
{   15   54   -8    6    6   60  -26   -8  -30   17  -38   22  -43  -45   42   -7 }
{   -6  -17  -55  -28    9   30   -8   58    4   34   41  -52  -16  -36  -20   16 }
{   -2   -1   -9  -79    7   11   48   44  -13  -34  -56    6   12   23   20  -11 }
{    7   29   14   -6   12   53   10  -11   14   59  -15   -3    5   71  -54   13 }
{   -5  -24  -53   15   -3  -15  -61   26    6   30  -16   23   13   56   44  -35 }
{    4    8   21   52   -1   -1   -5   29   -7  -17  -44  -84    8   20   31   39 }
{   -2  -11  -25   -4   -4  -21  -53    2   -5  -26  -64   19   -8  -16  -73   39 }
{   -3   -5  -23  -57   -2   -4  -24  -75    1    3    9  -25    6   15   41   61 }
{    1    1    7   18    1    2   16   47    2    5   24   67    3    9   25   88 }
},

TABLE 14

- If nTrS is equal to 16, lfnstTrSetIdx is equal to 3, and lfnstIdx is equal to 1,
    the following applies:
lowFreqTransMatrix [ m ][ n ] =
{
{ -114   37    3    2  -22  -22  -14    3   21  -17   -5    2    5    2   -4   -1 }
{  -19  -41   19   -2   85  -60  -11    7   17   31  -34    2  -11   19    2   -8 }
{   36  -25   18   -2  -42  -53   35    5   46  -80  -25   19    6   21  -33   -1 }
{  -27  -33   44   -3  -58    1  -29   13  -41  -18  -12   -7   12  -17    7   -6 }
{  -11  -21   37  -10   44   -4   47  -12  -37  -41   55   18   10   -4  -16   31 }
{   15   47   10   -6  -16  -44   42   10  -90   25  -40   21  -22   -2    3  -14 }
{   13   25   79  -33  -13   10   31   -4   49   45   12   -5    3   -1   43    7 }
{   16   11  -26   13  -13  -74  -20   -1    5   -8   29  -47   26  -49   54    3 }
{   -3  -34  -26    7  -26  -19   29  -37    1   22   46   -9  -31   37   14   20 }
{   -6  -30  -42  -12   -2    5   57  -52   -2   37  -12    6   74   10    6  -15 }
{    5    9   -6   42  -15  -18   -9   26   15   58   14   43   23  -10  -37   75 }
{   -5  -23  -23   36    3   22   36   40   27   -4  -16   36  -25  -45   56  -24 }
{    1    3   23   73    5    5   34   46  -12    2   35  -38   26   52    2  -31 }
{   -3   -2  -21  -52    1  -10  -17   44  -19  -20   30   45   27   61   49   21 }
{   -2   -7  -33  -56   -4   -6   21   63   15   31   32  -22  -10  -25  -52  -35 }
{   -5  -12  -15  -12    5   22   35   36   -5  -25  -51  -63   -5    0   15   73 }
},

- If nTrS is equal to 16, lfnstTrSetIdx is equal to 3, and lfnstIdx is equal to 2,
    the following applies:
lowFreqTransMatrix [ m ][ n ] =
{
{ -102   22    7    2   66  -25   -6   -1  -15   14    1   -1    2   -2    1    0 }
{   12   93  -27   -6  -27  -64   36    6   13    5  -23    0   -2    6    9   -3 }
{  -39  -24   17    1  -82   -2   -3    2   33  -12  -17   -2  -24   14    7   -2 }
{  -33   23  -36   11  -31   50   35  -16  -23  -78   15   19   22   15  -30   -5 }
{    0  -35  -81   30   37    5   51  -32   24   36  -15   12  -24   -6    9    1 }
{   25   35    8   -9   62   32  -13    2   31  -32   15    5  -66   25    0   -1 }

TABLE 14-continued

| { | 11 | −35 | 21 | −37 | 30 | −15 | 31 | 15 | −11 | −36 | −30 | 12 | 16 | 49 | 13 | −32 | } |
|---|---|---|---|---|---|---|---|---|---|---|---|---|---|---|---|---|---|
| { | −13 | 23 | 22 | −36 | −12 | 64 | 39 | 25 | −19 | 23 | −35 | 9 | −30 | −58 | 33 | −7 | } |
| { | −9 | −23 | −99 | −53 | 3 | −2 | 1 | 62 | 8 | 2 | 27 | −28 | 7 | 15 | −11 | 5 | } |
| { | −6 | 24 | −38 | 23 | −3 | 40 | −49 | 3 | −7 | 9 | −25 | −44 | 22 | 33 | 7 | −3 | } |
| { | 12 | 17 | 17 | 0 | 32 | 27 | 21 | 2 | 57 | 11 | −5 | −10 | 89 | −22 | −12 | 16 | } |
| { | 2 | −9 | 8 | 45 | 7 | −5 | 27 | 35 | −9 | −31 | −17 | −57 | −23 | −22 | −19 | 44 | } |
| { | −1 | −9 | 28 | −24 | −1 | −10 | 49 | −23 | −8 | −7 | 40 | 1 | 4 | 22 | 65 | 67 | } |
| { | 5 | −12 | −24 | −17 | 13 | −34 | −32 | −16 | 14 | −67 | −7 | 9 | 7 | −74 | 49 | 1 | } |
| { | 2 | −6 | 11 | 45 | 3 | −10 | 33 | 55 | 8 | −5 | 59 | 4 | 7 | −4 | 44 | −66 | } |
| { | −1 | 1 | −14 | 36 | −1 | 2 | −20 | 63 | 0 | 0 | −15 | 72 | 3 | 4 | 5 | 65 | } |
| }, | | | | | | | | | | | | | | | | | |

Table 15 to Table 22 sequentially show two transform kernel matrices that can be included in each set when the transform set index ranges from 0 to 3 in the 8×8 LFNST. The transform kernel matrices in Table 15 to Table 22 may be derived based on nTrS indicating the size of transform coefficients output after the LFNST, a transform set index (lfnstTrSetIdx), and a transform index (lfnstIdx). According to an example, the size nTrS of the transform coefficients in the 8×8 LFNST may be 48. Since there are 48 output transform coefficients, the transform kernel matrix may be a 48×16 matrix, and is shown by dividing 48 matrix coefficients of one row by 16 pieces. Table 15 shows a transform kernel matrix when the transform set index (lfnstTrSetIdx) is 0 and the transform index (lfnstIdx) is 1, Table 16 shows a transform kernel matrix when the transform set index (lfnstTrSetIdx) is 0 and the transform index (lfnstIdx) is 2. Similarly, Table 17 and Table 18 show transform kernel matrices when the transform set index (lfnstTrSetIdx) is 1 and the transform index (lfnstIdx) is 1 and when the transform set index (lfnstTrSetIdx) is 1 and the transform index (lfnstIdx) is 2, respectively. Similarly, Table 19 and Table 20 show transform kernel matrices when the transform set index (lfnstTrSetIdx) is 2 and the transform index (lfnstIdx) is 1 and when the transform set index (lfnstTrSetIdx) is 2 and the transform index (lfnstIdx) is 2, respectively. Similarly, Table 21 and Table 22 sequentially show transform kernel matrices when the transform set index (lfnstTrSetIdx) is 3 and the transform index (lfnstIdx) is 1 and when the transform set index (lfnstTrSetIdx) is 3 and the transform index (lfnstIdx) is 2, respectively.

TABLE 15

- If nTrS is equal to 48, lfnstTrSetIdx is equal to 0, and lfnstIdx is equal to 1 the following applies:

lowFreqTransMatrix [ m ][ n ] = lowFreqTransMatrixCol0to15[ m ][ n ] with
m = 0..15, n = 0..15
lowFreqTransMatrixCol0to15 =

| { | | | | | | | | | | | | | | | | | |
|---|---|---|---|---|---|---|---|---|---|---|---|---|---|---|---|---|---|
| { | −117 | 28 | 18 | 2 | 4 | 1 | 2 | 1 | 32 | −18 | −2 | 0 | −1 | 0 | 0 | 0 | } |
| { | −29 | −91 | 47 | 1 | 9 | 0 | 3 | 0 | −84 | 26 | −8 | 3 | 0 | 1 | 0 | 0 | } |
| { | −10 | 62 | −1 | −5 | −2 | −2 | −1 | −1 | −95 | 3 | 22 | 0 | 4 | 0 | 2 | 0 | } |
| { | −15 | 15 | −10 | −2 | 1 | 0 | 1 | 0 | 10 | 112 | −28 | −17 | −4 | −4 | −1 | −2 | } |
| { | 32 | 39 | 92 | −44 | 4 | −10 | 1 | −4 | 26 | 12 | −15 | 13 | −5 | 2 | −2 | 0 | } |
| { | −10 | 1 | 50 | −15 | 2 | −3 | 1 | −1 | −28 | −15 | 14 | 6 | 1 | 1 | 1 | 0 | } |
| { | 1 | −33 | −11 | −14 | 7 | −2 | 2 | 0 | 29 | −12 | 37 | −7 | −4 | 0 | −1 | 0 | } |
| { | 0 | 6 | −6 | 21 | −4 | 2 | 0 | 0 | −20 | −24 | −134 | 30 | 5 | 5 | 1 | 2 | } |
| { | −13 | −13 | −37 | −101 | 29 | −11 | 3 | −3 | −12 | −15 | −20 | 2 | −11 | 5 | −2 | 1 | } |
| { | 6 | 1 | −14 | −25 | 9 | −3 | 2 | 0 | 10 | 9 | −15 | −1 | −3 | 1 | 0 | 0 | } |
| { | −12 | −2 | −26 | −12 | −9 | 2 | −2 | 1 | −3 | 20 | 4 | 34 | −4 | 0 | −1 | 0 | } |
| { | 0 | −3 | 0 | −4 | −15 | 6 | −2 | 1 | −7 | −15 | −28 | −36 | 19 | −5 | 4 | −1 | } |
| { | −1 | 3 | 13 | 5 | 14 | −2 | 2 | −1 | −8 | 3 | −4 | −62 | 4 | 1 | 1 | 0 | } |
| { | 6 | 2 | −3 | 2 | 10 | −1 | 2 | 0 | 9 | 3 | −1 | −20 | 0 | 1 | 0 | 0 | } |
| { | 6 | 9 | −2 | 25 | 110 | −22 | 11 | −4 | −2 | 0 | −2 | 1 | −15 | 12 | −3 | 2 | } |
| { | −1 | 7 | −2 | 9 | −11 | 8 | −1 | 1 | −7 | 2 | −22 | 4 | −13 | 0 | −1 | 0 | } |
| }, | | | | | | | | | | | | | | | | | | lowFreqTransMatrix [ m ][ n ] = lowFreqTransMatrixCol16to31[ m − 16 ][ n ] with
m = 16..31, n = 0..15
lowFreqTransMatrixCol16to31 =

| { | | | | | | | | | | | | | | | | | |
|---|---|---|---|---|---|---|---|---|---|---|---|---|---|---|---|---|---|
| { | 14 | −1 | −3 | 0 | −1 | 0 | 0 | 0 | 0 | 0 | 0 | 0 | 0 | 0 | 0 | 0 | } |
| { | 33 | 5 | −9 | −1 | −2 | 0 | −1 | 0 | −3 | 3 | 0 | 0 | 0 | 0 | 0 | 0 | } |
| { | 32 | −30 | −4 | 4 | −1 | 1 | 0 | 0 | 6 | 2 | −5 | 0 | 0 | 0 | 0 | 0 | } |
| { | −20 | −26 | 31 | 1 | 0 | 0 | 0 | 0 | 2 | −16 | −1 | 0 | 0 | 1 | 0 | 0 | } |
| { | 29 | −16 | −22 | 5 | 0 | 1 | 0 | 1 | −20 | 6 | 6 | −3 | 1 | 0 | 0 | 0 | } |
| { | −99 | −4 | 9 | 5 | 5 | 2 | 2 | 1 | 44 | −10 | −11 | 1 | −2 | 0 | −1 | 0 | } |
| { | 6 | −33 | 3 | 26 | −1 | 5 | 0 | 2 | 14 | 30 | −27 | −2 | 1 | −1 | 0 | −1 | } |
| { | −7 | −46 | 10 | −14 | 7 | 0 | 1 | 0 | 9 | 22 | 7 | −6 | −2 | −1 | 0 | −1 | } |
| { | −12 | 10 | 26 | 12 | −6 | 0 | −1 | 0 | −32 | −2 | 11 | 3 | 3 | −1 | 1 | 0 | } |
| { | 38 | 26 | −13 | −1 | −5 | −1 | −1 | 0 | 102 | 3 | −14 | −1 | −5 | −1 | −3 | 0 | } |
| { | −30 | 3 | −92 | 14 | −13 | 0 | 2 | 0 | −11 | 34 | 21 | −33 | 1 | −2 | 0 | −1 | } |
| { | −5 | −17 | −41 | 42 | −6 | 2 | −1 | 1 | −40 | 37 | 13 | −4 | 2 | −1 | 1 | } |
| { | −12 | 22 | 16 | −11 | −17 | 0 | −1 | 0 | −11 | 37 | −3 | −3 | 0 | −6 | 0 | −2 | } |
| { | −4 | 4 | −16 | 0 | −2 | 2 | 1 | 0 | 34 | 23 | 6 | −7 | −4 | −3 | −1 | 0 | } |
| { | −5 | −4 | −22 | 8 | −25 | 3 | 0 | 0 | −3 | −23 | 2 | −2 | 9 | −2 | 1 | 0 | } |
| { | 0 | 28 | 0 | 76 | 4 | −6 | 0 | −2 | −13 | 5 | −76 | −4 | 33 | −1 | 3 | 0 | } |
| }, | | | | | | | | | | | | | | | | | |

TABLE 15-continued lowFreqTransMatrix [ m ][ n ] = lowFreqTransMatrixCol32to47[ m − 32 ][ n ] with
m = 32..47, n = 0..15
lowFreqTransMatrixCol32to47 =
{
{    3,   0,  −1,   0,   1,   0,   0,   0,   1,   0,   0,   0,   1,   0,   0,   0 }
{    7,   2,  −2,   0,  −1,   1,   0,   0,   2,   1,  −1,   0,   0,   0,   0,   0 }
{    6,  −3,   0,   0,   3,   0,  −1,   0,   2,  −1,   0,   0,   1,   0,   0,   0 }
{    1,  −4,   0,   0,   0,  −3,   0,   1,   0,  −1,   0,   0,   0,  −2,   0,   0 }
{    1,  −4,  −3,   2,  −4,   1,   0,   0,   1,  −1,  −2,   1,  −2,   0,   0,   0 }
{   −5,   4,  −3,   0,   8,  −1,  −2,   0,  −2,   1,  −1,   0,   4,   0,  −1,   0 }
{   −6,   6,   6,  −3,   1,   3,  −2,   0,  −1,   1,   1,   0,   0,   1,  −1,   0 }
{    2,   2,   3,  −2,   0,   3,   4,  −1,   0,   0,   1,   0,   0,   1,   2,  −1 }
{   11,  −5,  −1,   6,  −4,   2,   1,   0,   3,  −1,   1,   2,  −1,   0,   0,   0 }
{  −29,  13,  10,   0,  10,  −4,  −3,   1,  −7,   1,   2,   1,   2,  −1,   0,   0 }
{   −9,  −4,  15,   3,   2,   0,   0,  −2,  −1,  −1,   3,   0,   0,   0,   0,  −1 }
{  −10,  13,  −1,  −4,   4,  −4,   3,   4,  −2,   2,  −1,  −1,   1,  −1,   1,   2 }
{  −21,  −5,  23,   0,   2,  −2,  −1,   6,  −3,  −2,   1,   0,   0,   0,   0,   2 }
{  108,  −5, −30,   6, −27,  10,   7,  −2,  11,  −3,  −1,   1,  −4,   1,   0,   1 }
{   −7,   1,   3,  −8,   3,   0,  −1,   0,   0,   1,   0,  −1,   1,   0,   0,   0 }
{    9,  18,  −3, −35,  −4,  −1,   6,   1,   1,   2,   0,  −3,  −1,   0,   2,   0 }
},

TABLE 16

– If nTrS is equal to 48, lfnstTrSetIdx is equal to 0, and lfnstIdx is equal to 2
  the following applies:
lowFreqTransMatrix [ m ][ n ] = lowFreqTransMatrixCol0to15[ m ][ n ] with
m = 0..15, n = 0..15
lowFreqTransMatrixCol0to15 =
{
{ −108,  48,   9,   1,   1,   1,   0,   0,  44,  −6,  −9,  −1,  −1,   0,  −1,   0 }
{   55,  66, −37,  −5,  −6,  −1,  −2,   0,  67, −30, −20,   4,  −2,   0,  −1,   0 }
{    2,  86, −21, −13,  −4,  −2,  −1,  −1, −88,   5,   6,   4,   5,   1,   1,   0 }
{  −24, −21, −38,  19,   0,   4,  −1,   2, −23, −89,  31,  20,   2,   3,   1,   1 }
{    9,  20,  98,  26,  −3,  −5,   0,   2,  −9, −26,  16, −16,   2,   0,   1,   0 }
{  −21,  −7, −37,  10,   2,   2,  −1,   1, −10,  69,  −5,  −7,  −2,  −2,   0,  −1 }
{  −10, −25,   4, −17,   8,  −2,   2,  −1, −27, −17, −71,  25,   8,   2,   1,   1 }
{    2,   5,  10,  64,  −9,   4,  −3,   1,  −4,   8,  62,   3, −17,   1,  −2,   0 }
{  −11, −15, −28, −97,   6,  −1,   4,  −1,   7,   3,  57, −15,  10,  −2,   0,  −1 }
{    9,  13,  24,  −6,   7,  −2,   1,  −1,  16,  39,  20,  47,  −2,  −2,  −2,   0 }
{   −7,  11,  12,   7,   2,  −1,   0,  −1, −14,  −1, −24,  11,   2,   0,   0,   0 }
{    0,   0,   7,  −6,  23,  −3,   3,  −1,   5,   1,  18,  96,  13,  −9,  −1,  −1 }
{   −2,  −6,  −1, −10,   0,   1,   1,   0,  −7,  −2, −28,  20, −15,   4,  −3,   1 }
{   −1,   6, −16,   0,  24,  −3,   1,   1,   2,   6,   6,  16,  18,  −7,   1,  −1 }
{   −5,  −6,  −3, −19, −104, 18,  −4,   3,   0,   6,   0,  35, −41,  20,  −2,   2 }
{   −1,  −2,   0,  23,  −9,   0,  −2,   0,   1,   1,   8,  −1,  29,   1,   1,   0 }
},
lowFreqTransMatrix [ m ][ n ] = lowFreqTransMatrixCol16to31[ m − 16 ][ n ] with
m = 16..31, n = 0..15
lowFreqTransMatrixCol16to31 =
{
{    9,  −9,  −1,   1,   0,   0,   0,   0,   3,  −1,   1,   0,   0,   0,   0,   0 }
{  −31, −19,  14,   4,   1,   1,   1,   0,  −6,   3,   5,  −2,   0,   0,   0,   0 }
{   14,  −5,   0,   3,   0,   0,   0,   0,  10,  −5,  −2,   0,  −1,   0,   0,   0 }
{  −30,  26,  36,  −8,  −2,  −2,   0,  −1,  14,  18,  −7,  −9,  −1,  −1,   0,   0 }
{  −61,  −3,  −2,   3,   7,   1,   1,   0,  12,  16,  −6,  −1,   0,  −1,   0,   0 }
{  −93,   2,  19,   0,   3,   0,   2,   0,  17,   4,   0,   0,  −1,   0,   0,   0 }
{   −4, −66,  28,  36,  −5,   3,   0,   1, −10,  20,  33, −13,  −8,   0,   0,  −1 }
{   −3,  75,   5, −14,   1,   4,   0,   1, −36,   3,  18,  −4,   4,   0,   1,   0 }
{   −1, −27,  13,   6,   1,  −1,   0,   0, −34,  −6,   0,   3,   4,   1,   2,   0 }
{   28,  23,  76,  −5, −25,  −3,  −3,  −1,   6,  36,  −7, −39,  −4,  −1,   0,  −1 }
{  −20,  48,  11, −13,  −5,  −2,   0,  −1, −105, −19, 17,   0,   6,   2,   3,   0 }
{  −21,  −7, −42,  14, −24,  −3,   0,   0,  11, −47,  −7,   3,  −5,   9,   1,   2 }
{   −2, −32,  −2, −66,   3,   7,   1,   2, −11,  13,  70,   5,  43,  −2,   3,   0 }
{   −3,  11, −63,   9,   4,  −5,   2,  −1, −22,  94,  −4,  −6,  −4,  −4,   1,  −2 }
{   −2,  10, −18,  16,  21,   3,  −2,   0,  −2,  11,   6, −10,   6,  −3,  −1,   0 }
{    3,  −6,  13,  76,  30, −11,  −1,  −2, −26,  −8, −69,   7,  −9,  −7,   3,  −1 }
},
lowFreqTransMatrix [ m ][ n ] = lowFreqTransMatrixCol32to47[ m − 32 ][ n ] with
m = 32..47, n = 0..15
lowFreqTransMatrixCol32to47 =
{
{    1,  −1,   0,   0,   1,   0,   0,   0,  −1,   0,   0,   0,   0,   0,   0,   0 }
{   −7,  −1,   1,   0,  −1,   1,   1,   0,  −2,  −1,   1,   0,   0,   0,   0,   0 }
{    6,  −5,   0,   1,   2,  −1,   0,   0,   1,  −1,   0,   0,   1,   0,   0,   0 }
{    1,   3,  −2,  −1,   3,   2,  −2,  −1,   3,   1,   0,   0,   1,   1,  −1,   0 }
{    2,   0,  −8,   1,   3,   1,  −1,   1,   0,  −1,  −2,   0,   1,   0,  −1,   0 }

TABLE 16-continued

| { | 5 | -4 | -2 | 0 | 4 | -2 | 0 | 1 | 0 | 0 | 0 | 0 | 2 | -1 | 0 | 0 } |
| { | 3 | 6 | -3 | -7 | -1 | 3 | 3 | -1 | 1 | 0 | -1 | 0 | 0 | 1 | 1 | -1 } |
| { | 1 | 14 | -2 | -8 | -2 | 1 | -3 | 0 | 2 | 2 | -1 | -2 | 0 | 1 | -1 | 0 } |
| { | -2 | 8 | 1 | 5 | -2 | 0 | -3 | 1 | 1 | 1 | 0 | 2 | -1 | 0 | -1 | 0 } |
| { | 2 | -4 | -18 | -3 | -1 | -1 | -2 | -2 | 1 | -2 | -2 | 0 | 0 | 0 | -1 | -1 } |
| { | -14 | 8 | 8 | 2 | 1 | 2 | -1 | -2 | 3 | 0 | -1 | 0 | 0 | 0 | 0 | 0 } |
| { | 0 | -1 | 19 | -1 | 1 | 0 | -1 | -6 | -1 | 1 | 2 | 0 | 1 | 0 | 0 | -2 } |
| { | 8 | -14 | -3 | 43 | -1 | 2 | 7 | -1 | 1 | -2 | 1 | 3 | -1 | 1 | 1 | 0 } |
| { | 10 | 23 | -19 | -5 | 0 | -6 | -4 | 6 | 3 | -2 | 1 | 1 | 0 | -1 | 0 | 0 } |
| { | -1 | 5 | -1 | -6 | -1 | -1 | -1 | -1 | -1 | 0 | 0 | 0 | 0 | 0 | 0 | -1 } |
| { | -10 | -34 | -25 | 13 | -1 | 0 | 11 | 5 | 1 | -1 | 1 | -2 | 0 | 0 | 2 | 0 } |
| }, |

TABLE 17

- If nTrS is equal to 48, lfnstTrSetIdx is equal to 1, and lfnstIdx is equal to 1
  the following applies:
lowFreqTransMatrix [ m ][ n ] = lowFreqTransMatrixCol0to15[ m ][ n ] with
m = 0..15, n = 0..15
lowFreqTransMatrixCol0to15 =
{

| { | 110 | -49 | -3 | -4 | -1 | -1 | 0 | -1 | -38 | -1 | 10 | 0 | 2 | 0 | 1 | 0 } |
| { | -43 | -19 | 17 | -1 | 3 | 0 | 1 | 0 | -98 | 46 | 14 | -1 | 2 | 0 | 1 | 0 } |
| { | -19 | 17 | -7 | 3 | -2 | 1 | -1 | 0 | -32 | -55 | 29 | 3 | 4 | 0 | 2 | 0 } |
| { | -35 | -103 | 39 | 1 | 7 | 0 | 2 | 0 | 38 | -13 | 25 | -6 | 1 | -1 | 0 | 0 } |
| { | 9 | 5 | -6 | -1 | -1 | 0 | -1 | 0 | 42 | 4 | 21 | -11 | 1 | -3 | 1 | -1 } |
| { | -5 | -5 | -28 | 9 | -3 | 2 | -1 | 0 | -20 | -78 | 22 | 16 | 1 | 3 | 0 | 1 } |
| { | 14 | 17 | 27 | -12 | 1 | -3 | 1 | -1 | 8 | 19 | -13 | 4 | -2 | 1 | -1 | 0 } |
| { | 7 | 35 | 17 | -4 | -1 | 0 | 0 | 0 | 3 | 8 | 54 | -17 | 1 | -2 | 1 | -1 } |
| { | -13 | -27 | -101 | 24 | -8 | 6 | -3 | 2 | 11 | 43 | 6 | 28 | -6 | 3 | -1 | 1 } |
| { | -11 | -13 | -3 | -10 | 3 | -1 | 1 | 0 | -19 | -19 | -37 | 8 | 4 | 2 | 0 | 1 } |
| { | -4 | -10 | -24 | -11 | 3 | -2 | 0 | -1 | -6 | -37 | -45 | -17 | 8 | -2 | 2 | -1 } |
| { | -2 | 1 | 13 | -17 | 3 | -5 | 1 | -2 | 3 | 0 | -55 | 22 | 6 | 1 | 1 | 0 } |
| { | 3 | 1 | 5 | -15 | 1 | -2 | 1 | -1 | 7 | 4 | -7 | 29 | -1 | 2 | -1 | 1 } |
| { | -4 | -8 | -1 | -50 | 6 | -4 | 2 | -2 | -1 | 5 | -22 | 20 | 6 | 1 | 0 | 0 } |
| { | 5 | -1 | 26 | 102 | -13 | 12 | -4 | 4 | -4 | -2 | -40 | -7 | -23 | 3 | -5 | 1 } |
| { | -5 | -6 | -27 | -22 | -12 | 0 | -3 | 0 | -5 | 8 | -20 | -83 | 0 | 0 | 0 | 0 } |
| }, | lowFreqTransMatrix [ m ][ n ] = lowFreqTransMatrixCol16to31[ m − 16 ][ n ] with
m = 16..31, n = 0..15
lowFreqTransMatrixCol16to31 =
{

| { | -9 | 13 | 1 | -2 | 0 | 0 | 0 | 0 | -4 | 2 | -3 | 0 | 0 | 0 | 0 | 0 } |
| { | 26 | 26 | -15 | -3 | -2 | -1 | -1 | 0 | 11 | -7 | -9 | 2 | 0 | 0 | 0 | 0 } |
| { | -72 | 43 | 34 | -9 | 3 | -2 | 1 | -1 | 13 | 36 | -18 | -10 | 0 | -2 | 0 | -1 } |
| { | -1 | 7 | 6 | -7 | 1 | -1 | 0 | 0 | -13 | 14 | 2 | -4 | 2 | -1 | 0 | 0 } |
| { | 21 | 70 | -32 | -21 | 0 | -4 | -1 | -1 | 34 | -26 | -57 | 11 | 4 | 2 | 0 | 1 } |
| { | 80 | -6 | 25 | -5 | -4 | -1 | -1 | 0 | 6 | -24 | 7 | -9 | 0 | 0 | 0 | 0 } |
| { | 48 | -1 | 48 | -15 | -4 | -2 | -1 | -1 | 1 | 60 | -28 | -42 | 5 | -6 | 1 | -2 } |
| { | 10 | 14 | -11 | -34 | 4 | -4 | 1 | -1 | -80 | -7 | -6 | 2 | 15 | 0 | 3 | 0 } |
| { | -3 | 14 | 21 | -12 | -7 | -2 | -1 | -1 | -23 | 10 | -4 | -12 | 3 | 0 | 1 | 0 } |
| { | -12 | -30 | 3 | -9 | 5 | 0 | 1 | 0 | -56 | -9 | -47 | 8 | 21 | 1 | 4 | 1 } |
| { | 17 | 14 | -58 | 14 | 15 | 0 | 2 | 0 | -10 | 34 | -7 | 28 | 4 | -1 | 1 | 0 } |
| { | 8 | 74 | 21 | 40 | -14 | 0 | -2 | 0 | -36 | -8 | 11 | -13 | -23 | 1 | -3 | 0 } |
| { | 8 | 3 | 12 | -14 | -9 | -1 | -1 | 0 | 4 | 29 | -15 | 31 | 10 | 4 | 1 | 1 } |
| { | -16 | -15 | 18 | -29 | -11 | 2 | -2 | 1 | 40 | -45 | -19 | -22 | 31 | 2 | 4 | 1 } |
| { | -1 | 5 | 8 | -23 | 7 | 2 | 1 | 1 | 10 | -11 | -13 | -3 | 12 | -3 | 2 | 0 } |
| { | 9 | 7 | 24 | -20 | 41 | 3 | 6 | 1 | 15 | 20 | 12 | 11 | 17 | -9 | 1 | -2 } |
| }, | lowFreqTransMatrix [ m ][ n ] = lowFreqTransMatrixCol32to47[ m − 32 ][ n ] with
m = 32..47, n = 0..15
lowFreqTransMatrixCol32to47 =
{

| { | -2 | 2 | 0 | 1 | -1 | 1 | 0 | 0 | -1 | 1 | 0 | 0 | -1 | 0 | 0 | 0 } |
| { | 9 | -3 | -1 | 2 | 3 | -3 | 0 | 0 | 4 | -1 | 0 | 0 | 2 | -1 | 0 | 0 } |
| { | 3 | 0 | -12 | 3 | 6 | 1 | -3 | 2 | 1 | -1 | -2 | 0 | 3 | 1 | -1 | 1 } |
| { | -2 | 11 | -6 | -2 | -2 | 4 | -3 | 0 | 0 | 3 | -2 | 0 | -1 | 1 | -1 | 0 } |
| { | -4 | -32 | 5 | 24 | 1 | -6 | 12 | 4 | -3 | -2 | 4 | -2 | 0 | -1 | 0 | 0 } |
| { | -7 | 3 | 13 | -4 | -3 | 5 | 1 | -5 | -2 | 3 | 1 | -2 | -1 | 2 | -1 | -2 } |
| { | 11 | -11 | -51 | 11 | -2 | -10 | -2 | 19 | 2 | -6 | -4 | 4 | -2 | -3 | 2 | 2 } |
| { | -16 | 46 | 1 | 3 | 2 | 7 | -24 | 0 | 2 | -2 | -5 | 8 | 1 | -1 | -2 | 2 } |
| { | 2 | 9 | -10 | 0 | 1 | -5 | -4 | 4 | 2 | -2 | 2 | 2 | 0 | -2 | 1 | 0 } |
| { | -11 | -30 | 10 | 59 | -2 | 8 | 41 | 8 | 2 | 5 | 6 | -7 | -1 | 3 | 5 | -2 } |
| { | 23 | 34 | -31 | 4 | 10 | -22 | -30 | 22 | 4 | -15 | 9 | 20 | 2 | -5 | 9 | 4 } |
| { | -36 | 6 | 16 | -14 | 2 | 19 | -4 | -12 | -1 | 0 | -7 | -3 | 0 | 2 | -2 | -1 } |
| { | 61 | 22 | 55 | 14 | 13 | 3 | -9 | -65 | 1 | -11 | -21 | -7 | 0 | 0 | -1 | 3 } |
| { | -25 | 41 | 0 | 12 | 9 | 7 | -42 | 12 | -3 | -14 | 2 | 28 | 5 | 1 | 6 | 2 } |

TABLE 17-continued

| { | −9 | 23 | 4 | 9 | 14 | 9 | −14 | −4 | 0 | −12 | −7 | 6 | 3 | 0 | 6 | 3 } |
| { | −26 | −1 | 18 | −1 | −12 | 32 | 3 | −16 | −5 | 10 | −25 | −5 | −2 | 1 | −8 | 10 } |
| }, | | | | | | | | | | | | | | | | |

TABLE 18

- If nTrS is equal to 48, lfnstTrSetIdx is equal to 1, and lfnstIdx is equal to 2
  the following applies:

lowFreqTransMatrix [ m ][ n ] = lowFreqTransMatrixCol0to15[ m ][ n ] with
m = 0..15, n = 0..15
lowFreqTransMatrixCol0to15 =

{
| { | 80 | −49 | 6 | −4 | 1 | −1 | 1 | −1 | −72 | 36 | 4 | 0 | 1 | 0 | 0 | 0 } |
| { | −72 | −6 | 17 | 0 | 3 | 0 | 1 | 0 | −23 | 58 | −21 | 2 | −3 | 1 | −1 | 0 } |
| { | −50 | 19 | −15 | 4 | −1 | 1 | −1 | 1 | −58 | −2 | 30 | −3 | 4 | −1 | 2 | 0 } |
| { | −33 | −43 | 28 | −7 | 4 | −2 | 2 | −1 | −38 | 11 | −8 | 4 | 1 | 1 | 0 | 0 } |
| { | 10 | 66 | −21 | −3 | −3 | 0 | −1 | 0 | −53 | −41 | −2 | 16 | −1 | 4 | −1 | 1 } |
| { | 18 | 14 | 13 | −9 | 2 | −2 | 1 | −1 | 34 | 32 | −31 | 12 | −5 | 2 | −2 | 1 } |
| { | 21 | 66 | −1 | 9 | −4 | 2 | −1 | 1 | −21 | 41 | −30 | −10 | 0 | −2 | 0 | −1 } |
| { | 1 | −6 | −24 | 17 | −5 | 3 | −2 | 1 | 24 | 10 | 39 | −21 | 5 | −4 | 2 | −1 } |
| { | 9 | 33 | −24 | 1 | 4 | 0 | 1 | 0 | 6 | 50 | 26 | 1 | −10 | 0 | −2 | 0 } |
| { | −7 | −9 | −32 | 14 | −3 | 3 | −1 | 1 | −23 | −28 | 0 | −5 | −1 | 0 | 0 | 0 } |
| { | 6 | 30 | 69 | −18 | 5 | −4 | 3 | −1 | −3 | −11 | −34 | −16 | 9 | −4 | 2 | −1 } |
| { | 1 | −8 | 24 | −3 | 7 | −2 | 2 | −1 | −6 | −51 | −6 | −4 | −5 | 0 | −1 | 0 } |
| { | 4 | 10 | 4 | 17 | −9 | 4 | −2 | 1 | 5 | 14 | 32 | −15 | 9 | −3 | 2 | −1 } |
| { | −3 | −9 | −23 | 10 | −10 | 3 | −3 | 1 | −5 | −14 | −16 | −27 | 13 | −5 | 2 | −1 } |
| { | 2 | 11 | 22 | 2 | 9 | −2 | 2 | 0 | −6 | −7 | 20 | −32 | −3 | −4 | 0 | −1 } |
| { | 2 | −3 | 8 | 14 | −5 | 3 | −1 | 1 | −2 | −11 | 5 | −18 | 8 | −3 | 2 | −1 } |
}, lowFreqTransMatrix [ m ][ n ] = lowFreqTransMatrixCol16to31[ m − 16 ][ n ] with
m = 16..31, n = 0..15
lowFreqTransMatrixCol16to31 =

{
| { | 26 | 0 | −12 | 2 | −2 | 1 | −1 | 0 | −7 | 9 | 6 | 1 | 0 | 0 | 0 | 0 } |
| { | 55 | −46 | −1 | 6 | −2 | 1 | −1 | 0 | −22 | 7 | 17 | −7 | 2 | −1 | 1 | 0 } |
| { | 6 | 57 | −34 | 0 | −2 | 0 | −1 | 0 | 34 | −48 | −2 | 14 | −4 | 3 | −1 | 1 } |
| { | −55 | 24 | 26 | −5 | 2 | −1 | 1 | 0 | 15 | 46 | −40 | −1 | −1 | 0 | −1 | 0 } |
| { | 36 | −5 | 41 | −20 | 3 | −3 | 1 | −1 | −30 | 26 | −32 | −3 | 7 | −2 | 2 | −1 } |
| { | 40 | 4 | −4 | −9 | −3 | −2 | −1 | −1 | 27 | −31 | −43 | 19 | −2 | 3 | −1 | 1 } |
| { | −35 | −17 | −3 | 26 | −6 | 5 | −2 | 2 | 56 | 3 | 18 | −25 | −1 | −2 | −1 | −1 } |
| { | 33 | 32 | −30 | 4 | −3 | −1 | −1 | 0 | −4 | 13 | −16 | −10 | 0 | −1 | 0 | 0 } |
| { | −27 | 1 | −28 | −21 | 16 | −5 | 3 | −2 | −23 | 36 | −2 | 40 | −17 | 4 | −3 | 1 } |
| { | −36 | −59 | −24 | 14 | 4 | 2 | 1 | 1 | −23 | 26 | 23 | 26 | −3 | 6 | 0 | 2 } |
| { | −16 | 35 | −35 | 30 | −9 | 3 | −2 | 1 | −57 | −13 | 6 | 4 | −5 | 5 | −1 | 1 } |
| { | 38 | −1 | 0 | 25 | 6 | 2 | 1 | 1 | 47 | 20 | 35 | 1 | −27 | 1 | −5 | 0 } |
| { | 7 | 13 | 19 | 15 | −8 | 1 | −1 | 0 | 3 | 25 | 30 | −18 | 1 | −2 | 0 | −1 } |
| { | −1 | −13 | −30 | 11 | −5 | 2 | −1 | 0 | −5 | −8 | −22 | −16 | 10 | 0 | 1 | 0 } |
| { | 13 | −5 | −28 | 6 | 18 | −4 | 3 | −1 | −26 | 27 | −14 | 6 | −20 | 0 | −2 | 0 } |
| { | 12 | −23 | −19 | 22 | 2 | 0 | 1 | 0 | 23 | 41 | −7 | 35 | −10 | 4 | −1 | 1 } |
}, lowFreqTransMatrix [ m ][ n ] = lowFreqTransMatrixCol32to47[ m − 32 ][ n ] with
m = 32..47, n = 0..15
lowFreqTransMatrixCol32to47 =

{
| { | 3 | 5 | −1 | −2 | −2 | −2 | −1 | 1 | 1 | 1 | 0 | 0 | −1 | −1 | 0 | 0 } |
| { | 9 | 5 | −12 | 1 | −3 | −4 | 4 | 2 | 4 | 1 | −2 | −1 | −1 | −1 | 1 | 0 } |
| { | −10 | 7 | 21 | −10 | 6 | 1 | −11 | 0 | −1 | −1 | 4 | 2 | 3 | 0 | −2 | −1 } |
| { | 17 | −38 | 1 | 17 | −3 | 11 | 15 | −11 | 3 | −1 | −10 | 1 | 0 | 1 | 3 | 2 } |
| { | 15 | −8 | 1 | 17 | −1 | −2 | 4 | −8 | 2 | 0 | −1 | 3 | 0 | 0 | 0 | −1 } |
| { | 7 | −49 | 52 | 10 | −11 | 22 | 7 | −26 | −1 | −6 | −9 | 6 | −2 | 2 | 4 | −2 } |
| { | −15 | −13 | −27 | 9 | 9 | −6 | 20 | 5 | −3 | 2 | −6 | −9 | 3 | −3 | 1 | 5 } |
| { | 24 | −26 | −37 | 33 | 5 | −32 | 55 | −5 | −7 | 22 | −14 | −22 | 1 | −9 | −3 | 13 } |
| { | 43 | −13 | 4 | −41 | −19 | −2 | −24 | 17 | 11 | −4 | 8 | 4 | −3 | −3 | −3 | −3 } |
| { | 10 | −26 | 38 | 7 | −12 | 11 | 42 | −22 | −5 | 20 | −14 | −15 | −1 | −2 | 1 | 6 } |
| { | 28 | 10 | 4 | 7 | 0 | −15 | 7 | −10 | −1 | 7 | −2 | 2 | 1 | −3 | 0 | 0 } |
| { | 37 | −37 | −9 | −47 | −28 | 5 | 0 | 18 | 8 | 6 | 0 | −8 | −4 | −3 | −3 | 1 } |
| { | 11 | 24 | 22 | −11 | −3 | 37 | −13 | −58 | −5 | 12 | −63 | 26 | 9 | −15 | 11 | 8 } |
| { | 0 | −29 | −27 | 6 | −27 | −10 | −30 | 9 | −3 | −10 | −7 | 77 | 9 | −13 | 45 | −8 } |
| { | −76 | −26 | −4 | −7 | 12 | 51 | 5 | 24 | 7 | −17 | −16 | −12 | −5 | 4 | 2 | 13 } |
| { | 5 | 7 | 23 | 5 | 69 | −38 | −8 | −32 | −15 | −31 | 24 | 11 | 2 | 18 | 11 | −15 } |
},

TABLE 19

- If nTrS is equal to 48, lfnstTrSetIdx is equal to 2, and lfnstIdx is equal to 1 the following applies:

lowFreqTransMatrix [ m ][ n ] = lowFreqTransMatrixCol0to15[ m ][ n ] with
m = 0..15, n = 0..15
lowFreqTransMatrixCol0to15 =
{
{  -121   33    4    4    1    2    0    1   -1   -1    1    0    0    0    0    0 }
{     0   -2    0    0    0    0    0    0  121  -23   -7   -3   -2   -1   -1    0 }
{   -20   19   -5    2   -1    1    0    0   16    3   -2    0    0    0    0    0 }
{    32  108  -43   10   -9    3   -3    1    4   19   -7    1   -1    0    0    0 }
{    -3    0   -1    0    0    0    0    0  -29   11   -2    1    0    0    0    0 }
{    -4  -12   -3    1   -1    0    0    0   19  105  -31    7   -6    1   -2    0 }
{     7    1    2    0    0    0    0    0    4    3   -2    0    0    0    0    0 }
{    -8  -31   14   -4    3   -1    1    0    9   43    0    1   -1    0    0    0 }
{   -15  -43 -100   23  -12    6   -4    2   -6  -17  -48   10   -5    2   -1    1 }
{    -3    1    2    0    0    0    0    0   -6    3    1    0    0    0    0    0 }
{    -1   -6   -3    2   -1    0    0    0   -6  -35    9    0    2    0    0    0 }
{    -5  -14  -48    2   -5    1   -2    0   10   24   99  -17   10   -4    3   -1 }
{    -2    0    2    0    0    0    0    0   -2    0    1    0    0    0    0    0 }
{    -2  -10   -4    0    0    0    0    0    3   11   -1   -1    0    0    0    0 }
{    -2   -3  -25   -2   -3    0   -1    0   -1   -3   -1    4   -2    2    0    1 }
{     4   -4   28  103  -42   24   -9    7    1    2    4    0    3   -1    0    0 }
}, lowFreqTransMatrix [ m ][ n ] = lowFreqTransMatrixCol16to31[ m − 16 ][ n ] with
m = 16..31, n = 0..15
lowFreqTransMatrixCol16to31 =
{
{    24   -5   -1   -1    0    0    0    0    5   -1    0    0    0    0    0    0 }
{    17    1   -2    0    0    0    0    0  -27    4    2    0    0    0    0    0 }
{  -120   14    8    1    3    1    1    0  -18   -2    3    0    1    0    0    0 }
{    11  -30    9   -2    1   -1    0    0    0   -8    2    0    0    0    0    0 }
{    12    7   -1    0    0    0    0    0 -117   12    9    1    3    0    1    0 }
{     9   46   -6    0    0    0    0    0    8  -29    9   -3    1    0    0    0 }
{    22   -8    1   -1    0    0    0    0  -28   -9    4    0    1    0    0    0 }
{   -13 -105   17   -2    2    0    0    0   -8  -25   -3    0    0    0    0    0 }
{     1   -5   19   -6    3   -1    1    0    2    7   15   -3    1   -1    0    0 }
{     0    3   -2    0    0    0    0    0  -20    8   -2    0    0    0    0    0 }
{     1   -6   11   -2    2    0    1    0   -9 -100   17   -1    1    0    0    0 }
{     4   14   32    0    2    0    1    0   -4    0  -39    6   -4    1   -1    0 }
{    -1   -1    1   -1    0    0    0    0   -1   -4    2    0    0    0    0    0 }
{    -6  -40  -15    6   -2    1    0    0    5   57   -6    2    0    0    0    0 }
{    -7   -8  -97   17   -9    3   -3    1   -8  -26  -61   -1   -3   -1   -1   -1 }
{    -1    0   -9  -42   17    9    3   -2   -1    1  -14    6   -4    2   -1    0 }
}, lowFreqTransMatrix [ m ][ n ] = lowFreqTransMatrixCol32to47[ m − 32 ][ n ] with
m = 32..47, n = 0..15
lowFreqTransMatrixCol32to47 =
{
{     3   -1    0    0    2   -1    0    0    2   -1    0    0    1    0    0    0 }
{   -12    2    1    0   -5    1    0    0   -1    0    0    0   -2    0    0    0 }
{    17   -3   -1    0    6   -1   -1    0    2    0    0    0    2    0    0    0 }
{    -7   -1    2    0   -3   -1    1    0   -2   -2    1    0    0    0    0    0 }
{   -32   -3    3    0   12    2   -1    0    7    0    0    0    1    0    0    0 }
{    -3  -19    3    0   -4   -6    1    0    0    0    0    0    0   -1    0    0 }
{   117  -10   -8    0   32    1   -4    0    3    1   -1    0   -3    1    0    0 }
{    -7   32   -5    1   -1    4    0    0    2   -1    0    0    1    0   -1    0 }
{     4   10    5   -1    0    3    1    0   -2    1    2    0   -1    1    1    0 }
{    30   13   -3    0 -116    6   10    0  -35   -5    4    0   -3   -1    0    0 }
{   -10  -63    1    2  -17    3   -4    0   -1    9   -1    0    3    4   -1    0 }
{     2   -3   -4    0    2   -2   -2    0    0   -1    0    0    0   -1   -1    0 }
{    -8   -2   -1    1   30    4   -4    1 -102    4    8   -1  -69   -2    6   -1 }
{     1  -95   18   -6  -10  -34   -2    0   -4   17   -2    0    0    2    1    0 }
{     2   10   24   -7    5    9   19   -1    0    1    4    0   -2    0    1    0 }
{    -1   -2   -4    4    0    3    1   -1    0    2    0   -2    2    0    0    0 }
},

TABLE 20

- If nTrS is equal to 48, lfnstTrSetIdx is equal to 2, and lfnstIdx is equal to 2 the following applies:

lowFreqTransMatrix [ m ][ n ] = lowFreqTransMatrixCol0to15[ m ][ n ] with
m = 0..15, n = 0..15
lowFreqTransMatrixCol0to15 =
{
{    87  -41    3   -4    1   -1    0   -1  -73   28    2    1    1    1    0    0 }
{   -75    4    7    0    2    0    1    0  -41   36   -7    3   -1    1    0    0 }
{    26  -44   22   -6    4   -2    1   -1   77   24  -22    2   -4    0   -1    0 }

TABLE 20-continued

| | | | | | | | | | | | | | | | | |
|---|---|---|---|---|---|---|---|---|---|---|---|---|---|---|---|---|
| { | −39 | −68 | 37 | −7 | 6 | −2 | 2 | 0 | −9 | 56 | −21 | 1 | −2 | 0 | −1 | 0 } |
| { | 10 | −20 | 2 | 0 | 1 | 0 | 0 | 0 | 50 | −1 | 8 | −5 | 1 | −1 | 0 | 0 } |
| { | −21 | −45 | 8 | −2 | 3 | −1 | 1 | 0 | −7 | −30 | 26 | −8 | 3 | −1 | 1 | −1 } |
| { | −4 | −2 | −55 | 28 | −8 | 5 | −3 | 2 | −2 | 37 | 43 | −19 | 1 | −2 | 1 | −1 } |
| { | 2 | 19 | 47 | −23 | 6 | −4 | 2 | −1 | −23 | −22 | −44 | 17 | −2 | 2 | −1 | 0 } |
| { | −19 | −62 | −9 | 3 | 0 | 0 | 0 | 0 | −12 | −56 | 27 | −7 | 3 | −1 | 1 | 0 } |
| { | 1 | 9 | −5 | 0 | −1 | 0 | 0 | 0 | 0 | 22 | −1 | 2 | 0 | 1 | 0 | 0 } |
| { | 5 | 17 | −9 | 0 | −2 | 1 | 0 | 0 | 13 | 54 | −2 | 7 | −1 | 1 | 0 | 0 } |
| { | 7 | 27 | 56 | −2 | 10 | −3 | 3 | −1 | −2 | −6 | 8 | −28 | 3 | −4 | 1 | −1 } |
| { | 0 | 0 | 19 | −4 | 3 | −2 | 2 | −1 | −3 | −13 | 10 | −4 | 1 | 0 | 0 | 0 } |
| { | −3 | 0 | −27 | −80 | 40 | −16 | 6 | −4 | 4 | 3 | 31 | 61 | −22 | 7 | −1 | 1 } |
| { | 1 | 2 | −8 | 6 | −1 | 1 | 0 | 0 | 2 | 8 | −5 | −1 | 0 | 0 | 0 | 0 } |
| { | −4 | −18 | −57 | 8 | −8 | 1 | −3 | 0 | −5 | −20 | −69 | 7 | −6 | 2 | −2 | 1 } |
| }, | | | | | | | | | | | | | | | | | lowFreqTransMatrix [ m ][ n ] = lowFreqTransMatrixCol16to31[ m − 16 ][ n ] with m = 16..31, n = 0..15
lowFreqTransMatrixCol16to31 =
{

| | | | | | | | | | | | | | | | | |
|---|---|---|---|---|---|---|---|---|---|---|---|---|---|---|---|---|
| { | 30 | −5 | −6 | 1 | −1 | 0 | 0 | 0 | −8 | −3 | 3 | 0 | 0 | 0 | 0 | 0 } |
| { | 72 | −29 | −2 | 0 | −1 | 0 | −1 | 0 | −37 | 6 | 7 | −2 | 1 | 0 | 0 | 0 } |
| { | 7 | −38 | 10 | 0 | 1 | 0 | 0 | 0 | −51 | 27 | 4 | −3 | 2 | −1 | 1 | 0 } |
| { | −45 | 4 | −3 | 6 | −1 | 2 | 0 | 1 | 49 | −13 | 3 | −3 | −1 | 0 | 0 | 0 } |
| { | 66 | 17 | −24 | 4 | −3 | 1 | −1 | 0 | 13 | −49 | 15 | 1 | 0 | 0 | 0 | 0 } |
| { | −9 | 69 | −33 | 5 | −2 | 0 | −1 | 0 | −44 | −31 | 10 | 7 | −2 | 2 | 0 | 1 } |
| { | −47 | −34 | −27 | 5 | 4 | −1 | 1 | 0 | −39 | −12 | 27 | 4 | −2 | 1 | 0 | 0 } |
| { | −33 | 3 | 22 | −2 | −4 | 1 | −1 | 0 | −58 | −17 | 6 | −6 | 7 | −1 | 1 | 0 } |
| { | 7 | −8 | 16 | −6 | 4 | −2 | 1 | −1 | −15 | 54 | −23 | 2 | −1 | 0 | 0 | 0 } |
| { | −13 | 17 | 0 | −2 | 0 | −1 | 0 | 0 | −46 | −10 | −10 | 4 | −1 | 1 | 0 | 0 } |
| { | 4 | 51 | −3 | −6 | −1 | −1 | 0 | 0 | −20 | 6 | −34 | 9 | −2 | 2 | −1 | 0 } |
| { | −1 | −4 | −68 | 35 | −5 | 5 | −2 | 1 | 0 | 35 | 43 | −4 | −6 | 1 | −1 | 0 } |
| { | −6 | −37 | −18 | −5 | 2 | −2 | 1 | −1 | 6 | −6 | −7 | 25 | −6 | 4 | −1 | 1 } |
| { | −4 | −7 | −26 | −6 | −10 | 6 | −4 | 1 | 3 | 8 | 14 | −18 | 15 | −5 | 2 | −1 } |
| { | 1 | 24 | 3 | 5 | −1 | 1 | 0 | 0 | −3 | 12 | 6 | −10 | 1 | −1 | 0 | 0 } |
| { | 1 | 4 | 0 | 33 | −7 | 5 | −2 | 1 | 0 | −9 | 53 | −22 | 3 | −1 | 0 | 0 } |
| }, | | | | | | | | | | | | | | | | | lowFreqTransMatrix [ m ][ n ] = lowFreqTransMatrixCol32to47[ m − 32 ][ n ] with m = 32..47, n = 0..15
lowFreqTransMatrixCol32to47 =
{

| | | | | | | | | | | | | | | | | |
|---|---|---|---|---|---|---|---|---|---|---|---|---|---|---|---|---|
| { | 3 | 2 | −1 | 0 | −2 | −1 | 0 | 0 | 1 | 1 | 0 | 0 | −1 | 0 | 0 | 0 } |
| { | 12 | 3 | −4 | 0 | −3 | −2 | 1 | 0 | 4 | 0 | 0 | 0 | −1 | 0 | 0 | 0 } |
| { | 31 | −5 | −8 | 3 | −14 | 0 | 5 | −1 | 6 | 1 | −3 | 0 | −4 | −1 | 1 | 0 } |
| { | −19 | 2 | 0 | 0 | 5 | 1 | 1 | 0 | −2 | 0 | −1 | 0 | 1 | 0 | 0 | 0 } |
| { | −53 | 34 | 6 | −5 | 30 | −7 | −11 | 3 | −11 | −2 | 5 | 1 | 4 | 2 | −1 | −1 } |
| { | 49 | 7 | 2 | −6 | −23 | −3 | −2 | 2 | 9 | 4 | 0 | 0 | −2 | −1 | −1 | 0 } |
| { | −11 | 32 | −8 | −7 | 27 | −12 | −6 | 6 | −13 | 0 | 4 | −3 | 3 | −1 | −2 | 1 } |
| { | −23 | 40 | −2 | 5 | 43 | −11 | −8 | −1 | −18 | −4 | 5 | 2 | 4 | 3 | 0 | −1 } |
| { | −42 | −25 | 4 | 6 | 34 | 8 | 2 | −2 | −15 | −1 | 0 | −1 | 3 | 2 | 0 | 1 } |
| { | −80 | −27 | 20 | −4 | −66 | 23 | −2 | −2 | 20 | −3 | −2 | 3 | −14 | 2 | 3 | −1 } |
| { | 16 | −52 | 28 | 1 | 59 | 15 | −8 | −5 | −28 | −7 | 2 | 2 | 10 | 3 | 0 | −1 } |
| { | −14 | −38 | −12 | −10 | 9 | 5 | 7 | 6 | −9 | 7 | −4 | −3 | 4 | −4 | 0 | 3 } |
| { | 16 | 10 | 55 | −24 | 15 | 46 | −52 | 1 | 35 | −43 | 10 | 12 | −23 | 13 | 5 | −8 } |
| { | −2 | −4 | −1 | 13 | 0 | 2 | −4 | −3 | 3 | −1 | 2 | 1 | −2 | 0 | −2 | −1 } |
| { | −9 | −1 | −25 | 10 | 45 | −11 | 18 | 2 | 86 | 1 | −13 | −4 | −65 | −6 | 7 | 2 } |
| { | 4 | −27 | −2 | −9 | 5 | 36 | −13 | 5 | −7 | −17 | 1 | 2 | 4 | 6 | 4 | −1 } |
| }, | | | | | | | | | | | | | | | | |

TABLE 21

- If nTrS is equal to 48, lfnstTrSetIdx is equal to 3, and lfnstIdx is equal to 1
  the following applies:
lowFreqTransMatrix [ m ][ n ] = lowFreqTransMatrixCol0to15[ m ][ n ] with m = 0..15, n = 0..15
lowFreqTransMatrixCol0to15 =
{

| | | | | | | | | | | | | | | | | |
|---|---|---|---|---|---|---|---|---|---|---|---|---|---|---|---|---|
| { | −115 | 37 | 9 | 2 | 2 | 1 | 1 | 0 | 10 | −29 | 8 | 0 | 1 | 0 | 1 | 0 } |
| { | 15 | 51 | −18 | 0 | −3 | 0 | −1 | 0 | −95 | 7 | 34 | −3 | 5 | −1 | 2 | 0 } |
| { | 29 | −22 | 16 | −6 | 3 | −2 | 1 | −1 | −4 | −80 | 12 | 15 | 0 | 3 | 0 | 1 } |
| { | −36 | −98 | 25 | 5 | 4 | 1 | 2 | 1 | −59 | 11 | −17 | 1 | 1 | 1 | 0 | 0 } |
| { | −6 | 18 | 3 | −3 | −1 | 0 | 0 | 0 | −50 | −5 | −38 | 12 | 0 | 2 | 0 | 1 } |
| { | 4 | 15 | 52 | −13 | 5 | −3 | 2 | −1 | −17 | −45 | 16 | 24 | −2 | 4 | −1 | 2 } |
| { | −20 | −7 | −43 | 4 | 0 | 1 | −1 | 1 | −7 | 35 | 0 | 12 | −4 | 1 | −1 | 0 } |
| { | 4 | 29 | 1 | 26 | −5 | 4 | −2 | 1 | −17 | −7 | −73 | 6 | 6 | 2 | 1 | 1 } |
| { | 12 | 13 | 10 | 2 | −1 | 3 | −1 | 1 | 17 | −2 | −46 | 12 | 7 | 0 | 2 | 0 } |
| { | 5 | 20 | 90 | −17 | 4 | −3 | 2 | −1 | 6 | 66 | 8 | 28 | −7 | 3 | −1 | 1 } |
| { | −3 | −4 | −34 | −12 | 2 | −1 | −1 | 0 | 5 | 25 | 11 | 43 | −10 | 4 | −2 | 1 } |
| { | −1 | −3 | 2 | 19 | −2 | 4 | −1 | 2 | 9 | 3 | −35 | 22 | 11 | 1 | 2 | 0 } |

TABLE 21-continued

| | | | | | | | | | | | | | | | |
|---|---|---|---|---|---|---|---|---|---|---|---|---|---|---|---|
| { 10 | -4 | -6 | 12 | 5 | 1 | 1 | 0 | 11 | -9 | -12 | -2 | 7 | 0 | -1 | 0 } |
| { 4 | 6 | 14 | 53 | -4 | 4 | 0 | 2 | 0 | -1 | -20 | -13 | 3 | 2 | -1 | 1 } |
| { 2 | 9 | 13 | 37 | 19 | 6 | 2 | 2 | -9 | -3 | -9 | -28 | -20 | -4 | -3 | -1 } |
| { 3 | -3 | 12 | 84 | -12 | 8 | -2 | 3 | 6 | 13 | 50 | -1 | 45 | 1 | 7 | 0 } |

},
lowFreqTransMatrix [ m ][ n ] = lowFreqTransMatrixCol16to31[ m − 16 ][ n ] with
m = 16..31, n = 0..15
lowFreqTransMatrixCol16to31 =

{

| | | | | | | | | | | | | | | | |
|---|---|---|---|---|---|---|---|---|---|---|---|---|---|---|---|
| { 23 | -8 | -8 | 1 | -1 | 0 | 0 | 0 | 3 | 3 | -2 | -1 | 0 | 0 | 0 | 0 } |
| { 23 | -47 | 1 | 6 | 0 | 1 | 0 | 1 | 8 | 5 | -12 | 0 | -1 | 0 | 0 | 0 } |
| { 45 | 7 | -59 | 7 | -2 | 1 | -1 | 0 | -15 | 41 | -3 | -16 | 2 | -3 | 0 | -1 } |
| { 6 | -13 | 7 | -3 | 0 | 0 | 0 | 0 | 14 | -4 | -14 | 3 | -1 | 0 | 0 | 0 } |
| { 3 | 67 | -7 | -40 | 3 | -6 | 1 | -3 | -12 | -13 | 65 | -3 | -10 | 0 | -1 | 0 } |
| { -87 | -8 | -14 | 7 | 8 | 1 | 2 | 0 | 23 | -35 | -6 | -3 | 1 | 1 | 0 | 0 } |
| { -51 | -2 | -57 | 5 | 15 | 0 | 4 | 0 | 7 | 39 | 6 | -55 | 1 | -7 | 1 | -3 } |
| { -5 | 21 | -3 | 5 | -1 | -3 | 0 | -1 | -11 | 2 | -52 | -3 | 27 | -2 | 5 | 0 } |
| { 16 | -45 | -9 | -53 | 6 | 1 | 1 | 0 | 70 | 16 | 8 | -4 | -37 | 1 | -7 | 0 } |
| { 29 | 5 | -19 | 12 | 9 | -1 | 1 | 0 | -10 | 14 | -1 | -13 | 7 | 0 | 1 | 0 } |
| { 23 | 20 | -40 | 12 | 21 | -3 | 4 | -1 | 25 | -28 | -10 | 5 | 8 | 6 | 0 | 2 } |
| { -7 | -65 | -19 | -22 | 11 | 4 | 2 | 1 | -75 | -18 | 3 | -1 | -10 | 2 | 0 | 1 } |
| { 33 | -10 | -4 | 18 | 18 | -4 | 4 | -1 | 28 | -72 | 1 | -49 | 15 | 2 | 2 | 1 } |
| { -3 | 1 | -5 | 35 | -16 | -6 | -1 | -2 | 46 | 29 | 13 | 21 | 37 | -5 | 4 | -1 } |
| { 1 | 18 | 9 | 28 | 24 | 6 | 2 | 2 | -20 | -5 | -25 | -33 | -36 | 9 | -2 | 2 } |
| { -2 | 18 | -22 | -37 | -13 | 14 | 0 | 3 | 1 | -12 | -3 | 2 | -15 | -8 | 1 | -1 } |

},
lowFreqTransMatrix [ m ][ n ] = lowFreqTransMatrixCol32to47[ m − 32 ][ n ] with
m = 32..47, n = 0..15
lowFreqTransMatrixCol32to47 =

{

| | | | | | | | | | | | | | | | |
|---|---|---|---|---|---|---|---|---|---|---|---|---|---|---|---|
| { 4 | 0 | 0 | -1 | 1 | 1 | 0 | 0 | 2 | 0 | 0 | 0 | 0 | 0 | 0 | 0 } |
| { 3 | -3 | 1 | -1 | 2 | 1 | -2 | 0 | 1 | -1 | 0 | 0 | 1 | 1 | -1 | 0 } |
| { 1 | 0 | 7 | -2 | -3 | 6 | 1 | -2 | 0 | 0 | 1 | 0 | -1 | 2 | 0 | -1 } |
| { 2 | 8 | -3 | -5 | 2 | 0 | 0 | 0 | 3 | 0 | -1 | 1 | 0 | 0 | 0 | 0 } |
| { 9 | -20 | -5 | 22 | -2 | 0 | 0 | -1 | 2 | -3 | -2 | 3 | -1 | 0 | 1 | 0 } |
| { 2 | 5 | -17 | 0 | 3 | -1 | -1 | -5 | 0 | 1 | -4 | 0 | 1 | 0 | 0 | -2 } |
| { 1 | -10 | 41 | 2 | 4 | -3 | -2 | 3 | -1 | -2 | 7 | 1 | 1 | -1 | -1 | 0 } |
| { 0 | 27 | 8 | -58 | 2 | -5 | 25 | 3 | 0 | 3 | 0 | -5 | 0 | -2 | 7 | 0 } |
| { -12 | 29 | 3 | 21 | 4 | 0 | 5 | -1 | -3 | 4 | 1 | 4 | 2 | 0 | 1 | 0 } |
| { 0 | -6 | 13 | -4 | 0 | -4 | 1 | 5 | 0 | -1 | -1 | 1 | 0 | -1 | 0 | 0 } |
| { -4 | 21 | -64 | -8 | -5 | 19 | 10 | -48 | 3 | -1 | 10 | -3 | 0 | 4 | 3 | -6 } |
| { 2 | -35 | -27 | 4 | 1 | 8 | -17 | -19 | 3 | 0 | 3 | -6 | 0 | 2 | -1 | -2 } |
| { 56 | -23 | 22 | -1 | 4 | -1 | -15 | 26 | 6 | 4 | -10 | 0 | 0 | 2 | -3 | 2 } |
| { -10 | -53 | -18 | 8 | 9 | 12 | -41 | -25 | -2 | 2 | 13 | -16 | 4 | 1 | -5 | 1 } |
| { -13 | 42 | 1 | 57 | -22 | -2 | -25 | -28 | 5 | 6 | 19 | -12 | -5 | -3 | -2 | 4 } |
| { 19 | 14 | -4 | -12 | -4 | 5 | 17 | 8 | 2 | -4 | -4 | 4 | -2 | 2 | 1 | 0 } |

},

TABLE 22

− If nTrS is equal to 48, lfnstTrSetIdx is equal to 3, and lfnstIdx is equal to 2
  the following applies:
lowFreqTransMatrix [ m ][ n ] = lowFreqTransMatrixCol0to15[ m ][ n ] with
m = 0..15, n = 0..15
lowFreqTransMatrixCol0to15 =

{

| | | | | | | | | | | | | | | | |
|---|---|---|---|---|---|---|---|---|---|---|---|---|---|---|---|
| { 109 | -26 | -8 | -3 | -2 | -1 | -1 | 0 | -50 | 28 | 2 | 1 | 0 | 0 | 0 | 0 } |
| { -39 | 31 | -5 | 2 | -1 | 1 | 0 | 0 | 95 | 6 | 18 | 0 | 4 | 0 | 1 | 0 } |
| { 29 | -3 | -2 | -2 | 0 | 0 | 0 | 0 | 0 | -41 | 9 | 0 | 2 | 0 | 1 | 0 } |
| { 18 | 96 | -23 | 2 | -5 | 1 | -2 | 0 | -10 | 6 | 10 | -2 | 1 | -1 | 1 | 0 } |
| { -29 | -60 | 16 | -2 | 3 | -1 | 1 | 0 | -52 | 9 | -17 | 5 | -2 | 1 | -1 | 1 } |
| { -23 | -5 | -15 | 5 | -2 | 1 | -1 | 1 | 2 | 79 | -13 | -4 | -2 | -1 | -1 | 0 } |
| { -7 | -3 | 12 | -3 | 3 | -1 | 1 | 0 | -31 | -62 | 8 | 7 | 0 | 2 | 0 | 1 } |
| { 1 | -26 | 5 | 0 | 1 | 0 | 1 | 0 | 24 | -3 | 43 | -6 | 4 | -2 | 1 | -1 } |
| { 11 | 14 | 6 | -3 | 1 | -1 | 1 | 0 | 10 | -7 | -9 | 3 | -2 | 1 | -1 | 0 } |
| { -10 | -11 | -47 | 3 | -4 | 1 | -1 | 0 | 5 | 28 | 11 | -2 | -1 | 0 | 0 | 0 } |
| { -8 | -24 | -99 | 11 | -10 | 3 | -4 | 1 | -5 | -36 | 19 | -26 | 4 | -5 | 1 | -2 } |
| { -5 | 1 | -1 | 0 | 1 | 0 | 0 | 0 | -10 | -14 | -6 | 8 | 0 | 1 | 0 | 0 } |
| { 1 | 12 | -20 | 21 | -4 | 5 | -2 | 2 | -5 | -2 | -76 | 9 | -1 | 2 | -1 | 1 } |
| { 2 | -9 | -18 | 8 | -3 | 3 | -1 | 1 | 3 | -25 | -62 | -6 | 0 | -2 | 0 | -1 } |
| { 4 | 9 | 39 | 18 | 0 | 2 | 0 | 1 | -6 | -16 | -22 | -37 | 5 | -5 | 1 | -2 } |
| { -7 | -2 | 15 | -6 | 1 | -1 | 1 | -1 | -11 | -3 | 22 | -14 | 0 | -2 | 1 | -1 } |

},
lowFreqTransMatrix [ m ][ n ] = lowFreqTransMatrixCol16to31[ m − 16 ][ n ] with
m = 16..31, n = 0..15
lowFreqTransMatrixCol16to31 =

{

TABLE 22-continued

```
{  -18   -8    6    0    1    0    1    0    6   -2   -3    0    0    0    0    0 }
{   32  -49    5    1    1    0    0    0   27   -1  -14    2   -2    1   -1    0 }
{   86    4  -33    2   -6    1   -2    0  -32   58    1   -7    0   -2    0   -1 }
{  -14   26    2   -4    1   -1    0    0   43   -9   35   -2    4   -1    1    0 }
{   13   56   -2   -9    0    2    0   -1  -34  -18   41    0    3    0    1    0 }
{   -9    1    5   -1    1    0    0    0   -4   49    2  -14    1   -3    0   -1 }
{  -75    9  -45    5   -1    1   -1    0   14   35    0  -23    2   -5    1   -2 }
{   -7   64    9   14    0    3    0    1  -12   -4    5    3   -1    1    0    0 }
{   22   21    1  -21    2   -4    1   -2   52    1   53    0   -9    1   -2    0 }
{  -12   -2  -38    2    0    1    0    0   16   38   11  -16   -1   -3    0   -2 }
{    0   25   41    5   -3    1    0    0   10   -5   -7   12    2    1    0    0 }
{  -17   -2    7   -5    3   -1    0    0  -16   13    3   31   -1    6    0    2 }
{   -1   -2  -16   -4    0   -1    0    0   -7    7  -31    0    3    0    0    0 }
{   -6  -61   14  -51    2   -6    0   -2  -19    0   40   -7  -17    0   -3    0 }
{   -5   15   63    9  -16    0   -3    0   18   42  -18   27   15    1    3    1 }
{  -18   -7   30   -9   -4    0   -1    0  -35   23   23   10  -17    1   -3    0 }
},
```
lowFreqTransMatrix [ m ][ n ] = lowFreqTransMatrixCol32to47[ m − 32 ][ n ] with
m = 32..47, n = 0..15
lowFreqTransMatrixCol32to47 =
```
{
{   -3    2    1   -1    0    0    0    0   -2    0    0    0    0    0    0    0 }
{    3    5   -3   -2    4    1   -1   -1    2    0    0    2    0    0    0    0 }
{  -14   -8   20    0   -2   -3    0    4   -1   -1    0    0   -1    1    0    0 }
{   14  -40    1   10    2   -1    0    1    2   -4   -1    0    0   -1    0    0 }
{   19  -36  -10   13    3    6  -14   -1    3    1   -1   -3    1    1   -1   -1 }
{  -31  -14   56   -1   13  -37   -4   20   -2    2  -10    0    2   -4    0   -1 }
{    1   -8   32   -1    7  -12   -4   10    0    2   -6   -1    2    0    0   -2 }
{    8  -59   -3   26   14    6  -58    6   -6   17   -7  -18    3    3   -1   -5 }
{  -21  -11    1   40   -5   -4  -24    5   -4    5   -6   -5    0    0    0   -3 }
{   12   -9  -22    7   -8   60    4  -36   -6  -15   54    7    3   -7   -8   14 }
{   -1    1    9   -3   -3  -14   -3   12    2    4  -13   -2   -1    3    2   -4 }
{  -93  -16  -46   -3   23  -19    0  -47    8    4    8    3    2    3    0    0 }
{    4   11  -12    4  -12   14  -50   -1   -8   32   -4  -54    2    0   30  -15 }
{   13   -4   11    9   17    0   24    5    1  -12    4   28    0    0  -15    8 }
{   12  -34    9  -24    4   28   -2    4  -11   -4   30    2    5  -13   -4   18 }
{  -19   53    6   48  -65   12  -12   11   -8  -16   10  -21   -2  -12    6    2 }
},
```

According to another example, the variable predModeIntra derived from the intra prediction may be transmitted through an input value and an output value in subsequent encoding and decoding processes. Finally, the LFNST may be applied using a variable wideAngPredModeIntra input in the non-separable transform (LFNST) process. This process is shown in the following table.

TABLE 23

8.4.5.1 General decoding process for intra blocks

Inputs to this process are:
– a sample location ( xTb0, yTb0 ) specifying the top-left sample of the current transform block relative to the top-left sample of the current picture,
– a variable nTbW specifying the width of the current transform block,
– a variable nTbH specifying the height of the current transform block,
– a variable predModeIntra specifying the intra prediction mode,
– a variable cIdx specifying the colour component of the current block.
Output of this process is a modified reconstructed picture before in-loop filtering.
...
– Otherwise, the following ordered steps apply:
 – The variables nW, nH, numPartsX and numPartsY are derived as follows:

(8-53)
nW = IntraSubPartitionsSplitType = = ISP_VER_SPLIT ? nTbW / NumIntraSubPartitions : nTbW (8-54)
nH = IntraSubPartitionsSplitType = = ISP_HOR_SPLIT ? nTbH / NumIntraSubPartitions : nTbH (8-55)
numPartsX = IntraSubPartitionsSplitType = = ISP_VER_SPLIT ? NumIntraSubPartitions : 1

TABLE 23-continued 8.4.5.1 General decoding process for intra blocks (8-56)
numPartsY = IntraSubPartitionsSplitType = = ISP_HOR_SPLIT ? NumIntraSubPartitions : 1
– For xPartIdx = 0..numPartsX − 1 and yPartIdx = 0..numPartsY − 1, the following applies:
 1. The intra sample prediction process as specified in clause 8.4.5.2 is invoked with the location ( xTbCmp, yTbCmp ) set equal to ( xTb0 + nW * xPartIdx, yTb0 + nH * yPartIdx ), the intra prediction mode predModeIntra, the transform block width nTbW and height nTbH set equal to nW and nH, the coding block width nCbW and height nCbH set equal to nTbW and nTbH, and the variable cIdx as inputs, and the output are an (nTbW)x(nTbH) array predSamples and the modified intra prediction mode wideAngPredModeIntra.
 2. The scaling and transformation process as specified in clause 8.7.2 is invoked with the luma location ( xTbY, yTbY ) set equal to ( xTbY + nW * xPartIdx, yTbY + nH * yPartIdx ), the modified intra prediction mode wideAngPredModeIntra, the variable cIdx, the transform width nTbW and the transform height nTbH set equal to nW and nH as inputs, and the output is an (nTbW)x(nTbH) array resSamples.
 3. The picture reconstruction process for a colour component as specified in clause 8.7.5 is invoked with the transform block location ( xTbComp, yTbComp ) set equal to ( xTb0 + nW * xPartIdx, yTb0 + nH * yPartIdx ), the transform block width nTbW, the transform block height nTbH set equal to nW and nH, the variable cIdx, the (nTbW)x(nTbH) array predSamples, and the (nTbW)x(nTbH) array resSamples as inputs, and the output is a modified reconstructed picture before in-loop filtering.

TABLE 24

8.4.5.2 Intra sample prediction

Inputs to this process are:
– a sample location ( xTbCmp, yTbCmp ) specifying the top-left sample
of the current transform block relative to the top-left sample of the current
picture,
– a variable predModeIntra specifying the intra prediction mode,
– a variable nTbW specifying the transform block width,
– a variable nTbH specifying the transform block height,
– a variable nCbW specifying the coding block width,
– a variable nCbH specifying the coding block height,
– a variable cIdx specifying the colour component of the current block.
Outputs of this process are:
– the predicted samples predSamples[ x ][ y ], with x = 0..nTbW − 1,
y = 0..nTbH − 1, and the modified intra prediction,
– the modified intra prediction mode wideAngPredModeIntra.
The predicted samples predSamples[ x ][ y ] and the modified intra
prediction mode wideAngPredModeIntra are derived as follows:
– If intra_mip_flag[ xTbComp ][ yTbComp ] is equal to 1 and cIdx is
equal to 0, wideAngPredModeIntra is set equal to predModeIntra and the
matrix-based intra sample prediction process as specified in clause
8.4.5.2.1 is invoked with the location ( xTbCmp, yTbCmp ), the intra
prediction mode predModeIntra, the transform block width nTbW and
height nTbH as inputs, and the output is predSamples.
– Otherwise, the general intra sample prediction process as specified in
clause 8.4.5.2.5 is invoked with the location ( xTbCmp, yTbCmp ), the
intra prediction mode predModeIntra, the transform block width nTbW
and height nTbH, the coding block width nCbW and height nCbH, and
the variable cIdx as inputs, and the output are predSamples and
wideAngPredModeIntra.

Table 23 shows that a variable wideAngPredModeIntra is derived as an output value in a sub-image processing step (The intra sample prediction process as specified in clause 8.4.5.2 and The scaling and transformation process as specified in clause 8.7.2), and Table 24 shows that a variable wideAngPredModeIntra is derived as an output value in an intra sample prediction step (Intra sample prediction in 8.4.5.2).

TABLE 25

8.4.5.2.5 General intra sample prediction

Inputs to this process are:
– a sample location ( xTbCmp, yTbCmp ) specifying the top-left sample
of the current transform block relative to the top-left sample of the current
picture,
– a variable predModeIntra specifying the intra prediction mode,
– a variable nTbW specifying the transform block width,
– a variable nTbH specifying the transform block height,
– a variable nCbW specifying the coding block width,
– a variable nCbH specifying the coding block height,
– a variable cIdx specifying the colour component of the current block.
Outputs of this process are:
– the predicted samples predSamples[ x ][ y ], with x = 0..nTbW − 1,
y = 0..nTbH − 1,
– the modified intra prediction mode wideAngPredModeIntra.
The variables refW and refH are derived as follows:
– If IntraSubPartitionsSplitType is equal to ISP_NO_SPLIT or cIdx is not
equal to 0, the following applies:
(8-92)
refW = nTbW * 2
(8-93)
refH = nTbH * 2
– Otherwise ( IntraSubPartitionsSplitType is not equal to ISP_NO_SPLIT
and cIdx is equal to 0 ), the following applies:
(8-94)
refW = nCbW * 2
(8-95)
refH = nCbH * 2
The variable refIdx specifying the intra prediction reference line index is
derived as follows:
(8-96)
refIdx = ( cIdx = = 0 ) ? IntraLumaRefLineIdx[ xTbCmp ]
[ yTbCmp ] : 0
The variables nW and nH are derived as follows:

TABLE 25-continued 8.4.5.2.5 General intra sample prediction

– If IntraSubPartitionsSplitType is equal to ISP_NO_SPLIT or cIdx is not
equal to 0, the following applies:
(8-97)
nW = nTbW
(8-98)
nH = nTbH
– Otherwise ( IntraSubPartitionsSplitType is not equal to ISP_NO_SPLIT
and cIdx is equal to 0 ), the following applies:
(8-99)
nW = nCbW
(8-100)
nH = nCbH
The variable whRatio is set equal to Abs( Log2( nW / nH ) ).
For non-square blocks (nW is not equal to nH), the intra prediction mode
predModeIntra is modified as follows:
– If all of the following conditions are true, predModeIntra is set equal
to ( predModeIntra + 65 ).
  – nW is greater than nH
  – predModeIntra is greater than or equal to 2
  – predModeIntra is less than ( whRatio > 1 ) ? ( 8 + 2 * whRatio ) : 8
– Otherwise, if all of the following conditions are true, predModeIntra is
set equal to ( predModeIntra − 67 ).
  – nH is greater than nW
  – predModeIntra is less than or equal to 66
  – predModeIntra is greater than ( whRatio > 1 ) ? ( 60 − 2 *
  whRatio ) : 60
The modified intra prediction mode wideAngPredModeIntra is set equal
to predModeIntra.

Table 25 shows a sub-step of Table 24, in which a variable wideAngPredModeIntra is derived as an output value. The variable wideAngPredModeIntra derived from Table 25 is the result of mode remapping of a non-square block to which wide-angle intra prediction is applied, and is the same as described with reference to Table 2.

TABLE 26

8.7.4. Transformation process for scaled transform coefficients 8.7.4.1 General

Inputs to this process are:
– a luma location ( xTbY, yTbY ) specifying the top-left sample of the
current luma transform block relative to the top-left luma sample of the
current picture,
– a variable nTbW specifying the width of the current transform block,
– variable nTbH specifying the height of the current transform block,
– a variable wideAngPredModeIntra specifying the modified intra
prediction mode,
– a variable cIdx specifying the colour component of the current block,
– an (nTbW)x(nTbH) array d[ x ][ y ] of scaled transform coefficients
with x = 0..nTbW − 1, y = 0..nTbH − 1.
Output of this process is the (nTbW)x(nTbH) array r[ x ][ y ] of residual
samples with x = 0..nTbW − 1, y = 0..nTbH − 1.
If lfnst_idx[ xTbY ][ yTbY ] is not equal to 0 and both nTbW and nTbH
are greater than or equal to 4, the following applies:
  2. The variables nLfnstSize, log2LfnstSize, numLfnstX, numLfnstY,
  and nonZeroSize are derived as follows:
    – If both nTbW and nTbH are greater than or equal to 8,
    log2LfnstSize is set to 3 and nLfnstOutSize is set to 48.
    – Otherwise, log2LfnstSize is set to 2 and nLfnstOutSize is set to 16.
    – If nTbH is equal to 4 and nTbW is greater than 8, numLfnstX set
    equal to 2.
    – Otherwise, numLfnstX set equal to 1.
    – If nTbW is equal to 4 and nTbH is greater than 8, numLfnstY set
    equal to 2.
    – Otherwise, numLfnstY set equal to 1.
    – If both nTbW and nTbH are equal to 4 or both nTbW and nTbH
    are equal to 8, nonZeroSize is set equal to 8.
    – Otherwise, nonZeroSize set equal to 16.
  4. For xSbIdx = 0..numLfnstX − 1 and ySbIdx = 0..numLfnstY − 1, the
  following applies:
    – The variable array u[ x ] with x = 0..nonZeroSize − 1 are derived as
    follows:

TABLE 26-continued 8.7.4. Transformation process for scaled transform coefficients 8.7.4.1 General xC = ( xSbIdx << log2LfnstSize ) + DiagScanOrder[ log2LfnstSize ]
[ log2LfnstSize ][ x ][ 0 ]
yC = ( ySbIdx << log2LfnstSize ) + DiagScanOrder[ log2LfnstSize ]
[ log2LfnstSize ][ x ][ 1 ]
u[ x ] = d[ xC ][ yC ]
– u[ x ] with x = 0..nonZeroSize – 1 is transformed to the variable
array
v[ x ] with x = 0..nLfnstOutSize – 1 by invoking the one-dimensional
transformation process as specified in clause 8.7.4.4 with the transform
input length of the scaled transform coefficients nonZeroSize, the
transform output length nLfnstOutSize the list u[ x ] with x =
0..nonZeroSize – 1, the index for transform set selection
wideAngPredModeIntra, and the index for transform selection in a
transform set 1fnst_idx[ xTbY ][ yTbY ] as inputs, and the output is the
list v[ x ] with x = 0..nLfnstOutSize – 1.
– The array d[ ( xSbIdx << log2LfnstSize ) + x ]
[ ( ySbIdx << log2LfnstSize ) + y ] with x = 0..nLfnstSize – 1,
y = 0..nLfnstSize – 1 are derived as follows:
  – If 1fnstPredModeIntra is less than or equal to 34, or equal to
    INTRA_LT_CCLM, INTRA_T_CCLM, or INTRA_L_CCLM, the
    following applies:
d[ ( xSbIdx << log2LfnstSize ) + x ]
  [ ( ySbIdx << log2LfnstSize ) + y ] = ( y < 4 ) ? v[ x + ( y <<
  log2LfnstSize ) ] : ( ( x < 4 ) ? v[ 32 + x + ( ( y – 4 ) << 2 ) ] :
  d[ x ][ y ] )
  – Otherwise, the following applies:
d[ ( xSbIdx << log2LfnstSize ) +
  x ][ ( ySbIdx << log2LfnstSize ) + y ] = ( x < 4 ) ? v[ y + ( x <<
  log2LfnstSize ) ] : ( ( y < 4 ) ? v[ 32 + y + ( ( x – 4 ) << 2 ) ] :
  d[ x ][ y ] )

Table 26 shows that the variable wideAngPredModeIntra set in Table 25 is used as an input value in a transform step of image processing.

TABLE 27

8.7.4.4 Low frequency non-separable transformation process

Inputs to this process are:
– a variable nTrS specifying the transform output length,
– a variable nonZeroSize specifying the transform input length,
– a list of transform input x[ j ] with j = 0..nonZeroSize – 1,
– a variable wideAngPredModeIntra specifying the index for transform
set selection,
– a variable 1fnstIdx specifying the index for transform selection in a set.
Output of this process is the list of transformed samples y[ i ] with i =
0..nTrS – 1.
The transformation matrix derivation process as specified in clause 8.7.4.5
is involved with the transform output length nTrS, the index for transform
set selection wideAngPredModeIntra, and the index for transform
selection in a transform set 1fnstIdx as inputs, and the transformation
matrix lowFreqTransMatrix as output.
The list of transformed samples y[ i ] with i = 0..nTrS – 1 is derived as
follows:
y[i] = Clip3( CoeffMin, CoeffMax, ( ( $\Sigma_{j=0}^{nonZeroSize-1}$
lowFreqTransMatrix[i][j] * x[j] ) + 64 ) >> 7 ) with i = 0..nTrS – 1
  8.7.4.5 Low frequency non-separable transformation matrix derivation
  process Inputs to this process are:
– a variable nTrS specifying the transform output length,
– a variable wideAngPredModeIntra specifying the index for transform
set selection,
– a variable 1fnstIdx specifying the index for transform selection in the
designated transform set.
Output of this process is the transformation matrix lowFreqTransMatrix.
The variable 1fnstTrSetIdx is derived as follows:

| wideAngPredModeIntra | 1fnstTrSetIdx |
|---|---|
| wideAngPredModeIntra < 0 | 1 |
| 0 <= wideAngPredModeIntra <= 1 | 0 |
| 2 <= wideAngPredModeIntra <= 12 | 1 |

TABLE 27-continued

| | |
|---|---|
| 13 <= wideAngPredModeIntra <= 23 | 2 |
| 24 <= wideAngPredModeIntra <= 44 | 3 |
| 45 <= wideAngPredModeIntra <= 55 | 2 |
| 56 <= wideAngPredModeIntra <= 80 | 1 |
| 81 <= wideAngPredModeIntra <= 83 | 0 |

Table 27 shows that wideAngPredModeIntra is applied to the non-separable secondary transform, that is, the LFNST. A transform kernel matrix according to Table 27 may be the same as those in Table 11 to Table 22 described above, and index signaling of Table 6 and Table 7 may also be applied to this embodiment.

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

Figure 11:
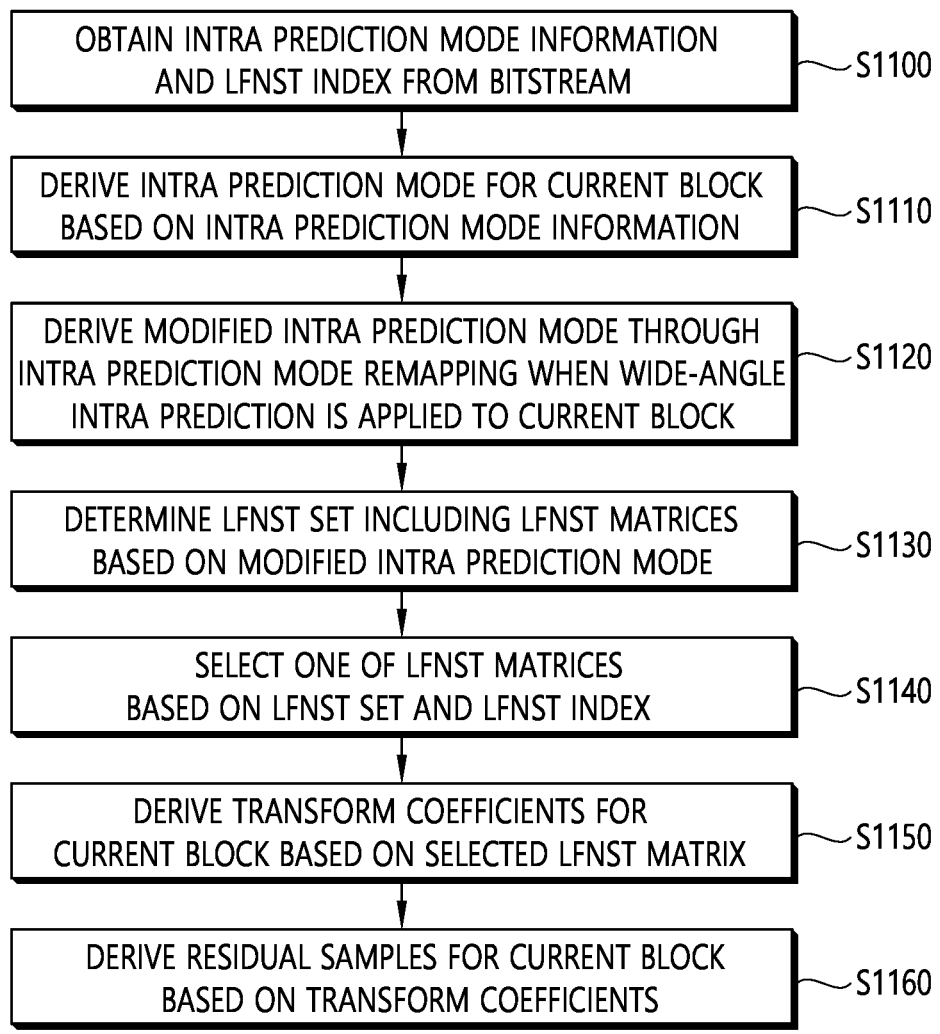
FIG. 11 is a flowchart illustrating an operation of a video decoding apparatus according to an embodiment of the present disclosure.

FIG. 11 is a flowchart illustrating an operation of a video decoding apparatus according to an embodiment of the present disclosure.

Each operation illustrated in FIG. 11 may be performed by the decoding apparatus 300 illustrated in FIG. 3. Specifically, S1100 may be performed by the entropy decoder 310 illustrated in FIGS. 3, S1110 and S1120 may be performed by the intra predictor 331 illustrated in FIG. 3, and S1130 to S1160 may be performed by the inverse transformer 322. Operations according to S1100 to S1160 are based on some of the foregoing details explained with reference to FIG. 4 to FIG. 10. Therefore, a description of specific details overlapping with those explained above with reference to FIG. 3 to FIG. 10 will be omitted or will be made briefly.

The decoding apparatus 300 according to an embodiment may obtain intra prediction mode information and an LFNST index from a bitstream (S1100).

The intra prediction mode information may include a most probable mode (MPM) index indicating one of MPM candidates in an MPM list derived based on an intra prediction mode for a neighboring block (e.g., left and/or upper neighboring blocks) of a current block and additional candidate modes and remaining intra prediction mode information indicating one of remaining intra prediction modes not included in the MPM candidates.

Additionally, the decoding apparatus 300 may decode information on quantized transform coefficients for the current block from the bitstream and may derive the quantized transform coefficients for the current block based on the information on the quantized transform coefficients for the current block. The information on the quantized transform coefficients for the current block may be included in a sequence parameter set (SPS) or a slice header and may include at least one of information on whether a reduced transform (RST) is applied, information on a minimum transform size in which the reduced transform is applied, information on a maximum transform size in which the reduced transform is applied, a reduced inverse transform size, and information on a transform index (LFNST index) indicating any one of transform kernel matrices (LFNST matrices) included in a transform set (LFNST set).

When a partitioning tree structure for the current block is a dual tree type, an LFNST index may be received for each of a luma block and a chroma block.

The decoding apparatus 300 may further receive MTS index information indicating a transform kernel of an inverse primary transform.

The decoding apparatus 300 according to an embodiment may derive transform coefficients by dequantizing the quantized transform coefficients for the current block. According to an example, when an inverse secondary transform and an inverse primary transform are performed, a sample on which dequantization has been performed may be referred to as a transform coefficient, and a sample on which the inverse secondary transform has been performed may be referred to as a modified transform coefficient. As necessary, the two samples may be collectively referred to as transform coefficients. When the inverse primary transform is performed, residual samples are derived.

The decoding apparatus 300 derives an intra prediction mode for the current block based on the intra prediction mode information (S1110).

For example, the decoding apparatus 300 may generate the MPM list based on prediction modes of neighboring blocks of the current block and may derive the intra prediction mode for the current block based on the received MPM index or remaining intra prediction mode information.

The decoding apparatus 300 may determine whether wide-angle intra prediction is applied to the current block before deriving an intra prediction sample, and may derive a modified intra prediction mode through intra prediction mode remapping when the wide-angle intra prediction is applied to the current block (S1120).

The current block may be a transform block or a coding block based on whether intra split prediction is applied, and when the height and width of the current block are not the same, that is, when the current block is non-square, wide-angle intra prediction may be applied.

For a non-square block, the intra prediction mode may be modified according to two separate cases, and a modified intra prediction mode may be derived based on which of the height and width of the current block is greater, the ratio between the height and width of the current block, and the intra prediction mode.

First, in a first case, if all conditions that (1) the width of the current block is greater than the height, (2) the intra prediction mode before a modification is equal to or greater than 2, and (3) the intra prediction mode is less than a value derived as (8+2*whRatio) when whRatio is greater than 1 and as 8 when whRatio is less than or equal to 1 are satisfied, the intra prediction mode is set to equal to a value of the intra prediction mode+65.

In a second case, if all conditions that (1) the height of the current block is greater than the width, (2) the intra prediction mode before the modification is less than or equal to 66, and (3) the intra prediction mode is greater than a value derived as (60−2*whRatio) when whRatio is greater than 1 and as 60 when whRatio is less than or equal to 1 are satisfied, the intra prediction mode is set to equal to a value of the intra prediction mode−67.

For example, when the intra prediction mode information indicates any one of the planar mode (0), the DC mode (1), and directional modes 2 to 66 of FIG. 4, if the width of the current block is greater than the height of the current block, the modified intra prediction mode may be derived to range from 67 to 80 of FIG. 5. If the height of the current block is greater than the width of the current block, the modified intra prediction mode may be derived to range from −1 to −14 of FIG. 5.

When an intra prediction mode for the chroma block is a DM using the same mode as an intra prediction mode for the luma block, wide-angle intra prediction may be applied to the chroma block.

The inverse transformer 332 of the decoding apparatus 300 may determine a transform set, that is, an LFNST set, based on a mapping relationship according to the modified intra prediction mode applied to the current block (S1130) and may select any one of a plurality of LFNST matrices based on the LFNST set and the LFNST index (S1140).

According to an example, as shown in Table 5, when any one of four LFNST sets is determined according to the intra prediction mode of the current block, the same LFNST set may be determined in all cases to which the wide-angle intra prediction is applied. That is, an LFNST set in a case where the modified intra prediction mode ranges from 67 to 80 and an LFNST set in a case where the modified intra prediction mode ranges from −1 to −14 may be the same.

Subsequently, the decoding apparatus 300 may perform an inverse RST, for example, an inverse LFNST, by applying the LFNST matrix to the dequantized transform coefficients, thereby deriving modified transform coefficients for the current block (S1150).

As described above, any one of a plurality of transform sets may be determined according to an intra prediction mode of a transform block to be transformed, and an inverse RST may be performed based on any one of LFNST matrices included in an LFNST set indicated by an LFNST index.

The LFNST matrix may be a non-square matrix in which the number of columns is less than the number of rows.

Referring to S1150, it may be identified that residual samples for the current block are derived based on the inverse RST on the transform coefficients for the current block. Regarding the size of an inverse transform matrix, the size of a general inverse transform matrix is N×N, while the size of an inverse RST matrix is reduced to N×R, thus making it possible to reduce memory occupancy by an R/N ratio when performing the inverse RST compared to when performing a general transform. Further, compared to the number of multiplication operations, N×N, when using the general inverse transform matrix, it is possible to reduce the number of multiplication operations by an R/N ratio (to N×R) when the inverse RST matrix is used. In addition, since only R transform coefficients need to be decoded when the inverse RST is applied, the total number of transform coefficients for the current block may be reduced from N to R, compared to when the general inverse transform is applied in which N transform coefficients need to be decoded, thus increasing decoding efficiency. That is, according to S1150, (inverse) transform efficiency and decoding efficiency of the decoding apparatus 300 may be increased through the inverse RST.

The decoding apparatus 300 according to an embodiment may derive the residual samples for the current block based on the inverse transform on the modified transform coefficients (S1160).

The decoding apparatus 300 may perform an inverse primary transform on the modified transform coefficients for the current block, in which case a simplified inverse transform may be applied or a conventional separable transform may be used as the inverse primary transform.

Subsequently, the decoding apparatus 300 may generate reconstructed samples based on the residual samples for the current block and prediction samples for the current block.

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

Figure 12:
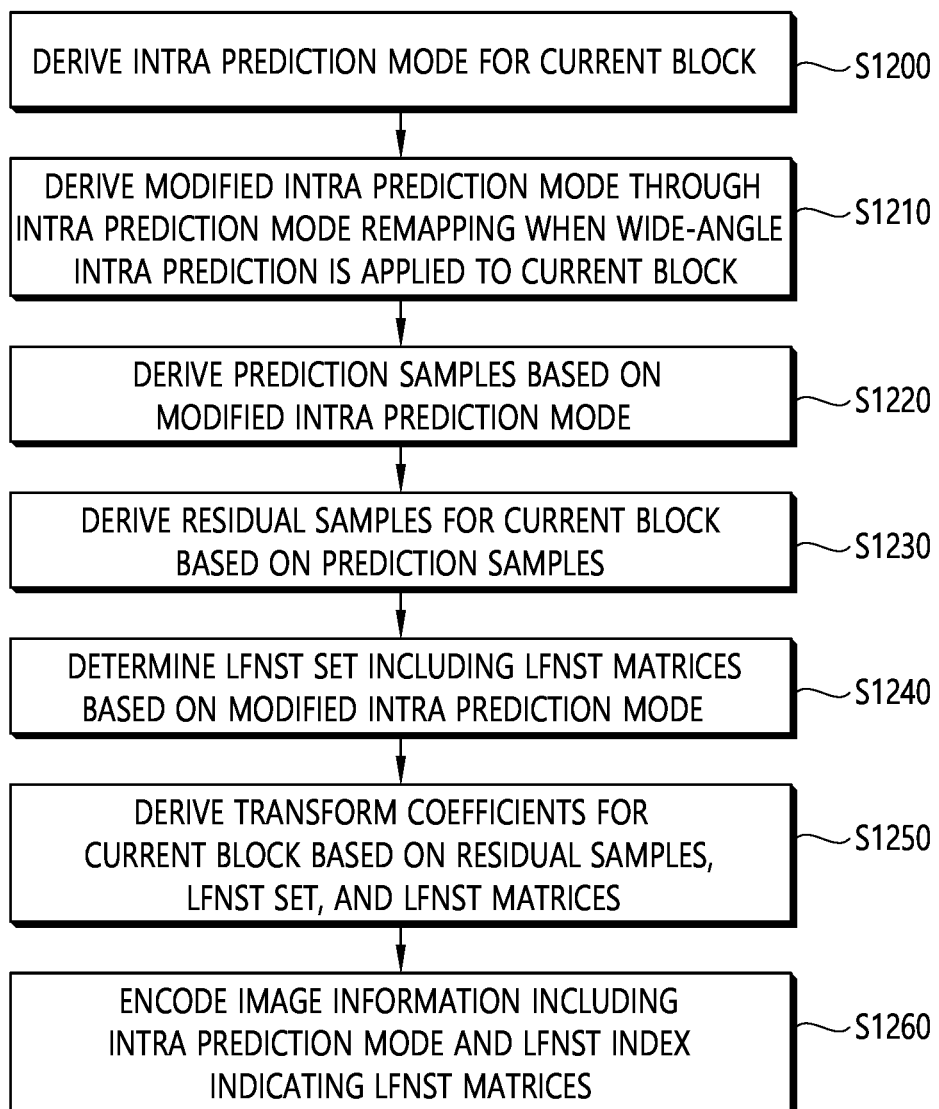
FIG. 12 is a flowchart illustrating an operation of a video encoding apparatus according to an embodiment of the present disclosure.

FIG. 12 is a flowchart illustrating an operation of a video encoding apparatus according to an embodiment of the present disclosure.

Each operation illustrated in FIG. 12 may be performed by the encoding apparatus 200 illustrated in FIG. 2. Specifically, S1200 to S1220 may be performed by the predictor illustrated in FIG. 2, S1230 may be performed by the subtractor 231 illustrated in FIGS. 2, S1240 and S1250 may be performed by the transformer 232 illustrated in FIG. 2, and S1260 may be performed by the entropy encoder 240 illustrated in FIG. 2. Operations according to S1200 to S1260 are based on some of contents described in FIG. 4 to FIG. 10. Therefore, a description of specific details overlapping with those explained above with reference to FIG. 2 and FIG. 4 to FIG. 10 will be omitted or will be made briefly.

The encoding apparatus 200 according to an embodiment may derive an intra prediction mode for a current block (S1200).

The encoding apparatus 200 may configure an MPM list for the current block and may determine an optimal intra prediction mode based on rate-distortion optimization (RDO).

The MPM list may include candidate intra prediction modes (MPM candidates) that are highly likely to be applied to the current block. For example, the MPM list may include an intra prediction mode for a neighboring block and may further include specific intra prediction modes according to a predetermined method.

The encoding apparatus 200 may perform prediction based on various intra prediction modes, and may determine an optimal intra prediction mode based on rate-distortion optimization (RDO) based thereon. The encoding apparatus 200 may determine the optimal intra prediction mode using only the MPM candidates included in the MPM list or may determine the optimal intra prediction mode further using remaining intra prediction modes in addition to the MPM candidates included in the MPM list.

When wide-angle intra prediction is applied to the current block, the encoding apparatus 200 may derive a modified intra prediction mode through intra prediction mode remapping (S1210).

The current block may be a transform block or a coding block based on whether intra split prediction is applied, and when the height and width of the current block are not the same, that is, when the current block is non-square, wide-angle intra prediction may be applied.

For a non-square block, the intra prediction mode may be modified according to two separate cases, and a modified intra prediction mode may be derived based on which of the height and width of the current block is greater, the ratio between the height and width of the current block, and the intra prediction mode. For example, when intra prediction mode information indicates any one of the planar mode (0), the DC mode (1), and directional modes 2 to 66 of FIG. 4, if the width of the current block is greater than the height of the current block, the modified intra prediction mode may be derived to range from 67 to 80 of FIG. 5. If the height of the current block is greater than the width of the current block, the modified intra prediction mode may be derived to range from −1 to −14 of FIG. 5.

When an intra prediction mode for a chroma block is a DM using the same mode as an intra prediction mode for a luma block, wide-angle intra prediction may be applied to the chroma block.

The encoding apparatus 200 may derive prediction samples based on the modified intra prediction mode applied to the current block (S1220), and may derive residual samples for the current block based on the prediction samples (S1230).

The encoding apparatus 200 according to an embodiment may determine an LFNST set including LFNST matrices based on the modified intra prediction mode (S1240).

The encoding apparatus 200 may perform an MTS-based primary transform before a non-separable transform based on the LFNST set and may generate an MTS index indicating which MTS is used.

According to an example, as shown in Table 5, when any one of four LFNST sets is determined according to the intra prediction mode of the current block, the same LFNST set may be determined in all cases to which the wide-angle intra prediction is applied. That is, an LFNST set in a case where the modified intra prediction mode ranges from 67 to 80 and an LFNST set in a case where the modified intra prediction mode ranges from −1 to −14 may be the same.

The encoding apparatus 200 may derive transform coefficients for the current block based on the residual samples, the LFNST set, and the LFNST matrices (S1250).

As described above, the transform coefficients for the current block may be derived based on the primary transform on the residual samples, and the primary transform may be performed through a plurality of transform kernels. In this case, the transform kernels may be selected based on the intra prediction mode.

Although the residual samples after the primary transform is performed may be referred to as transform coefficients and samples after the LFNST is performed may be referred to as modified transform coefficients, the two types of samples may be collectively referred to as transform coefficients.

As described above, any one of a plurality of transform sets may be determined according to an intra prediction mode of a transform block to be transformed, and an inverse RST may be performed based on any one of LFNST matrices included in an LFNST set.

Each LFNST set may include two LFNST matrices, and the LFNST matrix may be a non-square matrix in which the number of columns is less than the number of rows.

Referring to S1250, the transform coefficients for the current block are derived based on an RST on the residual samples. Regarding the size of a transform kernel matrix, the size of a general transform kernel matrix is N×N, while the size of a simplified transform matrix is reduced to R×N, thus making it possible to reduce memory occupancy by an R/N ratio when performing the RST compared to when performing a general transform. Further, compared to the number of multiplication operations, N×N, when using the general transform kernel matrix, it is possible to reduce the number of multiplication operations by an R/N ratio (to R×N) when the simplified transform kernel matrix is used. In addition, since only R transform coefficients are derived when the RST is applied, the total number of transform coefficients for the current block may be reduced from N to R, compared to when the general transform is applied in which N transform coefficients are derived, thus reducing the amount of data transmitted by the encoding apparatus 200 to the decoding apparatus 300. That is, according to S1250, transform efficiency and coding efficiency of the encoding apparatus 200 may be increased through the RST.

The encoding apparatus 200 according to an embodiment may derive quantized transform coefficients by performing quantization based on the modified transform coefficients for the current block and may encode information on the quantized transform coefficients.

The encoding apparatus 200 may encode and generate image information including the intra prediction mode and an LFNST index indicating an LFNST matrix in addition to the information on the quantized transform coefficients (S1260).

A syntax element of the LFNST index according to this embodiment may indicate whether an (inverse) LFNST is applied and any one of the LFNST matrices included in the LFNST set. When the LFNST set includes two transform kernel matrices, the syntax element of the transform index may have three values.

According to an example, when a partitioning tree structure for the current block is a dual tree type, an LFNST index may be encoded for each of the luma block and the chroma block.

According to an embodiment, the syntax element of the transform index may be derived as a value of 0 indicating that no (inverse) RST is applied to the current block, a value of 1 indicating a first transform kernel matrix among the transform kernel matrices, or a value of 2 indicating a second transform kernel matrix among the transform kernel matrices.

In the present disclosure, at least one of quantization/dequantization and/or transform/inverse transform may be omitted. When quantization/dequantization is omitted, a quantized transform coefficient may be referred to as a transform coefficient. When transform/inverse transform is omitted, the transform coefficient may be referred to as a coefficient or a residual coefficient, or may still be referred to as a transform coefficient for consistency of expression.

In addition, in the present disclosure, a quantized transform coefficient and a transform coefficient may be referred to as a transform coefficient and a scaled transform coefficient, respectively. In this case, residual information may include information on a transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) of the transform coefficients. Residual samples may be derived based on the inverse transform (transform) of the scaled transform coefficients. These details may also be applied/expressed in other parts of the present disclosure.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Figure 13:
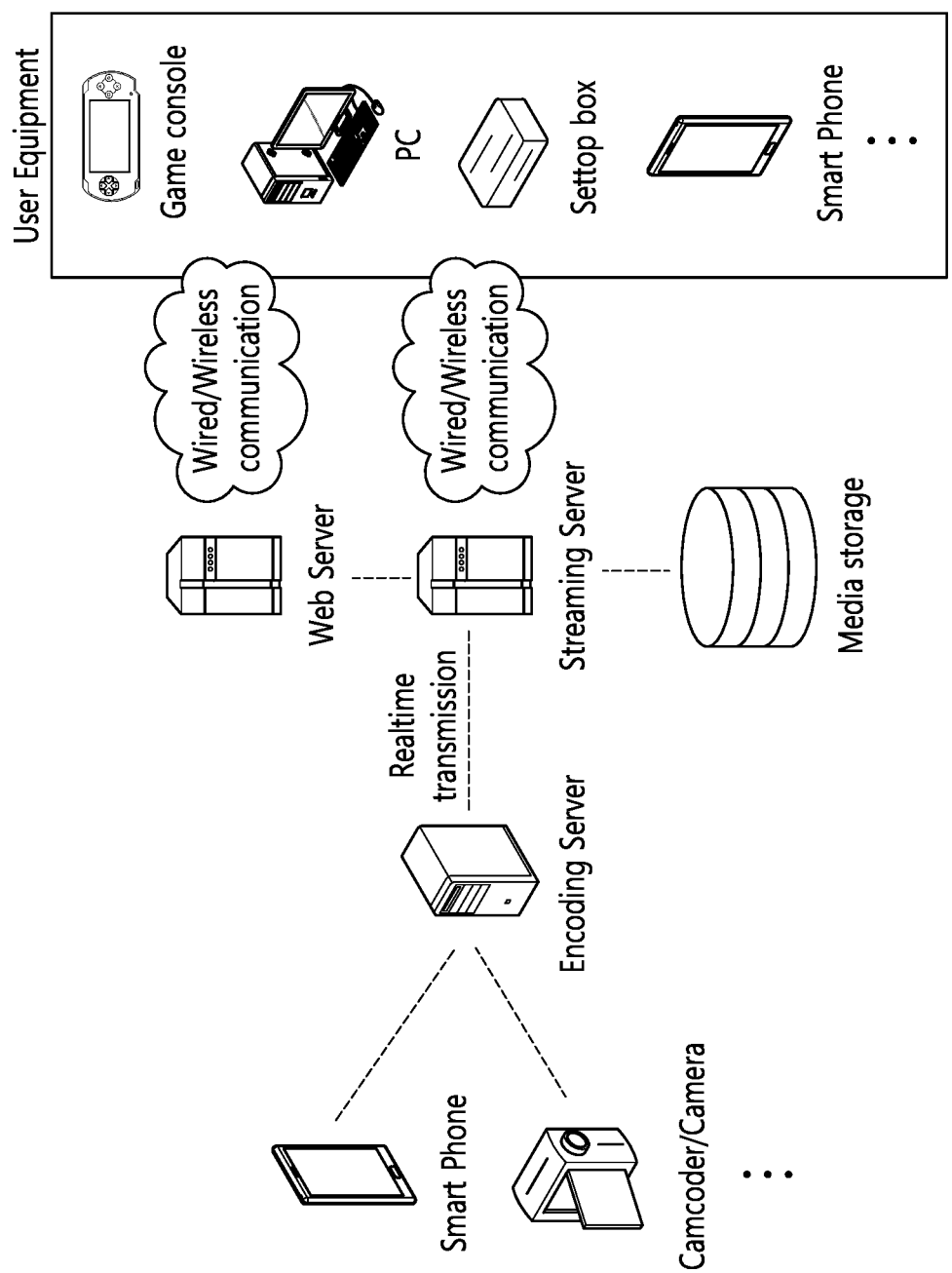
FIG. 13 illustrates the structure of a content streaming system to which the present disclosure is applied.

FIG. 13 illustrates the structure of a content streaming system to which the present disclosure is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

Claims disclosed herein can be combined in a various way. For example, technical features of method claims of the present disclosure can be combined to be implemented or performed in an apparatus, and technical features of apparatus claims can be combined to be implemented or performed in a method. Further, technical features of method claims and apparatus claims can be combined to be implemented or performed in an apparatus, and technical features of method claims and apparatus claims can be combined to be implemented or performed in a method.

What is claimed is:

1. An image decoding method performed by a decoding apparatus, comprising:
    obtaining intra prediction mode information and a low-frequency non-separable transform (LFNST) index from a bitstream;
    deriving an intra prediction mode for a current block based on the intra prediction mode information;
    derives prediction samples for the current block based on the intra prediction mode;
    performing an LFNST to derive transform coefficients; and
    deriving residual samples for the current block based on the transform coefficients,
    wherein performing the LFNST comprising:
    performing a wide-angle intra prediction mode mapping process based on a width of the current block being not equal to a height of the current block;
    determining an LFNST set among four LFNST sets based on a modified intra prediction mode by the wide-angle intra prediction mode mapping process, the LFNST set comprising LFNST matrices;
    selecting one of the LFNST matrices based on the determined LFNST set and the LFNST index; and
    performing a matrix operation based on the one of the LFNST matrices,
    wherein the intra prediction mode information indicates any one of a planar mode (0), a DC mode (1), and directional modes (2 to 66),
    wherein the modified intra prediction mode is derived as any one intra prediction mode in a range from −1 to −14 based on the height of the current block being greater than the width of the current block, and
    wherein an LFNST set for intra prediction modes in a range from −1 to −14 is a same as an LFNST set for intra prediction modes in a range from 2 to 12.

2. The image decoding method of claim 1, wherein the modified intra prediction mode is derived based on which of the height and the width of the current block is greater, a ratio between the height and the width of the current block, and the intra prediction mode for the current block.

3. The image decoding method of claim 1, wherein the LFNST index indicates whether the LFNST is applied or one of the LFNST matrices comprised in the LFNST set.

4. An image encoding method performed by an image encoding apparatus, comprising:
    deriving an intra prediction mode for a current block;
    deriving prediction samples for the current block based on the intra prediction mode;
    deriving residual samples for the current block based on the prediction samples; and
    performing a low-frequency non-separable transform (LFNST) to derive transform coefficients,
    wherein performing the LFNST comprising:
    performing a wide-angle intra prediction mode mapping process based on a width of the current block being not equal to a height of the current block;
    determining an LFNST set among four LFNST sets based on a modified intra prediction mode by the wide-angle intra prediction mode mapping process, the LFNST set comprising LFNST matrices;
    selecting one of the LFNST matrices based on the determined LFNST set; and
    performing a matrix operation based on the one of the LFNST matrices,
    wherein the intra prediction mode information indicates any one of a planar mode (0), a DC mode (1), and directional modes (2 to 66),
    wherein the modified intra prediction mode is derived as any one intra prediction mode in a range from −1 to −14 based on the height of the current block being greater than the width of the current block, and
    wherein an LFNST set for intra prediction modes in a range from −1 to −14 is a same as an LFNST set for intra prediction modes in a range from 2 to 12.

5. A non-transitory computer-readable digital storage medium that stores a bitstream generated by the image encoding method of claim 4.

6. A transmitting method of data for an image, comprising:
    obtaining a bitstream for the image, wherein the bitstream is generated based on deriving an intra prediction mode for a current block, deriving prediction samples for the current block based on the intra prediction mode, deriving residual samples for the current block based on the prediction samples, performing a low frequency non-separable transform (LFNST) to derive transform coefficients, and encoding image information related to the transform coefficients; and transmitting the data comprising the bitstream, wherein performing the LFNST comprising:

performing a wide-angle intra prediction mode mapping process based on a width of the current block being not equal to a height of the current block;

determining an LFNST set among four LFNST sets based on a modified intra prediction mode by the wide-angle intra prediction mode mapping process, the LFNST set comprising LFNST matrices;

selecting one of the LFNST matrices based on the determined LFNST set; and performing a matrix operation based on the one of the LFNST matrices, wherein the intra prediction mode information indicates any one of a planar mode (0), a DC mode (1), and directional modes (2 to 66), wherein the modified intra prediction mode is derived as any one intra prediction mode in a range from −1 to −14 based on the height of the current block being greater than the width of the current block, and wherein an LFNST set for intra prediction modes in a range from −1 to −14 is a same as an LFNST set for intra prediction modes in a range from 2 to 12.

* * * * *